United States Patent [19]

Funabashi et al.

[11] Patent Number: 5,556,820
[45] Date of Patent: Sep. 17, 1996

[54] CATALYST COMPONENT FOR OLEFIN POLYMERIZATION AND PROCESS FOR PRODUCING POLYOLEFINS

[75] Inventors: Hideo Funabashi; Akinobu Sugahara; Akira Tanaka; Masatoshi Toda; Tsuyoshi Ota; Youichi Matsuo; Tsutomu Akimaru; Sigeo Iwasaki; Masayuki Tsuruoka, all of Ichihara, Japan

[73] Assignee: Idemitsu Petrochemical Co., Ltd., Ichihara, Japan

[21] Appl. No.: 204,607

[22] Filed: Mar. 2, 1994

Related U.S. Application Data

[63] Continuation-in-part of Ser. No. 743,310, Aug. 27, 1991, abandoned, Ser. No. 972,488, Feb. 17, 1993, abandoned, Ser. No. 971,976, Feb. 24, 1993, abandoned, and Ser. No. 977,392, Mar. 1, 1993, abandoned.

[30] Foreign Application Priority Data

| Dec. 28, 1989 | [JP] | Japan | 1-343340 |
| Jun. 17, 1991 | [JP] | Japan | 3-171623 |
| Jun. 18, 1991 | [JP] | Japan | 3-173024 |
| Jun. 25, 1991 | [JP] | Japan | 3-179052 |
| Jun. 28, 1991 | [JP] | Japan | 3-183632 |

[51] Int. Cl.⁶ .................. C08F 4/10; C08F 4/64
[52] U.S. Cl. .......... 502/111; 502/104; 502/112; 502/115; 502/118; 502/119; 502/134; 502/172; 264/9; 423/497; 423/498; 568/841; 526/123.1; 526/124.3
[58] Field of Search .......... 526/125, 124.3, 526/123.1; 502/111, 104, 112, 115, 118, 119, 134, 172; 264/9; 423/497, 498, 499; 568/841, 851

[56] References Cited

U.S. PATENT DOCUMENTS

| 3,135,809 | 6/1964 | Bosmaiian | 502/114 X |
| 4,105,585 | 8/1978 | Matheson | 502/111 |
| 4,312,968 | 1/1982 | Dietz | 526/125 |
| 4,329,256 | 5/1982 | Rust et al. | 252/429 B |
| 4,418,184 | 11/1983 | Ueda et al. | 526/125 |
| 4,497,904 | 2/1985 | Blaya et al. | 502/226 X |
| 4,499,194 | 2/1985 | Harada et al. | 502/226 X |
| 4,673,661 | 6/1987 | Lofgren et al. | 502/111 |
| 4,710,482 | 12/1987 | Job | 526/125 X |
| 4,721,763 | 1/1988 | Bailly et al. | 526/88 |
| 4,820,672 | 4/1989 | Mehta | 502/115 |
| 4,849,389 | 7/1989 | Nowlin et al. | 502/111 X |
| 4,855,371 | 8/1989 | Job | 526/125 X |
| 4,959,427 | 9/1990 | Furuhashi et al. | 526/143 |
| 4,972,034 | 11/1990 | Matsuura et al. | 526/125 |
| 4,981,930 | 1/1991 | Funabashi et al. | 526/142 |
| 4,990,477 | 2/1991 | Kioka et al. | 502/107 |
| 5,028,671 | 7/1991 | Kioka et al. | 526/125 |
| 5,075,396 | 12/1991 | Kashiwa et al. | 526/125 |

FOREIGN PATENT DOCUMENTS

| 0297076 | 12/1988 | European Pat. Off. . |
| 0297076 | 12/1988 | European Pat. Off. . |
| 0300638 | 1/1989 | European Pat. Off. . |
| 0319913 | 6/1989 | European Pat. Off. . |
| 0322798 | 7/1989 | European Pat. Off. . |
| 0353319 | 2/1990 | European Pat. Off. . |
| 0360491 | 3/1990 | European Pat. Off. . |
| 0419116 | 3/1991 | European Pat. Off. . |
| 0415588 | 3/1991 | European Pat. Off. . |
| 0415704 | 3/1991 | European Pat. Off. . |
| 0455813 | 11/1991 | European Pat. Off. . |
| 0461268 | 12/1991 | European Pat. Off. . |
| 2404648 | 6/1979 | France . |
| 56-155205 | 12/1981 | Japan . |
| 57-205406 | 12/1982 | Japan . |
| 2183244 | 6/1987 | United Kingdom . |

*Primary Examiner*—Fred Teskin
*Attorney, Agent, or Firm*—Oblon, Spivak, McClelland, Maier & Neustadt, P.C.

[57] ABSTRACT

A solid product as a catalyst component for an olefin polymerization catalyst is obtained by the reaction of metallic magnesium, an alcohol, and a halogen in an amount ranging from 0.019 to 0.06 gram-atom per one mole of metallic magnesium. Alternatively, the halogen component is a halogen-containing compound which contains not less than 0.0001 gram-atom of a halogen atom per one gram-atom of metallic magnesium.

18 Claims, 6 Drawing Sheets

5,556,820

1

CATALYST COMPONENT FOR OLEFIN POLYMERIZATION AND PROCESS FOR PRODUCING POLYOLEFINS

CROSS-REFERENCE TO RELATED APPLICATIONS

This application is a Continuation-in-Part of application Ser. No. 07/743,310, filed Aug. 27, 1991, abandoned, which was filed as International Application No. PCT/JP90/01709 on Dec. 26, 1990; and Ser. No. 07/972,488, filed Feb. 17, 1993, abandoned, which was filed as International Application No. PCT/JP92/00765 on Jun. 16, 1992; and Ser. No. 07/971,976, filed Feb. 24, 1993, abandoned, which was filed as International Application No. PCT/JP92/00806 on Jun. 24, 1992; and Ser. No. 07/977,392, filed Mar. 1, 1993, abandoned, which was filed as International Application No. PCT/JP92/00805 on Jun. 24, 1992.

BACKGROUND OF THE INVENTION

1. Field of the Invention

The present invention relates to a catalyst component for olefin polymerization and also to a process for producing polyolefins.

2. Description of the Background

The polymerization of olefins is accomplished by the aid of a catalyst generically called a Ziegler-type catalyst. In general, it consists of two components. One component is a transition metal compound and the second component is an organometallic compound. The transition metal compound is conventionally prepared by the use of a solid carrier such as magnesium chloride and magnesium dialkoxide. There has been a variety of related technologies.

The magnesium compound to be used as a solid carrier of the catalyst for olefin polymerization should have an optimum particle diameter so that the catalyst has an improved activity and the resulting polymer has a controlled particle diameter. To this end, the solid carrier is prepared by grounding a magnesium compound alone or in combination with an ester. The preparation of the solid carrier involves mechanical grinding as an essential procedure. Without this grinding procedure, the solid carrier does not contribute to the improved polymerization activity. Moreover, the solid carrier supports such a small amount of transition metal (.e.g., titanium) that the catalyst is poor in productivity per unit weight. Low productivity gives rise to a large amount of residual chlorine in the polymer and poses a problem associated with the particle shape and particle size distribution of the polymer. (Inadequate polymer particles cause troubles in polymer processing such as transfer line clogging with fine polymer powder.) Therefore, the grinding procedure is recognized as very important, and a great deal of works and expense have been spent to establish the best conditions for the grinding system (wet or dry), grinding machine, grinding intensity, and grinding time.

On the other hand, several methods proposed have been for the improvement of polymer morphology (particle diameter and shape). According to one method, magnesium is supported on an inorganic oxide such as silica. (See Japanese Patent Laid-open Nos. 291604/1986, 291105/1986, 119203/1987, and 119204/1987.) According to another method, a magnesium compound is dissolved in an alcohol or the like and then caused to separate out before being used as a carrier. (See Japanese Patent Laid-open Nos. 811/1981). These methods obviate the grinding process but require the complicated steps of supporting, dissolution, and separation, which have an adverse effect on the stable performance of the catalyst.

In view of the foregoing, the present inventors carried out research, which has led to the finding that a reaction product of metallic magnesium, an alcohol, and a specific amount of halogen has such a narrow particle size distribution that it can be used as such (without particle size adjustment by grinding) as a carrier of the catalyst for olefin polymerization. This carrier is comparable to or superior to conventional ones in ability to support titanium, polymerization activity, and stereoregulatory. In addition, not only does it give rise to a polymer having greatly improved morphology, but it also permits the control of polymer morphology if proper conditions are established for the reaction of metallic magnesium, alcohol, and halogen.

The carrier in the present invention is entirely different from any known magnesium-based carrier. It is a reaction product of metallic magnesium, an alcohol, and a specific amount of halogen. A method is known in which a small amount of iodine (or ethyl orthoformate) is added to the reaction of metallic magnesium with an alcohol. (See Japanese Patent Publication No. 7093/1971 and U.S. Pat. No. 3,657,361) In this process, however, iodine is used in a very small amount merely as a reaction initiator. By contrast, in the process according to the present invention, halogen is used in a much greater amount than is used as an initiator. This indicates that the reaction product in the present invention is entirely different from that disclosed in the prior art.

It is pointed out that in olefin polymerization using a Ziegler catalyst, slurry polymerization, solution polymerization, gas phase polymerization and the like are used for homopolymerization or copolymerization of ethylene. Of these, gas phase polymerization wherein polymerization is carried out substantially in the absence of liquid phase, is advantageous for ethylene polymerization since it does not require a large amount of solvent, leading to simplification of the process and cost effectiveness. Thus, the gas phase polymerization has been recently studied in ethylene polymerization using the Ziegler type catalyst.

However, in the case of using these magnesium compounds as a carrier material for a polymerization catalyst for olefins such as ethylene, it is necessary to use magnesium compounds having optimized particle size in order to improve catalyst activity and to control particle size of the resultant polymers. In this case, to control particle size, the magnesium compounds themselves are ground, or non-ground magnesium compounds are co-ground with esters when treated with the esters. In any case, a mechanical grinding, classification of the like is required.

When a carrier material which has not been subject to such grinding treatment, is used, the resultant catalysts have poor polymerization activity and the yield or productivity per unit catalyst decreases due to a small amount of transition metal (e.g., titanium) carried on a carrier. This causes a problem in that a large amount of chlorine may remain in the resultant polymers. Further, there may be a problem in that the resultant polymers may have undesirable shape and undesirable particle size distribution. Also, problems (e.g., clogging of transfer lines due to a large amount of micro-powders of the polymer generated) may occur during the process step of producing polyolefins such as an ethylene polymer.

Accordingly, the grinding step for the magnesium compounds is considered quite important. However, the mechanical grinding step requires much labor and costs even when only its condition determination is considered (e.g., a grinding system such as a wet type or dry type, grinding equipment, grinding strength, grinding time, which affect the shape of the ground products).

Further, in order to improve the morphology of the resultant polymers such as particle size and shape, several methods are known. Such methods include a method using magnesium carried on an inorganic oxide such as silica (Japanese Patent Application Unexamined Publication Nos. Sho 55-120,608; and 58-277,055); and a method using a product obtained by once dissolving a magnesium compound in a solvent such as alcohol and then again precipitating it (JP Pat. Appln. Unexamined Pub. No. 56-000,811). In these methods, the grinding step is not required. However, these methods require carrier treatment or dissolution/precipitation treatment resulting in extremely complicated steps and may give rise to poor stability of the catalyst performance.

Accordingly, it is desired to provide a method of controlling particle size, particle size distribution and shape of a carrier useful for an olefin polymerization catalyst, without using complicated procedures such as mechanical grinding and classification.

Further, as mentioned above, in particular, in the homopolymerization or copolymerization of ethylene using the Ziegler type catalyst, the gas phase polymerization wherein polymerization is carried out substantially in the absence of liquid phase, i.e., under gas phase conditions, has been recently studied. In the gas phase polymerization, controlling of shape of the resultant polymer particles is an important technical factor to prevent adhesion of the polymer particles to an inner wall of a reactor and clogging of transfer lines due to enlarged or agglomerated polymer particles, to stabilize the gas phase polymerization reaction.

On the other hand, pre-polymerization wherein a catalyst component is preliminarily treated with a small amount of olefin, has been attempted to keep the shape (particle size, particle size distribution) of the polymer particles at good level. For example, in Japanese published Patent Application No. Sho 55-029,512, it is proposed that a solid catalyst is preliminarily contacted with 1 to 500 grams of alpha-olefin per 1 gram of the catalyst. This technique has certain advantages. However, in this process, when hydrogen is used as molecular weight controlling agent, a problem which occurs is that the generation of micro-powders increases.

For this reason, in the gas phase polymerization of ethylene, it has heretofore been desired to provide a method capable of restricting generation of micro-powders even when hydrogen is used as molecular weight controlling agent, as well as capable of controlling particle size, particle size distribution and shape of a carrier useful for a polymerization catalyst, without using complicated procedures such as mechanical grinding and classification. Such method result in improvement of morphology, such as particle size, particle size distribution and shape, of the resultant polymer.

Further, a highly active catalyst has a problem in that when the catalyst as such is introduced into a polymerization reactor and exposed to high temperatures near polymerization temperature, the activity and the stereoregularity of the resultant polymer become insufficient, and the catalyst adheres to the reactor wall.

As a method of solving the above problems, a catalyst is subjected to polymerization treatment with a small amount of alpha-olefin. This is so called pre-polymerization. This pre-polymerization is usually performed in the slurry state with a diluting solvent in a stirring vessel.

However, if the amount of treatment for the pre-polymerization is increased, a problem which occurs is that the volume of the stirring vessel should be drastically increased, leading to poor cost performance of facilities. In addition, as a method of solving the disadvantages, an increase in slurry concentration has been considered. However, stirring cannot be sufficiently effected for highly concentrated slurries under the usual stirring conditions. Thus, catalyst performance decreases due to local heat generation, and the activity and the stereo-regularity of the resultant polymer become insufficient. On the other hand, when the slurry concentration is kept at a low level, a longer pre-polymerization time is required to obtain a prescribed amount of prepolymerization, resulting in a drastic decrease in activity.

It is desired to provide a method which is capable of performing pre-polymerization at high slurry concentration.

For this reason, in the production of polyolefins using a solid catalyst component, it has heretofore been desired to provide a method which is capable of performing pre-polymerization at high slurry concentration.

In view of these current situations, the present inventors have intensively studied the production of spherical catalyst carrier materials having controlled particle size and particle size distribution in one step reaction. As a result, it has been found that a solid product useful as a catalyst carrier material for olefin polymerization, having narrow particle size distribution, can be obtained by reacting metallic magnesium, alcohol and a specific amount of halogen and/or a halogen-containing compound, without using particle size control treatment such as grinding or classification. It has also been found that when olefin polymerization is carried out using an olefin polymerization catalyst component comprising the solid product as a carrier, the catalyst shows a titanium carrying ability and polymerization activity which are better or equivalent to those of a conventional catalyst, and the resultant polymers have drastically improved morphology and better or equivalent stereo-regularity to that of a contentional polymer. Further, the present inventors have found that the particle size of the resultant solid catalyst can be freely controlled by appropriately selecting the conditions for the reaction of metallic magnesium, alcohol and a halogen-containing compound.

Further, the present inventors have found that the generation of micro-powders of the polymer can be prevented even when hydrogen is used as a molecular weight controlling agent by way of a method of preparing a solid catalyst component for ethylene polymerization using, as a carrier, a solid product obtained by the reaction of the above metallic magnesium, alcohol and a specific amount of halogen and/or halogen-containing compound, further subjecting this material to a pre-polymerization treatment, and then subjecting the solid catalyst component to a contact treatment with at least one kind of gas selected from carbon monoxide and carbon dioxide, or a mixed gas of such gas and an inert gas. It has also been found that this method is particularly effective in gas phase polymerization.

Further, the present inventors have studied the preparation of polymers having improved morphology, particularly pre-polymerization at high slurry concentration. As a result, it has been found that effective pre-polymerization treatment can be performed even at high slurry concentration if a specific stirring wing and stirring conditions are used for pre-polymerization treatment using the solid catalyst component (A), when polyolefin is produced using the solid catalyst component (A).

Finally, thermoplastic elastomers are widely used, particularly as substitutes for vulcanized rubbers, as automobile parts, industrial machine parts, electronic or electric parts, building materials, and the like as energy saving or natural resource saving type elastomers.

Thermoplastic olefin elastomers (TPO) are generally manufactured by a process wherein polypropylene and ethylene-propylene-diene rubber (EPDM) are kneaded in the presence of a peroxide (e.g., Japanese Patent Laid-open (ko-kai) No. 217747/1986). The process, however, has drawbacks in that the procedure is complicated and the production cost is high.

On the other hand, a number of trials have been undertaken for the reduction of production costs by directly manufacturing at the polymerization step high molecular weight polymers having the same dynamic characteristics as those of the above-mentioned TPO. For example, propylene-hexane copolymers (e.g., Japanese Patent Laid-open (ko-kai) No. 53983/1974 and Japanese Patent Publication (ko-kai) No. 19444/1987), elastic polypropylene (Japanese Patent Laid-open (ko-kai) No. 179247/1986), and the like have been proposed.

However, all these high molecular weight polymers have insufficient low temperature characteristics. Although a propylene/ethylene-propylene two step polymerization method has been well known (e.g., Japanese Patent Laid-open (ko-kai) No. 50804/1982) as a method for improving the low temperature characteristics of polypropylene, it has been difficult to manufacture a vulcanized rubber-like polymer possessing both flexibility and a tension strength resistible for practical use by this method.

SUMMARY OF THE INVENTION

Accordingly, one object of the present invention is to provide an improved catalyst carrier for olefin polymerization, and also to provide a solid catalyst component based on it and to a process for producing polyolefins.

The present invention in its first aspect embodies a solid product which is useful for the preparation of a solid catalyst component (a) for olefin polymerization, which is obtained by the reaction of metallic magnesium, an alcohol, and a halogen in an amount more than 0.0001 gram-atom for 1 mol of the metallic magnesium. Another embodiment is a solid catalyst composition composed of solid product (a), (b) a titanium compound, and (c) an optional electron donor compound.

An embodiment of the first aspect is an olefin polymerization in the presence of a catalyst comprising a solid catalyst component (A) containing solid product (a), (b) a titanium compound and (c) an optional electron donor compound, (B) an organometallic compound and (C) an optional electron donor compound.

In the second aspect of the invention an object is to provide a carrier material useful for an olefin polymerization catalyst, a solid catalyst component which employs the carrier material and a process for producing polyolefins.

In the second aspect of the invention a solid product useful in the preparation of a solid catalyst component is provided for olefin polymerization, which is obtained by the reaction of metallic magnesium, alcohol and a halogen-containing compound, preferably a halogen-containing metal compound, containing not less than 0.0001 gram-atom of a halogen atom, per 1 gram-atom of the metallic magnesium.

Further, the present invention provides a solid product (a) which has a sphericity (S) of less than 1.60 as defined by the following Formula (1):

$$S=(E_1/E_2)^2 \qquad (1)$$

wherein $E_1$ denotes the projected perimeter of a particle, and $E_2$ denotes the perimeter of the circle of equal projected area of a particle, and a particle size distribution index (P) of less than 5.0 as defined by the following Formula (2):

$$P=D_{90}/D_{10} \qquad (2)$$

wherein $D_{90}$ denotes the particle diameter corresponding to a cumulative weight fraction of 90%, (In other words, the commutative sum of the weight of particles smaller than the particle diameter defined by $D_{90}$ accounts for 90% of the total weight of all the particles.) $D_{10}$ denotes the particle diameter corresponding to a cumulative weight fraction of 10%.

Further, in the second aspect of the invention a process is provided for producing the solid product in a vessel, which has a stirring wing fixed to a stirring axle placed in the center of the stirring vessel, the stirring wing comprising a bottom paddle wing located close to the bottom of the vessel and an upper wing located higher than the bottom paddle wing, and during a polymerization the stirring wing satisfying the following equation:

$$H/L>0.5$$

wherein H is height between the bottom of the vessel and the most upper portion of the upper wing; and L is liquid level during a reaction, and the most upper portion of the bottom paddle wing being located lower than the liquid level.

Further, the present invention provides a process for producing a solid product in a vessel, which employs a stirring wing fixed to a stirring axle placed in the center of the stirring vessel, and the stirring is conducted under stirring conditions which satisfy the following equation:

$$4.3\times10^3<n^3d^2<4.0\times10^6$$

wherein d (m) is a diameter of the stirring wing, and n (rpm) is the rotation rate.

Further, in the second aspect of the present invention a solid catalyst composition is provided which is prepared from (a) a solid product or the solid product prepared by the above process; and (b) a titanium compound. Optionally, an electron donor compound (c) can also be employed.

Still further in the second aspect of the present invention a process is provided for producing a polyolefin which employs as a catalyst (A) a solid catalyst composition prepared from (a) a solid product or the solid product prepared by the above process and (b) a titanium compound; and (B) an organoaluminum compound. Optionally, an electron donor compound (c) can be employed to prepare component (A) and also may be added as a component (C) with components (A) and (B).

Further, the present invention provides a process for producing a polyolefin, wherein the resultant polyolefin powder has a sphericity (S) defined by the above Formula (1) of smaller than 1.60; and a particle size distribution index (P) defined by the above Formula (2) of smaller than 5.0.

In a third aspect of the invention, an object is to provide a solid catalyst composition useful for olefin polymerization and a process for producing polyolefins.

Another object of the third aspect is to provide a process for producing a homopolymer or copolymer of ethylene using this catalyst by gas phase polymerization, and a pre-polymerization method which can be suitably used for this gas phase polymerization method.

Still another object of the third aspect is to provide a process for producing polyolefins using this solid catalyst composition and a pre-polymerization treatment.

In the first embodiment of the third aspect an ethylene polymer is produced by gas phase polymerization of ethylene alone or gas phase polymerization of ethylene and another alpha-olefin using at least the following compounds (A) and (B):

(A) a solid catalyst component prepared from at least (a) a solid product obtained by the reaction of metallic magnesium, alcohol and at least 0.0001 gram-atom, per 1 gram-atom of the metallic magnesium, of halogen or a halogen-containing compound containing at least 0.0001 gram-atom, per one gram-atom of the metallic magnesium, of a halogen atom, and (b) a titanium compound; and (B) an organometallic compound.

In the second embodiment of the third aspect an ethylene polymer is produced by homopolymerization of ethylene or copolymerization of ethylene and another alpha-olefin using at least the following compounds (A) and (B):

(A) a solid catalyst component prepared from at least (a) a solid product obtained by the reaction of metallic magnesium, alcohol and at least 0.0001 gram-atom, per one gram-atom of the metallic magnesium, of halogen or a halogen-containing compound containing at least 0.0001 gram-atom, per one gram-atom of the metallic magnesium, of a halogen atom, and (b) a titanium compound; and (B) an organometallic compound, wherein the solid catalyst component (A) has been contacted with a small amount of olefin to form 0.1 to 100 grams, per one gram of the solid catalyst component (A), of an olefin polymer, and then contacted with at least one kind of gas selected from carbon monoxide and carbon dioxide, or a mixed gas of such gas and an inert gas.

In this case, the above-mentioned solid product (a) preferably has a sphericity (S) of smaller than 1.60, more preferably less than 1.40 as defined by Formula (1) above, and a particle size distribution index (P) of less than 5.0, more preferably less than 4.0 as defined by Formula (2) described above.

Further, the above solid product (a) may preferably be one which gives an X-ray diffraction spectrum (by Cu-Kα line) in which three intense peaks appear within the scattering angle of 5°–20°, with the ratio of the peak intensity b/c being greater than 0.4, where peaks are designated as a, b, and c starting from the low scattering angle side.

Further, the present invention provides a solid catalyst composition in the third and fourth embodiments which is obtained by the reaction of at least:

(a) a solid product obtained by the reaction of metallic magnesium, alcohol and at least 0.0001 gram-atom, per one gram-atom of the metallic magnesium, of halogen or a halogen-containing compound containing at least 0.0001 gram-atom, per one gram-atom of the metallic magnesium, of a halogen atom, and (b) a titanium compound, said reaction being carried out under the following conditions (1) or (2).

(1) Stirring is conducted using a stirring wing fixed to a stirring axle placed in the center of the stirring vessel, the stirring wing comprising a bottom paddle wing located close to the bottom of the vessel and an upper wing located higher than the bottom paddle wing, and during a reaction the stirring wing satisfying the following equation:

$$H/L>0.5$$

wherein H is height between the bottom of the vessel and the most upper portion of the upper wing; and L is the liquid level during a reaction, and the most upper portion of the bottom paddle wing being located lower than the liquid level.

(2) Stirring is conducted using a stirring wing fixed to a stirring axle placed in the center of a stirring vessel, under stirring conditions which satisfy the following equation:

$$4.3 \times 10^3 < n^3 d^2 < 4.0 \times 10^6$$

wherein d (m) is a diameter of the stirring wing; and n (rpm) is the rotation rate.

Further, in the third aspect of the invention a solid catalyst composition (fifth and sixth embodiments) is provided which is obtained using the above-mentioned conditions (1) or (2) when the solid product as mentioned in the third and fourth embodiments is prepared.

Further, the present invention provides a process (seventh embodiment) for producing ethylene polymers as mentioned in the first or second embodiments wherein the solid catalyst component is the solid catalyst composition as mentioned in the above third to sixth embodiments.

Further, the present invention provides a process (eighth and ninth embodiments) for producing polyolefins using the solid catalyst composition as mentioned in the third to sixth embodiments, wherein a solid catalyst composition is preliminary subjected to polymerization treatment with a small amount of olefin, in a stirring vessel under the above-mentioned conditions (1) or (2).

In the fourth aspect of the present invention, a process for manufacturing an olefin polymer is provided which not only possesses a tension strength resistible for practical use, satisfactory flexibility, sufficient low temperature characteristics, and low surface tackiness, even in an unvulcanized state, but also can be manufactured at low production costs and which exhibits an excellent powder flowability.

Briefly, in the fourth aspect, an olefin is polymerized in a solvent free polymerization in the presence of a catalyst system comprising:

(A) a solid catalyst component obtained by the reaction, either in the presence or absence of an electron donating compound, of (a) a solid product obtained by reacting metallic magnesium, an alcohol, and a halogen atom in an amount of 0.0001 gram-atom or greater for one gram-atom of said metallic magnesium or a halogen-containing compound, which contains a halogen atom in an amount of 0.0001 gram-atom or greater for one gram-atom of said metallic magnesium, and (b) a halogenated titanium compound;

(B) an organoaluminum compound;

(C) an alkoxy group-containing aromatic compound represented by the following formula:

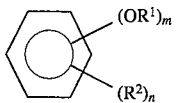

wherein $R^1$ is an alkyl group having 1–20 carbon atoms, $R^2$ is a hydrocarbon group having 1–10 carbon atoms, a hydroxy group, or a nitro group, m is an integer of 1–6, an n is 0 or an integer 1 to (6-m); and (D) an electron donating compound.

In this case, a solid component (E) may be composed by the above solid catalyst component (A) and a crystalline polyolefin, and a catalyst system comprising this solid component (E) and the above components (B), (C), and (D) may also be used.

BRIEF DESCRIPTION OF THE DRAWINGS

FIG. 4 is a schematic view which explains the third to ninth embodiments of the third aspect of the invention;

DETAILED DESCRIPTION OF THE PREFERRED EMBODIMENTS

Figure 1:
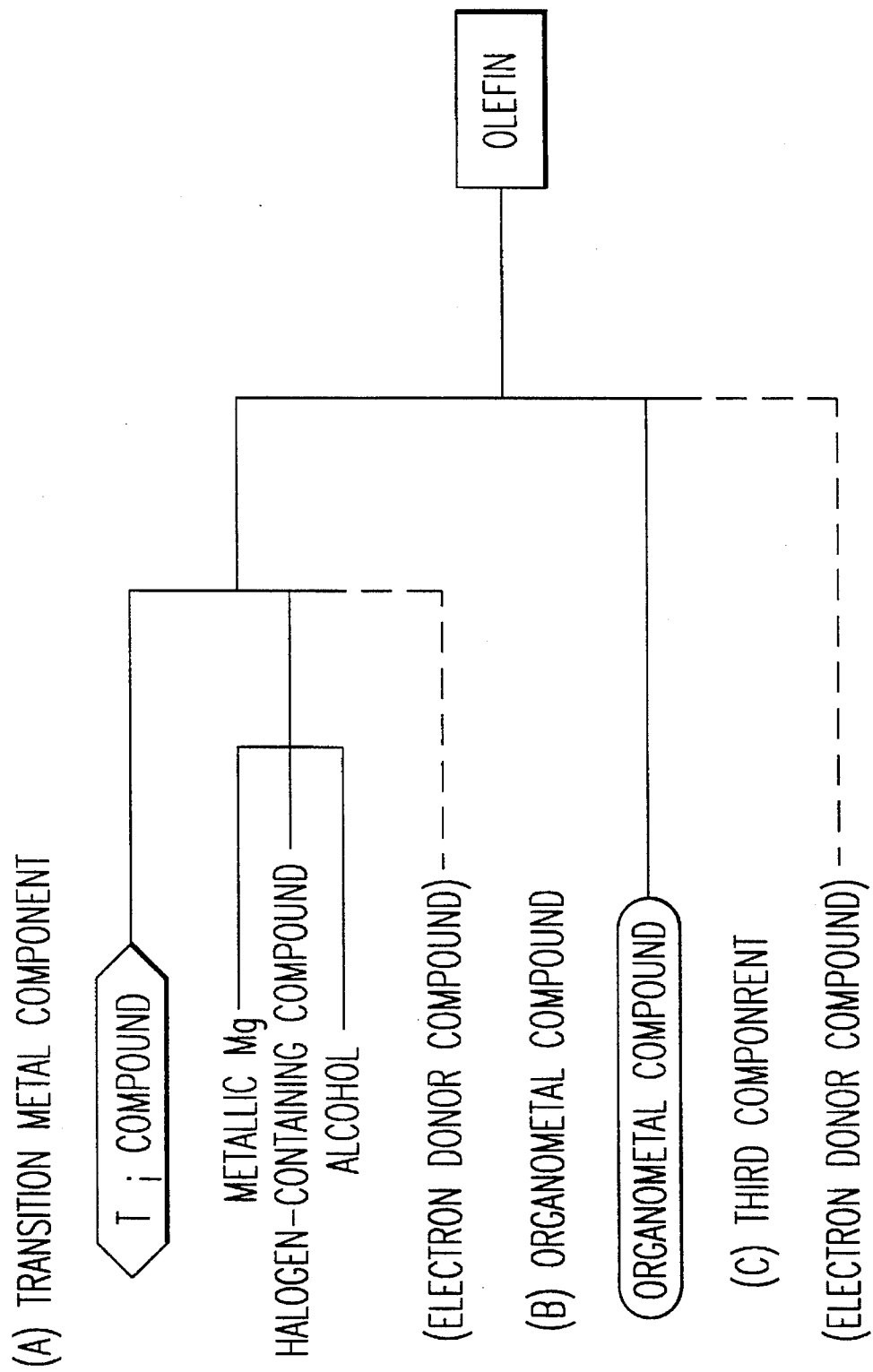
FIG. 1 is a flow chart showing a production process according to the present invention, and the first embodiment of the third aspect of the invention.

The first aspect of the invention will be described in more detail in the following.

In the first aspect of the invention, the above-mentioned solid product (a) has a sphericity (S) smaller than 1.60 as defined by the formula (1) below and a particle size distribution index (P) smaller than 5.0 as defined by the formula (2) below.

$$S=(E_1/E_2)^2 \quad (1)$$

(where $E_1$ denotes the projected perimeter of a particle, and $E_2$ denotes the perimeter of the circle of equal projected area of a particle.)

$$P=D_{90}/D_{10} \quad (2)$$

(where $D_{90}$ denotes the particle diameter corresponding to a cumulative weight fraction of 90%, and $D_{10}$ denotes the particle diameter corresponding to a cumulative weight fraction of 10%.)

The solid product having the specific sphericity and particle size distribution index as defined above will be useful as a catalyst carrier so long as it is one which is obtained by the reaction of at least metallic magnesium and an alcohol.

In addition, the solid product should preferably be one which gives an X-ray diffraction spectrum (by Cu Kα line) in which three intense peaks appear within the scattering angle of 5°–20°, with the ratio of the peak intensity b/c being greater than 0.4, where peaks are designated as a, b, and c starting from the low scattering angle side.

The process for polyolefin production as mentioned above gives rise to a polyolefin powder having a sphericity (S) greater than 1.6 (as defined by the formula (1) above) and a particle size distribution index (P) greater than 5.0 (as defined in the formula (2) above).

The solid product (a) used in catalyst preparation in the present invention is obtained from metallic magnesium, an alcohol, and a halogen, or, in some aspects, a halogen-containing compound.

The metallic magnesium may be in any form, such as granule, ribbon, and powder. Also, the metallic magnesium should preferably be free of magnesium oxide film covering it, although no specific restrictions are placed on its surface state.

The alcohol is not specifically limited; but it should preferably be a lower alcohol having 1–6 carbon atoms. Ethanol is most desirable, because it gives a solid product which greatly improves the catalyst performance. The alcohol may have any purity and water content which are not specifically limited. It is desirable, however, that the water content should be lower than 1%, preferably lower than 2000 ppm, because excess water in the alcohol forms magnesium hydroxide [$Mg(OH)_2$] on the surface of metallic magnesium. Moreover, the water content should preferably be as low as possible, usually lower than 200 ppm, so that the resulting product (a) has a good morphology.

The halogen is not specifically restricted in its kind. Chlorine, bromine, and iodine can be used, with iodine being preferable. The halogen may be used in any form and state. For example, it may be used in the form of solution in an alcohol (e.g., ethanol).

In the second to fourth aspects of the invention in the preparation of solid product (a) a halogen-containing compound can also be employed as a component. Suitable examples of halogen-containing compounds include $MgCl_2$, $MgI_2$, $Mg(OEt)Cl$, $Mg(OEt)I$, $MgBr_2$, $CaCl_2$, $NaCl$ and $KBr$. Of these compounds, $MgCl_2$ and $MgI_2$ are particularly desirable. One or more halogen-containing components may be used alone or in combination.

The halogen-containing compounds may be used in any form and state, and may have any particle size. For example, it may be used in the form of solution in an alcohol type solvent such as ethanol. Moreover, the particle size of the solid product (a) may be freely controlled by reacting an appropriate amount of halogen-containing compound.

The amount of the alcohol is not specifically limited; however, it usually ranges from 2 to 100 mol, preferably from 5 to 50 mol, for one mol of the metallic magnesium. An excess amount of alcohol lowers the yield of the solid product (a) having a good morphology. With too small an amount of alcohol, it is difficult to carry out smooth stirring in the reaction vessel. The above-mentioned molar ratio is not limitative.

The halogen should be used in an amount of at least 0.0001 gram-atom, preferably at least 0.0005 gram-atom, most preferably at least 0.001 gram-atom, per one gram-atom of the metallic magnesium. Further, the halogen-containing compounds should be used in an amount of at least 0.0001 gram-atom, preferably at least 0.0005 gram-atom, most preferably at least 0.001 gram-atom, per one gram-atom of the metallic magnesium. At amounts less than 0.0001 gram-atom, such amounts cannot distinguish the solid product from a reaction initiator. Without grinding, the solid product (a) exhibits poor supporting capacity, catalytic activity, stereoregularity, and ability to form a polymer having a good morphology.

In the present invention, the halogen or the halogen-containing compounds can be used alone or in any combination. In addition, the halogen and the halogen-containing compounds can be used in combination. In the case of using the halogen and the halogen-containing compound together, the total amount of halogen atom may be at least 0.0001 gram-atom, preferably at least 0.0005 gram-atom, more preferably at least 0.001 gram-atom, per 1 gram-atom of the metallic magnesium.

The amount of the halogen and/or halogen-containing compound has no upper limit so long as the desired solid product (a) is obtained. An adequate amount is usually less than 0.06 gram-atom. It is necessary to select an adequate amount of halogen in order to control the particle diameter of the solid product (a), which can freely be controlled.

The reaction of metallic magnesium, alcohol, and halogen may be carried out by any known method involving the refluxing (at about 79° C.) which lasts (for usually 20–30 hours) until the reaction system does not evolve hydrogen gas any longer. For example, a first method consists of adding iodine (in solid form) to an alcohol containing metallic magnesium and reacting them under refluxing by heating; a second method consists of adding an alcohol solution of iodine dropwise to an alcohol containing metallic magnesium while keeping the latter hot.

Regardless of the method selected, the reaction should preferably be carried out in an inert gas atmosphere (such as nitrogen and argon) and, if necessary, in the presence of an inert organic solvent (such as n-hexane and other saturated hydrocarbons).

It is not necessary to place the metallic magnesium, alcohol, and halogen or halogen-containing compound all at once in the reaction vessel; but it is possible to place them by portions in the reaction vessel. It is desirable to place all of the alcohol in the reaction vessel at the beginning and then to add metallic magnesium by portions several times. This procedure prevents the reaction system from evolving hydrogen gas in a large amount at one time and hence ensures safety and permits the use of a smaller reaction vessel, without the partial loss of alcohol and halogen by splashing. The number of portions should be properly determined according to the size of the reaction vessel; but it is usually 5 to 10 to avoid unnecessary complexity.

The reaction may be carried out batchwise or continuously. There is a modified method which consists of repeating the steps of adding a small portion of metallic magnesium to as much alcohol as necessary placed in a reaction vessel and removing the reaction product.

The thus obtained solid product is used for the synthesis of a solid catalyst composition after drying or after filtration and washing with an inert solvent such as heptane. In either case, the solid product (a) can be used as such without necessity for grinding or classification for a desired particle size distribution.

The solid product (a) is almost spherical and has a sharp particle size distribution, with individual particles varying very little in sphericity. In this case, the solid product may preferably be composed of particles which have a sphericity (S) (as defined by Formula (I) above) of smaller than 1.60, preferably smaller than 1.40 and a particle size distribution index (P) (as defined by Formula (2) above) of smaller than 5.0, preferably smaller than 4.0.

As used herein, $D_{90}$ denotes the particle diameter corresponding to a cumulative weight fraction of 90%. In other words, the cumulative sum of the weight of particles smaller than the particle diameter defined by $D_{90}$ accounts for 90% of the total weight of all the particles. $D_{10}$ is defined in the same way.

Further, the above-mentioned solid product (a) preferably has a sphericity (S) (as defined by Formula (a) above) of smaller than 1.60.

Furthermore, the solid product (a) may preferably be one which gives an X-ray diffraction spectrum (by Cu-Kα line) in which three intense peaks appear within the scattering angle of 5°–20°, with the ratio of the peak intensity b/c being greater than 0.4, where peaks are designated as a, b, and c starting from the low scattering angle side.

The solid product suitable for use as the catalyst carrier should be one which is produced from at least an alcohol and metallic magnesium or a magnesium compound represented by RMgR' (where R and R' are the same or different alkyl groups) and which has the sphericity (S) (as defined by the formula (2) above) smaller than 5.0.

The titanium compound (b) used in the present invention may be selected from any titanium compound which is represented by the formula:

$$TiX_n(OR)_{4-n}$$

wherein X denotes a halogen atom, particularly a chlorine atom; R denotes a $C_{1-10}$ hydrocarbon, particularly a linear or branched alkyl group, with two or more R's being the same or different; and n is an integer of 0 to 4.

Suitable examples of the titanium compound include Ti(O—i—$C_3H_7$)$_4$, Ti(O—$C_4H_9$)$_4$, TiCl(O—$C_2H_5$)$_3$, TiCl(O—i—$C_3H_7$)$_3$, TiCl(O—$C_4H_9$)$_3$, TiCl$_2$(O—$C_4H_9$)$_2$, TiCl(O—i—$C_3H_7$)$_2$, and TiCl$_4$.

According to the present invention, the solid catalyst component may contain an optional electron donor compound (c), which is usually an organic compound containing oxygen, nitrogen, phosphorus, or sulfur. Examples of the electron donor compound include amines, amides, ketones, nitriles, phosphines, phosphoramides, esters, ethers, thioethers, alcohols, thioesters, acid anhydrides, acid halides, aldehydes, organic acids, organosilicon compounds containing Si—O—C linkages, and organosilicon compounds containing alkoxyl groups. Specific examples are listed below.

Aromatic carboxylic acids such as benzoic acid and p-oxybenzoic acid; acid anhydrides such as succinic anhydride, benzoic anhydride, and p-toluic anhydride; ketones having 3–15 carbon atoms such as acetone, methyl ethyl ketone, methyl isobutyl ketone, acetophenone, benzophenone, and benzoquinone; aldehydes having 2–15 carbon atoms such as acetaldehyde, propionaldehyde, octyl aldehyde, benzaldehyde, and naphthaldehyde; esters having 2–18 carbon atoms such as methyl formate, ethyl formate, methyl acetate, ethyl acetate, vinyl acetate, propyl acetate, octyl acetate, cyclohexyl acetate, ethyl propionate, methyl butyrate, ethyl butyrate, ethyl valerate, methyl chloroacetate, ethyl dichloroacetate, methyl methacrylate, ethyl crotonate, ethyl pivalate, dimethyl maleate, ethyl cyclohexanecarboxylate, methyl benzoate, ethyl benzoate, propyl benzoate, butyl benzoate, methyl toluate, ethyl toluate, amyl toluate, ethyl ethylbenzoate, methyl anisate, ethyl anisate, ethyl ethoxybenzoate, ethyl p-butoxybenzoate, ethyl o-chlorobenzoate, ethyl naphthoate, γ-butyrolactone, δ-valerolactone, coumarin, phthalide, and ethylene carbonate; and mono- and di-esters of aromatic dicarboxylic acids such as monomethyl phthalate, dimethyl phthalate, monomethyl terephthalate, dimethyl terephthalate, monoethyl phthalate, diethyl phthalate, monoethyl phthalate, diethyl terephthalate, monopropyl phthalate, dipropyl phthalate, monopropyl phthalate, dipropyl terephthalate, monobutyl phthalate, dibutyl phthalate, monobutyl terephthalate, dibutyl terephthalate, monoisobutyl phthalate, diisobutyl phthalate, monoamyl phthalate, diamyl phthalate, monoisoamyl phthalate, diisoamyl phthalate, ethyl butyl phthalate, ethyl isobutyl phthalate, and ethyl propyl phthalate.

Acid halides having 2–20 carbon atoms, with the acyl group being an aliphatic mono- to trivalent acyl group having 2–20 carbon atoms or an aromatic alkaryl or aralkyl mono- to trivalent acyl group having 7–20 carbon atoms, and with the halogen being chlorine or bromine, preferably chlorine. Examples of acid halides that can be used in the present invention are listed below.

Acetyl chloride, acetyl bromide, propionyl chloride, butyryl chloride, isobutyryl chloride, 2-methylpropionyl chloride, valeryl chloride, isovaleryl choride, hexanoyl chloride, methylhexanoyl chloride, 2-ethylhexanoyl chloride, octanoyl chloride, decanoyl chloride, undecanoyl chloride, hexadecanoyl chloride, octadecanoyl chloride, benzylcarbonyl chloride, dichlorohexanecarbonyl chloride, malonyl dichloride, succinyl dichloride, pentanedioyl dichloride, hexanedioyl dichloride, dichlorohexanedicarbonyl dichloride, benzoyl chloride, benzoyl bromide, methylbenzoyl chloride, phthaloyl chloride, isophthaloyl chloride, terephthaloyl chloride, and benzene-1,2,4-tricarbonyl chloride. Desirable of these acid chlorides are phthaloyl chloride, isophthaloyl chloride, and terephthaloyl chloride, especially phthaloyl chloride. They may be used alone or in combination with one another.

Ethers having 2–20 carbon atoms such as methyl ether, ethyl ether, isopropyl ether, n-butyl ether, amyl ether, tetrahydrofuran, anisole, diphenyl ether, and ethylene glycol butyl ether; acid amides such as acetic acid amide, benzoic acid amide, and toluic acid amide; amines such as tributyl amine, N,N'-dimethylpiperazine, tribenzylamine, aniline, pyridine, picoline, pyrroline, and tetramethyl ethylene diamine; nitriles such as acetonitrile, benzonitrile, and tolunitrile; tetramethyl urea; nitrobenzene; lithium butyrate; and organosilicon compounds having Si—O—C linkages (such as trimethylmethoxysilane, trimethylethoxysilane, dimethyldimethoxysilane, dimethyldiethoxysilane, diphenyldimethoxysilane, methylphenyldimethoxysilane, diphenyldiethoxysilane, phenyltrimethoxysilane, γ-chloropropyltrimethoxysilane, methyltriethoxysilane, ethyltriethoxysilane, vinyltriethoxysilane, butyltriethoxysilane, phenyltriethoxysilane, γ-aminopropyltriethoxysilane, chlorotriethoxysilane, ethyltripropoxysilane, vinyltributoxysilane, ethyl silicate, butyl silicate, trimethylphenoxysilane, methyltriallyloxysilane, vinyltris(β-methoxyethoxy)silane, vinyltriacetoxysilane, and dimethyltetraethoxydisiloxane.

Examples of the organosilicon compounds also include those which are represented by the formula below $$R^1R^2_{3-n}Si(OR^3)_n$$

where $R^1$, $R^2$, and $R^3$ denote the same or different hydrocarbon residues and n is an integer of 2 or 3.

$R^1$ in the above formula should preferably be a branched hydrocarbon residue such as alkyl group, cycloalkyl group, phenyl group, phenyl group, methyl-substituted phenyl group, and other aryl groups. $R^1$ should preferably be a group in which the carbon atom adjacent to the silicon atom (or the carbon atom at the α-position) is a secondary or tertiary one, particularly a group in which the specific carbon atom has 3 alkyl groups. Moreover, $R^1$ should have 3–20 carbon atoms, preferably 4–10 carbon atoms.

$R^2$ in the above formula should be a branched or linear aliphatic hydrocarbon group having 1–20 carbon atoms, preferably 1–10 carbon atoms. $R^3$ in the above formula should be an aliphatic hydrocarbon group, preferably a linear aliphatic hydrocarbon group having 1–4 carbon atoms.

Examples of the organosilicon compounds represented by the above-formula include those which are represented by the following formulas.

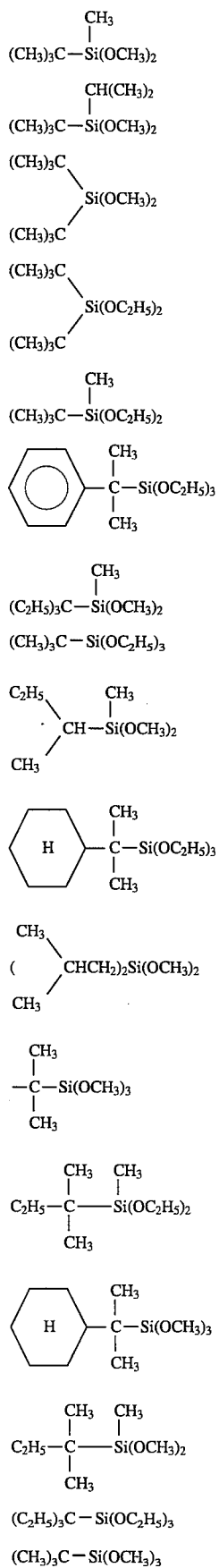

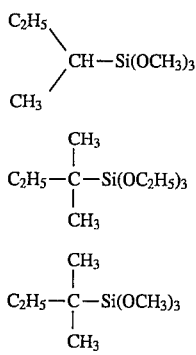

Preferred compound classes are esters, ethers, ketones, and acid anhydrides.

According to the present invention, the solid catalyst component (A) is prepared from the above-mentioned solid product (a), titanium compound (b), and optional electron donor compound (c) by any known method. A preferred method consists of bringing the solid product (a) into contact with the electron donor compound (c) and then bringing the resulting product into contact with the titanium compound (b).

There are no restrictions as to the condition under which the solid product (a) is brought into contact with the electron donor compound (c), followed by contact of titanium compound (b). Usually, the amount of the electron donor compound (c) is 0.01–10 mol, preferably 0.05–5 mol, for one mol of the solid product (a) in terms of magnesium atom. They should be kept in contact with each other for 5 minutes to 10 hours at 0°–200° C., preferably for 30 minutes to 3 hours at 30°–150° C. The reaction may be carried out in an inert hydrocarbon solvent such as pentane, hexane, heptane, and octane.

There are also no specific limitations as to the conditions for contacting the titanium compound (b) with the solid product (a) or a product produced by the contact of the solid product (a) and electron donating compound (c). Usually, the reaction is carried out by adding 1–50 mole, preferably 2–20 mole, of electron donating compound (c) to one mole, as magnesium atom, of the solid component (a), and at 0°–200° C. for 5 minutes to 10 hours, preferably at 30°–150° C. for 30 minutes to 5 hours. An inert hydrocarbon such as pentane, hexane, heptane, or octane may be added to the reaction system.

There are no specific limitations as to the conditions under which titanium compound (b) contacts the product produced by the contact of solid product (a) and electron donating compound (c). Usually, in the range of 1–50 mol, preferably 2–20 mol, of titanium compound (b) per one mol of magnesium is added and reacted at 0°–200° C. for 5 minutes to 10 hours, preferably at 30°–150° C. for 30 minutes to 5 hours.

For the contact reaction, the titanium compound (b) may be used alone as such if it is a liquid (like titanium tetrachloride); otherwise, it may be used in the form of a solution in an inert hydrocarbon solvent such as hexane, heptane, or kerosene. Prior to the above-mentioned contact reaction, the solid product (a) may be treated with any one of halogenated hydrocarbons, halogen-containing silicon compounds halogen gases, hydrogen chloride, or hydrogen iodide.

After the contact reaction, the reaction product should preferably be washed with an inert hydrocarbon such as n-heptane.

The catalyst component should preferably have a pore volume greater than 0.4 cc/g and a specific surface area greater than 300 m$^2$/g; otherwise it might be poor in catalytic activity. Incidentally, the pore volume and specific surface area can be obtained according to the BET method which depends on measuring the volume of nitrogen gas adsorbed by the sample. (See J. Am. Chem. Soc. vol. 60, p. 309, 1983).

The process of the present invention employs the organometallic compound (B) which is an organic compound containing a metal belonging to Groups I to III of the Periodic Table. The metals include, for example lithium, sodium, potassium, zinc, cadmium, and aluminum, of which aluminum is preferred. Examples of the organometallic compound (B) include alkyl lithium such as methyl lithium, ethyl lithium, propyl lithium, and butyl lithium and dialkyl zinc such as dimethyl zinc, diethyl zinc, dipropyl zinc, and dibutyl zinc.

The organoaluminum compound that can be used in the present invention is one which is represented by the formula:

$$AlR^4_m X^2_{3-m}$$

wherein $R^4$ denotes an alkyl group, cycloalkyl group, or aryl group having 1–10 carbon atoms; and $X^2$ denotes a halogen atom such as chlorine or bromine; and m is an integer of 1 to 3. Examples of the organoaluminum compound include trialkylaluminum such as trimethylaluminum, triethylaluminumm, triisopropylaluminum, triisobutylaluminum, and trioctylaluminum and dialkylaluminum monohalide such as diethylaluminum monochloride, dipropylaluminum monochloride, and dioctylaluminum monochloride.

According to the process of the present invention, an electron donor compound (C) may be used, if necessary. It may be the same as or different from the electron donor compound (c) used in the preparation of the above-mentioned solid catalyst component (A).

The process of the present invention is designed for the polymerization of olefins represented by the formula:

$$R^3-CH=CH_2$$

wherein $R^3$ denotes a hydrogen atom or a $C_{1-20}$ alkyl group or cycloalkyl group.

Examples of the olefins include straight-chain monolefins such as ethylene, propylene, butene-1, and hexene-1; branched-chain monoolefins such as 4-methylpentene-1; and dienes such as butadiene.

The process of the present invention may be effectively used for the homopolymerization and copolymerization of the above-mentioned olefins.

According to the process of the present invention, the polymerization may be carried out under the same condition as used for the known process. In other words, the polymerization may be performed at an olefin partial pressure higher than atmospheric pressure, at a temperature of from −80° C. to +150° C., in the gas phase or liquid phase, and, if necessary, in the presence of an inert hydrocarbon diluent. The polymerization carried out under such conditions gives rise to a polyolefin powder having an almost complete sphericity and a sharp particle size distribution. In other words, the polyolefin powder has a sphericity (S) smaller than 1.60 and a particle size distribution index (P) smaller than 5.0, as mentioned above.

The polymerization process of the present invention is characterized by the use of a Ziegler-type catalyst in which the catalyst carrier is the above-mentioned solid product (a) formed by the reaction of metallic magnesium, an alcohol, and a specific amount of halogen. The solid product (a) is used in combination with the titanium compound (b), the organometallic compound (B), the solid catalyst component (A), and other optional components such as electron donor compound, which are prepared by any known method. In addition, the catalyst thus formed is used for the polymerization of olefins under the same conditions as before, such as those disclosed in Japanese Patent Publication No. 34098/1971 and Japanese Patent Laid-open Nos. 98076/1977, 2580/1978, 43094/1978, 181807/1986, 127305/1987, 63207/1985, and 139706/1985.

Figure 2:
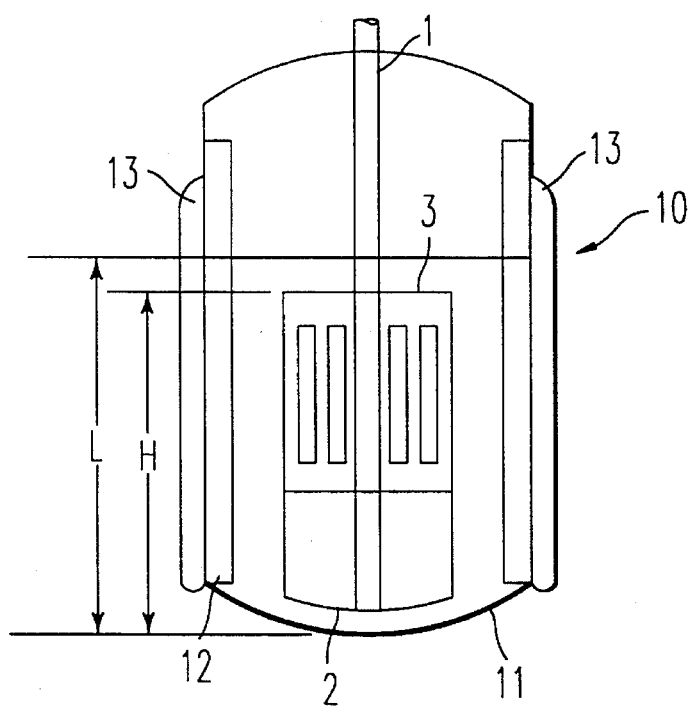
FIG. 2 is a schematic view showing a stirring vessel having a max blend wing.

In a second aspect of the invention, when the solid product (a) is prepared on a large scale, a stirring vessel is normally used. In this case, the stirring wing of the stirring vessel may preferably be a wing attached or fixed to a stirring axle placed in the center of the stirring vessel. Particularly suitable stirring wings include for example, a glide wing such as a Max blend wing (Manufactured by Sumitomo Heavy Machinery) as shown in FIG. 2, and a multi-stage wing such as a full-zone wing (Manufactured by Shinkoh PanTec).

The above stirring wing is fixed to a stirring axle 1 placed in the center of the stirring vessel 10, and comprises a bottom paddle wing located close to the bottom of the vessel and an upper wing located higher than the bottom paddle wing. In this case, during a reaction the stirring wing is preferably used under conditions which satisfy the following equation:

$$H/L > 0.5$$

wherein H is height between the bottom of the vessel and the most upper portion of the upper wing; and L is liquid level during a reaction, and the most upper portion of the bottom paddle wing being located lower than the liquid level.

The stirring wing can be modified by any one of the following procedures (1) to (5).

(1) It is preferable that the clearance between Bottom Paddle Wing 2 fixed to Rotation Axle 1 and Vessel Bottom 11 be smaller in order for the particles to sufficiently float. Further, the number of the Bottom Paddle Wing 2 is not necessarily one, but can be plural in form, for example, a turbine wing. In addition, the Bottom Paddle Wing 2 may be a retreating wing.

(2) Upper Wing 3 sufficiently mixes particles swept out by the Bottom Paddle Wing 2. The Upper Wing 3 may be integrally formed with the Bottom Paddle Wing 2 or may be a multi-stage type. In addition, the Upper Wing 3 may have an angle with respect to the Bottom Paddle Wing 2, but may preferably be in the shape of glide.

(3) If a ratio of the height H between the Vessel Bottom 11 and the most upper portion of the Upper Wing 3, and Liquid Level L is not greater than 0.5, in the upper portion of a liquid to be treated, a portion where stirring is not well conducted is created. This results in agglomeration and increases in the amount of large particles. To avoid agglomeration, the rotation rate of the stirring wing may be increased. However, in this case, the amount of small particles may increase. However, in this case, the amount of small particles may increase, leading to large particle size distribution. Therefore, H/L is preferably not less than 0.7, particularly not greater than 1.

(4) A ratio of Wind Diameter d to Vessel Diameter D is not particularly limited to, but may preferably be $0.3 < d/D < 0.8$, more preferably $0.4 < d/D < 0.6$.

(5) A plurality of Baffles 12 to be arranged in the axle direction, may be fixed on the wall surface of the Stirring Vessel 10. In addition, in figure, 13 denotes a jacket.

In the present invention, in the case of carrying out reactions using the stirring vessel, the reactions are carried out using a stirring wing fixed to a stirring axle placed in the center of the stirring vessel under stirring conditions which satisfy the following expressions:

| | |
|---|---|
| | $4.3 \times 10^3 < n^3d^2 < 4.0 \times 10^6$ |
| more preferably | $9.8 \times 10^3 < n^3d^2 < 3.6 \times 10^5$ |
| more preferably | $6.5 \times 10^4 < n^3d^2 < 7.8 \times 10^4$ | wherein d (m) is a diameter of the stirring wing; and n (rpm) is rotation rate.

In this case the stirring wings may be any wings which can be used for stirring or mixing slurry such as a paddle (flat feather) wing, inclined feather wing, turbine wing and anchor wing in addition to the above-mentioned Max blend wing and the above-mentioned full-zone wing. Further, the stirring wing may be one stage type or may be a multi-stage type. In addition, a plurality of baffles to be arranged in the axle direction, may be fixed on the side wall surface of the stirring vessel.

As to the range of the rotation rate (number of revolutions), if $n^3d^2$ is not greater than $4.3 \times 10^3$, mixing of particles in the slurry becomes extremely poor, resulting in agglomeration during the reaction. On the other hand, if $n^3d^2$ is not less than $4.0 \times 10^6$, the particles are broken, resulting in an increase of small particles and an increase in particle size distribution. This gives rise to poor shapes (not spherical) of the resultant particles.

In this case, as the rotation rate increases, the average particle size increases. Thus, the average particle size can be freely controlled within the above range of the rotation rate, without changing the particle size distribution. In addition, as to the wing diameter, the ratio of Wing Diameter d to Vessel Diameter D is not particularly limited to, but preferably ranges: $0.3 < d/D < 0.8$, more preferably $0.4 < d/D < 0.6$.

The thus obtained reaction product is used for the synthesis of the next solid catalyst component after drying or after filtration and washing with an inert solvent such as heptane. The obtained solid product (a) can be used as such in the following step without the necessity of grinding or classification for a desired particle size distribution.

As mentioned above, according to the process of the present invention, spherical solid products (a) having controlled particle size and narrow particle size distribution, which can be used as such without being subject to a particle size control treatment such as grinding or classification, can be produced in a one step reaction. In this case, the particle size can be readily controlled by changing the reaction conditions. In addition, the use of the solid product (a) results in high catalytic activity, without using a particle size control treatment such as grinding or classification, and also gives rise to a polymer having high stereo-regularity and good powder morphology.

A third aspect of the invention which is directed to gas phase polymerization will now be described. A first embodiment of gas phase polymerization is the polymerization of ethylene alone or gas phase polymerization of ethylene and another alpha-olefin as shown in FIG. 1, using at least (A) a solid catalyst component prepared from at least (a) a solid product obtained by the reaction of metallic magnesium, alcohol and halogen or a halogen-containing compound and (b) a titanium compound; and (B) an organometallic compound. The solid product (a) is prepared as described above. An electron donor compound component (c) may optionally be employed to prepare the solid catalyst component (A). During ethylene polymerization, an electron donor (C) may be used to complete a catalyst system along with components (A) and (B).

Figure 3:
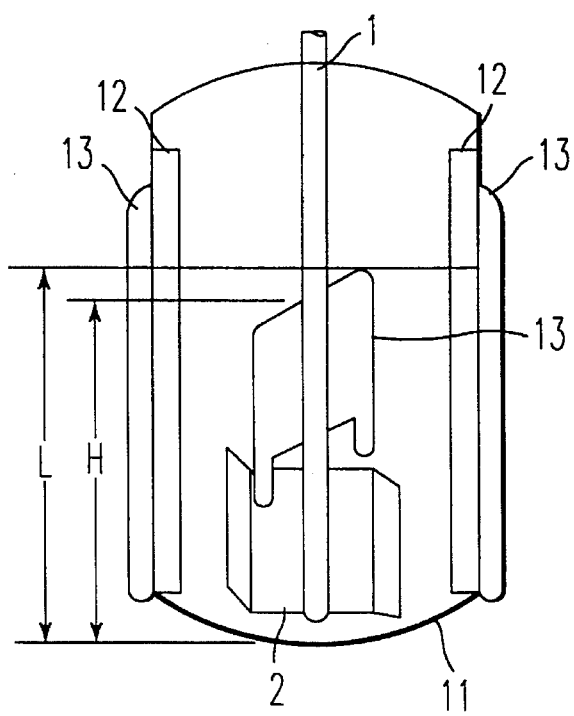
FIG. 3 is a schematic view showing a stirring vessel having a full-zone wing.

In this third aspect of the invention, when the reaction leading to solid product (a) is carried out on a large scale, a stirring vessel can be used. In this case, the stirring wing of the stirring vessel may preferably be a wing attached or fixed to a stirring axle placed in the center of the stirring vessel. Particularly suitable stirring wings include, for example, a glide wing such as a Max blend wing (Manufactured by Sumitomo Heavy Machinery) as shown in FIG. 2, and a multi-stage wing such as a full-zone wing (Manufactured by Shinkoh PanTec) as shown in FIG. 3.

The above stirring wing is fixed to a stirring axle 1 placed in the center of the stirring vessel 10, and comprises a bottom paddle wing located close to the bottom 11 of the vessel and an upper wing located higher than the bottom paddle wing. In this case, during a reaction the stirring wing is preferably used under conditions which satisfy the following equation:

$$H/L > 0.5$$

wherein H is height between the bottom of the vessel and the most upper portion of the upper wing; and L is the liquid level during a reaction, and the most upper portion of the bottom paddle wing being located lower than the liquid level (third, fifth and eighth embodiments).

The stirring wing can be modified by one of the following proceedures (1) to (5).

(1) It is preferred that the clearance between Bottom Paddle Wing 2 fixed to Rotation Axle 1 and Vessel Bottom 11 be relatively narrow in order to sufficiently float the particles. Further, the number of Bottom Paddle Wings 2 employed need not be limited to one, but can be a plural number, for example, to form a turbine wing. In addition, the Bottom Paddle Wing 2 may be a retreating wing.

(2) Upper Wing 3 sufficiently mixes the particles swept out by the Bottom Paddle Wing 2. The Upper Wing 3 may be integrally formed with the Bottom Paddle Wing 2 or may be of the multi-stage type. In addition, the Upper Wing 3 may have an angle with respect to the Bottom Paddle Wing 2, but may preferably be in the shape of glide.

(3) If the ratio of the height H between the Vessel Bottom 11 and the most upper portion of the Upper Wing 3, and Liquid Level L is not greater than 0.5, in the upper portion of a liquid to be treated, a portion where stirring is not well conducted is created. This results in agglomeration and increase in the amount of large particles. To avoid agglomeration, the rotation rate of the stirring wing may be increased. However, in this case, the amount of small particles may increase. However, in this case, the amount of small particles may increase, which leads to large particle size distribution. Therefore, H/L is preferably not less than 0.7, particularly not greater than 1.

(4) The ratio of Wind Diameter d to Vessel Diameter D is not particularly limited to, but may preferably be 0.3<d/D<0.8, more preferably 0.4<d/D<0.6.

(5) A plurality of Baffles 12 to be arranged in the axle direction, may be fixed on the wall surface of the Stirring Vessel 10. In addition, reference numeral 13 denotes a jacket.

In the present invention, in the case of carrying out reactions using the stirring vessel, the reactions are carried out using a stirring wing fixed to a stirring axle placed in the center of the stirring vessel under stirring conditions which satisfy the following expressions:

|   |   |
|---|---|
|   | $4.3 \times 10^3 < n^3d^2 < 4.0 \times 10^6$ |
| more preferably | $9.8 \times 10^3 < n^3d^2 < 3.6 \times 10^5$ |
| more preferably | $6.5 \times 10^4 < n^3d^2 < 7.8 \times 10^4$ | wherein d (m) is the diameter of the stirring wing; and n (rpm) is the rotation rate.

In this case, the stirring wings may be any wings which can be used for stirring or mixing a slurry such as a paddle (flat feather) wing, an inclined feather wing, a turbine wing or an anchor wing in addition to the above-mentioned Max blend wing and the above-mentioned full-zone wing. Further, the stirring wing may be a one stage type or may be a multi-stage type. In addition, a plurality of baffles to be arranged in the axle direction, may be fixed on the side wall surface of the stirring vessel.

As to the range of the rotation rate (number of revolutions, if $n^3d^2$ is not greater than $4.3 \times 10^3$, mixing of particles in the slurry becomes extremely poor, resulting in agglomeration during the reaction. On the other hand, if $n^3d^2$ is not less than $4.0 \times 10^6$, the particles are broken, resulting in an increase of micro-particles and an increase in particle size distribution. This gives rise to poor shapes (non-spherical) of the resultant particles.

In this case, as the rotation rate increases, the average particle size increases. Thus, the average particle size can be freely controlled within the above range of rotation rates, without changing the particle size distribution. In addition, as to the wing diameter, the ratio of Wing Diameter d to Vessel Diameter D is not particularly limited to, but may preferably range be: 0.3<d/D<0.8, more preferably 0.4<d/D<0.6.

In addition, the reaction may be carried out batchwise or continuously. There is a modified method which comprises repeating the steps of adding a small portion of metallic magnesium to as much alcohol as necessary placed in a reaction vessel and removing the reaction product.

The thus obtained reaction product is used for the synthesis of the next solid catalyst component after drying or after filtration and washing with an inert solvent such as heptane. The obtained solid product (a) can be used as such in the following step without the necessity of grinding or classification for a desired particle size distribution.

Further, the solid product (a) is almost spherical and has a sharp particle size distribution, with individual particles varying very little in sphericity. In this case, the solid product may preferably be composed of particles which have a sphericity (S) (as defined by Formula (I) above) of less than 1.60 and a particle size distribution index (P) (as defined by Formula (2) above) of less than 5.0.

The titanium compounds (b) used in the above-mentioned solid catalyst component (A) are as described above. In the above-mentioned solid catalyst component (A), if desired, any electron donor compound (c) can be used. The electron donor compounds (c) are those described supra.

The catalyst component (A) of this aspect should preferably have a pore volume of not less than 0.4 cc/g and a specific surface area of not less than 300 m²g; otherwise it might be poor in catalytic activity. In addition, the pore volume and specific surface area can be obtained according to the BET method which depends on measuring the volume of nitrogen gas adsorbed in the sample. (See J. Am. Chem. Soc. Vol. 60, p. 309, 1983).

The organometallic compounds (B) which can be suitably used to prepare the catalyst of this aspect include organic compounds containing a metal belonging to Groups I to III of the Periodic Table. These metals include, for example, lithium, sodium, potassium, zinc, cadmium and aluminum, of which aluminum is preferred. Examples of the organometallic compound (B) include alkyl lithium such as methyl lithium, ethyl lithium, propyl lithium and butyl lithium, and dialkyl zinc such as dimethyl zinc, diethyl zinc, dipropyl zinc and dibutyl zinc.

The organoaluminum compounds which can be used in the present invention are represented by the following formula:

$AlR^2_m X^2_{3-m}$ wherein $R^2$ is an alkyl group having 1–10 carbon atoms, cycloalkyl or aryl; m is an integer of 1 to 3; and $X^2$ is a halogen atom such as chlorine or bromine.

Examples of the organoaluminum compound include trialkylaluminum compounds such as trimethylaluminum, triethylaluminum, triisopropylalumium, triisobutylaluminum and trioctylaluminum; and dialkylaluminum monohalide compounds such as diethylaluminum monochloride, dipropylaluminum monochloride and dioctylaluminum monochloride.

In this third aspect of the present invention, if desired, an electron donor compound (C) can be used. Any of the above-mentioned electron donor compounds (c), which can be used to prepare the above solid catalyst component (A), can be used as the electron donor compound (C). The electron donor compound (C) to be used may be the same as or different from the electron donor compound used to prepare the above solid catalyst component (A).

In this first embodiment, using the above-mentioned catalyst, gas phase polymerization of ethylene alone or gas phase polymerization of ethylene and another alpha-olefin is carried out.

The other α-olefin employed is not particularly limited, but usually includes those represented by the following formula:

$R^3-CH=CH_2$ wherein $R^3$ is a hydrogen atom, a linear or branched $C_{1-20}$ alkyl group or cycloalkyl group.

Examples of the above olefins include straight-chain monoolefins excluding ethylene, such as propylene, butene-1, hexene-1 and octene-1; branched-chain monoolefins such as 4-methyl-pentene-1; and dienes such as butadiene.

Known polymerization conditions for gas phase polymerization can be used. For example, the temperature may be 20° to 120° C., preferably 40° to 115° C. and the pressure may be at least atmospheric pressure, preferably atmospheric pressure to 70 Kg/cm$^2$, more preferably 2 Kg/cm$^2$ to 60 Kg/cm$^2$. The olefin partial pressure may be at least atmospheric pressure, preferably atmospheric pressure to 70 Kg/cm$^2$, more preferably 2 Kg/cm$^2$ to 60 Kg/cm$^2$.

Further, hydrogen or other chain transfer agents can be used to control molecular weight. In addition, the polymerization pressure can be controlled by introducing nitrogen or other inert gas.

The polymerization can be performed batchwise or continuously. In addition, multi-stage polymerization wherein two or more of different polymerization steps are separately carried out, can be adapted.

Figure 6:
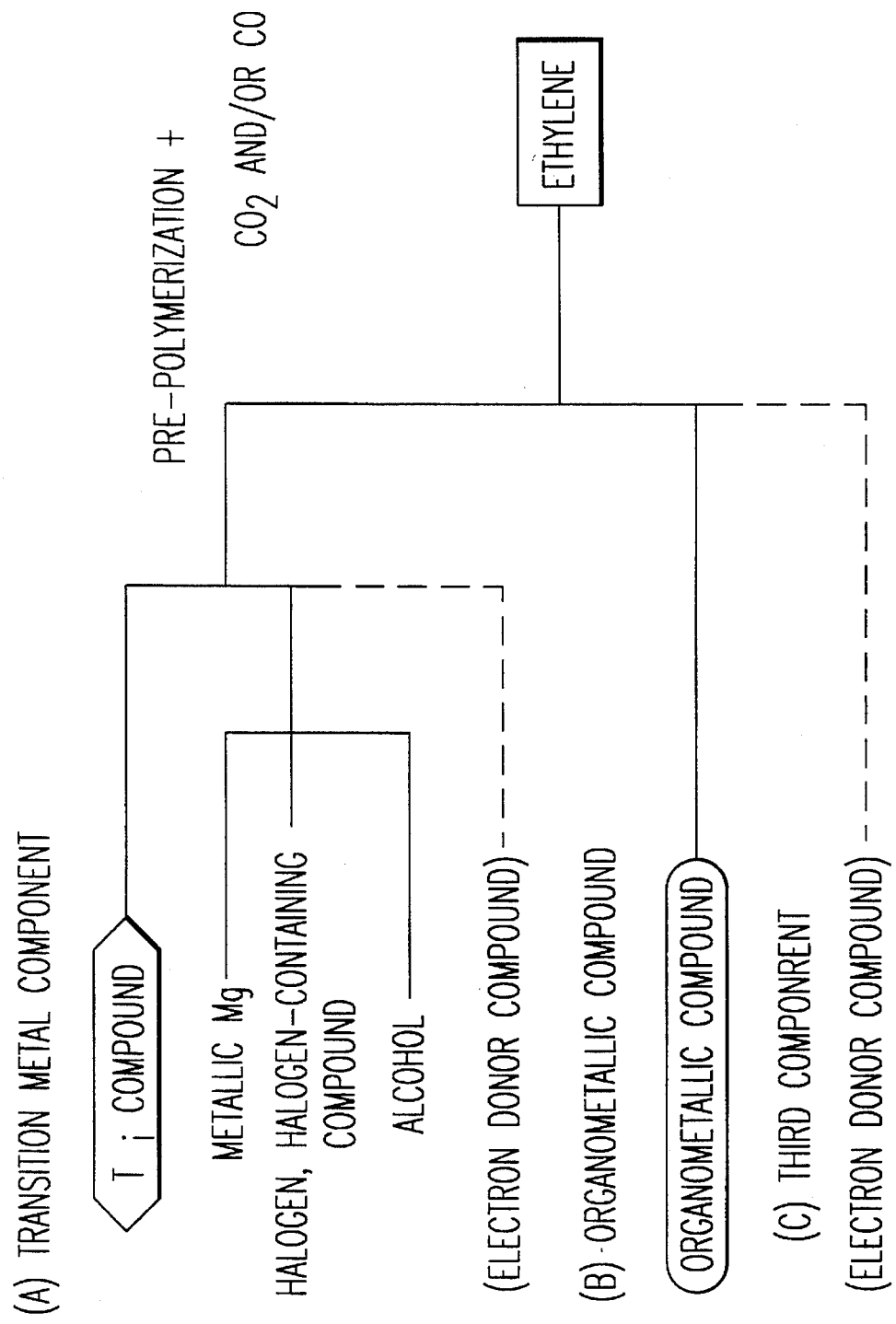
FIG. 6 is a flow chart which shows the second embodiment of the third aspect of the invention.

The second embodiment is shown in FIG. 6. After the above-mentioned solid catalyst component (A) is contacted with a small amount of olefin to form olefin polymers, and then is contacted with at least one kind of gas selected from carbon monoxide and carbon dioxide, or a mixed gas of such gas and an inert gas, homopolymerization of ethylene or copolymerization of ethylene and another alpha-olefin is performed using at least the compound (A) and an organometallic compound (B).

The pre-polymerization is performed by bringing the solid catalyst component (A) into contact with a small amount of olefin. In this case, an olefin can be introduced immediately after the solid catalyst component (A) is prepared. The introduction can be conducted after aging for 0.2 to 3 hours. Further, the solid catalyst component (A) can be supplied in the form of suspension with an inert solvent, an olefin or the like.

The olefins which can be used for the pre-polymerization are not limited to, but may be usually represented by the following formula:

$R^3-CH=CH_2$ wherein $R^3$ is a hydrogen atom, a linear or branched $C_{1-20}$ alkyl group or cycloalkyl group.

Examples of the above olefins include straight-chain monoolefins such as ethylene, propylene, butene-1, hexene-1 and octene-1; and branched-chain monoolefins such as 4-methyl-pentene-1.

The amount of pre-polymerized products (olefin polymers) may be 0.1 to 100 grams, preferably 1 to 50 grams, per 1 gram of the solid catalyst component (A).

In the second embodiment, the treated solid catalyst component (A) by pre-polymerization as above is then contacted with carbon monoxide, carbon dioxide, mixtures thereof or mixtures of these and an inert gas, to stabilize the catalytic performance. Examples of the inert gas include argon gas and nitrogen gas. In this case the solid catalyst component (A) which has been subjected to the pre-polymerization treatment may be in the dried state or in the suspended state in an inert solvent. On the other hand, carbon monoxide and carbon dioxide can be usually used in the gaseous state. However, they can be used in the liquid or the solid state.

In addition, there are no specific restrictions as to the contact methods. Conventional methods which can be used for solid/gas contact, slurry/gas contact, solid/liquid contact, slurry/solid contact or the like can be used. Such conventional methods include, for example, a bubbling method; a method wherein the pre-polymerization treated catalyst in the solid state or the slurry state and carbon monoxide or carbon dioxide in the gaseous state or the liquid state which co-exist in a closed reactor, are contacted under stirred conditions; and a method using the scrubber system. Also, carbon oxide in the solid state can be contacted with the pre-polymerization treated catalyst in the dried state or the slurry state. Among these methods, the bubbling method wherein the pre-polymerization treated catalyst in the slurry state or the solid state is contacted under bubbling conditions with carbon monoxide or carbon dioxide gas; and a method wherein the pre-polymerization treated catalyst in the solid state of the slurry state and carbon monoxide or carbon dioxide in the gaseous state or the liquid state which co-exist in a closed reactor, are contacted under stirred conditions.

In addition, in the second embodiment of the present application, polymerization methods other than gas phase polymerization such as slurry polymerization and solution polymerization, can be used.

According to this third aspect of the invention, catalysts showing high catalytic activity and high stereo-regularity for long time and polymers having good powder morphology can be obtained, without using particle size control treatment such as grinding, by using a solid product (a) obtained by the reaction of metallic magnesium, alcohol and halogen and/or halogen-containing compound as an ethylene polymerization catalyst for gas phase polymerization. In addition, the generation of micro-powders of the resultant polymer can be restricted even when hydrogen is used as molecular weight controlling agent.

Further, according to this third aspect of the invention, pre-polymerization treatment of the solid catalyst component (A) at high slurry concentration can be effectively performed without sacrificing catalyst performance. Accordingly, in the present invention, a smaller pre-polymerization reactor can be used, leading to advantages in facility construction. In addition, due to increases in reaction rate, the pre-polymerization can be performed under low pressure for short periods of time. This results in reduction in operational costs of the pre-polymerization, which lower costs.

In the fourth aspect of the invention, the noted catalyst component (A) of the catalyst system is obtained by the reaction of at least a solid product (a) obtained by reacting metallic magnesium, an alcohol, and halogen and/or halogen-containing compound and (b) a halogenated titanium compound, either in the presence or absence of an electron donating compound, as described above.

In this fourth aspect of the invention it has been found that a vulcanized rubber-like olefin polymer possessing the same characteristics as those of TPO (which is partially cross-linked) can easily be manufactured by regulating the crystallite of the polymer by using a specific catalyst system, even though the polymer is not cross-linked. The present invention has been completed based on this finding.

The solid catalyst component (A) of the catalyst usually has a composition of an atomic ratio of magnesium and titanium in the range of 2–100, an atomic ratio of halogen and titanium in the range of 5–200, a molar ratio of electron donating compound and titanium in the range of 0.1–10.

In the present invention, a catalyst system comprising solid component (E), which is constituted by said solid catalyst component (A) and crystalline polyolefin, and said components (B), (C), and (D) may also be used.

Examples which can be used for the preparation of this solid component (E) include:

(1) a method of prepolymerizing an olefin in the presence of a mixture of said solid catalyst component (A) and an organoaluminum compound (m.p. 100° C. or higher), and, as needed, said electron donating compound (pre-polymerization method);

(2) a method of dispersing the solid catalyst component (A) and, as needed, the organoaluminum compound and electron donating compound, into crystalline powder with uniform particle size such as crystalline polypropylene or polyethylene (dispersion method), and (3) a combination of said methods (1) and (2).

Crystalline polyolefins obtained from an α-olefin having 2–10 carbon atoms, such as, for example, polyethylene, polypropylene, polybutene, poly-4-methylpentene, and the like, can be used as said solid component (E). These crystalline polyolefins can be prepared by prepolymerizing an α-olefin having 2–20 carbon atoms according to said method (1), usually at 30°–80° C., and preferably at 55°–70° C.

In this instance, the atomic ratio of aluminum and titanium can be selected from the range, usually of 0.1–100, and preferably 0.5–5, and the molar ratio of electron donating compound and titanium can be selected from the range of 0–50, preferably 0.1–2. Crystalline polyolefins prepared in the form of powder, as mentioned in the above method (2), can also be used as a crystalline polyolefin.

Of the crystalline polyolefins, those having a melting point of 100° C. or higher are preferred.

The same organoaluminum compounds exemplified hereinafter as component (B) can be used as the organoaluminum compounds for the preparation of solid component (E). In addition, as the electron donating compounds, which are used as needed, those previously exemplified as the electron donating compounds for component (A) may be used.

The proportion of the crystalline polyolefin and the solid catalyst component (A) used for the preparation of solid component (E), in terms of ratio by weight, is selected usually from the range of 0.05–100, preferably 0.10–50.

Suitable organoaluminum compounds are compounds of the formula, $$AlR^2_m X^2_{3-m}$$

wherein $R^2$ is an alkyl group having 1–10 carbon atoms, a cycloalkyl group, or an aryl group, m is an integer of 1–3, and $X^2$ is a halogen atom, e.g., chlorine or bromine atom. Specific examples of such aluminum compounds which can preferably be used include trialkylaluminums, e.g., trimethylaluminum, triethylaluminum, triisopropyaluminum, triisobutylaluminum, trioctylaluminum; dialkylaluminum monohalides, e.g., diethylaluminum monochloride, diisopropylaluminum monochloride, diisobutylaluminum monochloride, dioctylaluminum monochoride; alkylaluminum sesquihalides, e.g., ethylaluminum sesquichloride; and the like. These aluminum compounds may be used alone or in combinations of two or more.

The alkoxy group-containing compounds (C) used for the catalyst system of the fourth aspect of the present invention are compounds represented by the following formula,

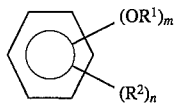

wherein $R^1$ is an alkyl group having 1–10 carbon atoms, $R^2$ is a hydrocarbon group having 1–10 carbon atoms, hydroxy group, or nitro group, m is an integer of 1–6, and n is an integer of 1 to (6-m).

Specific examples include monoalkoxy compounds such as m-methoxytoluene, o-methoxyphenol, m-methoxyphenol, 2-methoxy-4-methylphenol, vinylanisole, p-(1-propenyl)anisole, p-allylanisole, 1,3-bis(p-methoxyphenyl)-1-pentene, 5-allyl-2-methoxybenzyl alcohol, methoxybenzyl alcohol, nitroanisole, nitrophenethole, and the like; dialkoxy compounds such as o-dimethoxybenzene, m-dimethoxybenzene, p-dimethoxybenzene, 3,4-dimethoxytoluene, 2,6-dimethoxyphenol, 1-allyl-3,4-dimethoxybenzene, and the like; and trialkoxy compounds such as 1,3,5-trimethoxybenzene, 5-allyl-1,2,3-trimethoxybenzene, 5-allyl-1,2,4-trimethoxybenzene, 1,2,3-trimethoxy-5-(1-propenyl)benzene, 1,2,4-trimethoxy-5-(1-propenyl)benzene, 1,2,3-trimethoxybenzene, 1,2,4-trimethoxybenzene, and the like. Of the above compounds dialkoxy and trialkoxy compounds are preferred. These alkoxy group-containing compounds may be used alone or two or more in combination.

Figure 7:
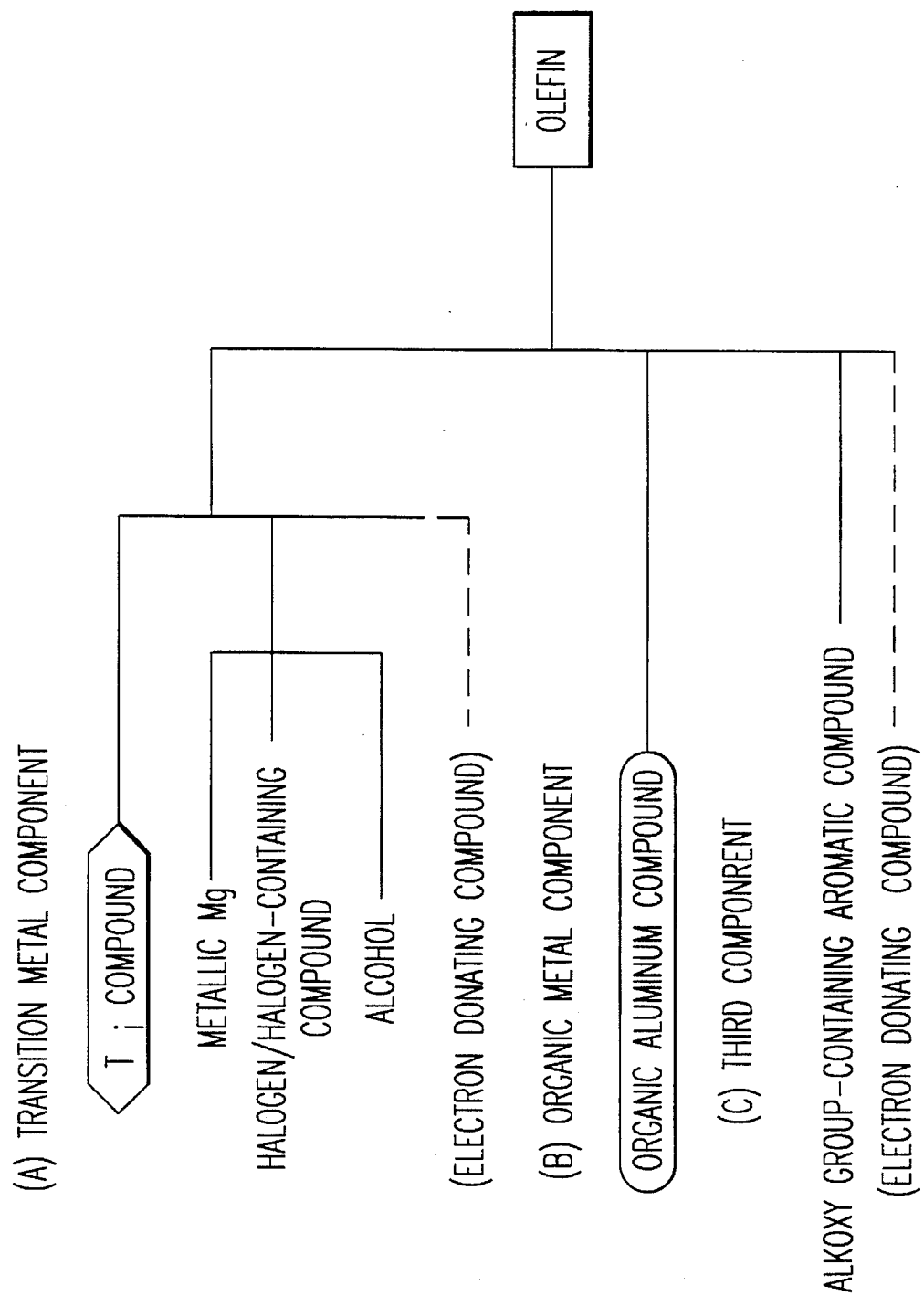
FIG. 7 is a flow chart showing the process of the fourth aspect of the present invention.

In the preparation according to the process of the present invention, electron donating compound (D) can be used as required. FIG. 7 is a representation of a typical catalyst within the scope of the present invention.

Suitable electron donating compounds (D) used to prepare the catalyst system of the present invention include compounds containing oxygen, nitrogen, phosphorus, sulfur, silicon, or the like, and basically have the capability of promoting regularity in the propylene polymerization.

The same electron donating compounds (c) as used for the preparation of said solid catalyst component (A) can be used as the electron donating compounds (D). Among the above compounds, especially preferred are organosilicon compounds, esters, ethers, ketones, and acid anhydrides. In particular, organosilicon compounds such as diphenyldimethoxysilane, phenyltriethoxysilane, and the like, diesters of aromatic dicarboxylic acids such as di-n-butyle phthalate, di-i-butyl phthalate, and the like, $C_{1-4}$ alkyl esters of aromatic monocarboxylic acids such as benzoic acid, p-methoxybenzoic acid, p-ethoxybenzoic acid, toluic acid, and the like, are preferred. Diesters of aromatic dicarboxylic acids are especially preferred because of their capability of promoting catalytic activity and its continued effect.

The electron donating compounds (D) may be either the same electron donating compounds (c) used for the preparation of said solid catalyst component (A) or may be different from them. As to the amount of each component to be used for the catalyst system of the present invention, the solid catalyst component (A) or the solid component (E) is used usually in an amount of 0.0005–1 mole, as titanium atom, per 1 liter of the reactive components. The organoaluminum compound (B) is used usually in an amount such that the atomic ratio of aluminum and titanium is 1–3,000, preferably 40–800. If the amount is outside the defined range, the catalyst activity may be insufficient. The alkoxy group-containing aromatic compound (C) is used in an amount such that the molar ratio of this compound to the titanium atom contained in the solid catalyst component (A) or the solid component (E) falls within the range usually of 0.01–500, preferably 1–300. If the amount is less than 0.01, the properties of the produced polymer may be lowered; if it exceeds 500, the catalyst activity tends to be lowered. The electron donating compound (D) is used in an amount such that its molar ratio to the alkoxy group-containing aromatic compound (C) [(C)/(D)] usually falls within the range of 0.01–100, preferably 0.2–100.

Next, the process for the manufacture of olefin polymers of the present invention by using the above-mentioned catalyst system is illustrated.

In the present invention, at least one α-olefin is polymerized in the presence of the above-mentioned catalyst system to produce an α-olefin homopolymer, e.g., propylene homopolymer or the like or an α-olefin copolymer, e.g., propylene-α-olefin random copolymer, ethylene-propylene block copolymer, or the like. Suitable α-olefins used in the present invention as the raw material include those containing preferably 2–30 carbon atoms. Given as examples of such α-olefins are ethylene, propylene, butene-1, pentene-1, 4-methylpentene-1, hexene-1, heptene-1, octene-1, nonene-1, decene-1, and the like. These may be used either singly in combinations of two or more.

Suitable polymerization methods include non-solvent polymerization methods such as gas phase polymerization, bulk polymerization, or the like, with the gas phase polymerization being preferred.

Here, the gas phase polymerization includes the case where the polymerization is carried out in one step (the gas phase one-step polymerization method), and the gas phase multi-stage polymerization method. The gas phase one-step polymerization method is used for the manufacture of α-olefin homopolymers, e.g., propylene homopolymer or the like or propylene-α-olefin random copolymers. The gas phase multi-stage polymerization method is used for the manufacture of ethylene-propylene block copolymers, ethylene-propylenepolyene ternary block copolymers, and the like.

Reaction conditions for the gas phase one-step polymerization are appropriately selected, as to the pressure, from the range usually of 5–100 kg/cm$^2$, preferably 10–50 kg/cm$^2$, and as to the temperature, from the range usually of 40°–90° C., preferably 60°–75° C. Molecular weight control of the polymers can be effected by known methods, for example, by adjusting the hydrogen concentration in the reaction vessel. The polymerization reaction time is dependent on the types of raw material olefins and the reaction temperature, and thus cannot be indiscriminately determined, although a reaction time of about 5 minutes to 10 hours is sufficient.

In the case where the polymerization is carried out by the gas phase one-step polymerization, propylene is given as a particularly preferred raw material α-olefin if it is polymerized alone; and for copolymerization, propylene and α-olefins with 4–30 carbon atoms are given as preferred raw materials. For such copolymerization, the molar ratio of α-olefin to propylene is preferably in the range of 0.2–20.

In the case where the polymerization is carried out by the gas phase multi-stage polymerization method, the first polymerization (the first stage polymerization) is preferably homopolymerization of α-olefin or copolymerization of propylene and an α-olefin with 4–30 carbon atoms. Molecular weight control of the polymers can be effected by known methods (e.g. by adjusting the hydrogen concentration). The polymerization temperature is usually in the range of 40°–90° C., preferably 60°–75° C., the polymerization pressure is 5–100 kg/cm$^2$, preferably 10–50 kg/cm$^2$, and the polymerization time is from 5 minutes to 10 hours.

Polymerizations from the second stage through the final stage (n stage polymerization) are ethylene-propylene copolymerization or ethylene-propylene-polyene copolymerization.

Here, nonconjugated polyenes are preferred as polyenes. Examples which can be given include dicyclopentadiene, tricyclopentadiene, 5-methyl-2,5-norbornadiene, 5-methylene-2-norbornene, 5-ethylidene-2-norbornene, 5-isopropylidene-2-norbornene, 5-isopropenyl-2-norbornene, 5-(1-butenine)-2-norbornene, cyclooctadiene, vinylcyclohexene, 1,5,9-cyclododecatriene, 6-methyl-4,7,8,9-tetrahydroindene, 2,2'-dicyclopentadiene, trans-1,2-divinylcyclobutane, 1,4-hexadiene, 4-methyl-1,4-hexadiene, 1,6-octadiene, 1,7-octadiene, 1,8-nonadiene, 1,9-decadiene, 3,6-dimethyl-1,7-octadiene, 4,5-dimethyl-1,7-octadiene, 1,4,7-octatriene, 5-methyl-1,8-nonadiene, norbornadiene, vinylnorbornene, and the like. Among these nonconjugated polyenes especially preferred are dicyclopentadiene, 5-ethylidene-2-norbornene, 1,7-octadiene, and the like.

Molecular weight control in each of the polymerization steps can be effected by known methods, e.g. by adjusting the hydrogen concentration. In the case of ethylene-propylene copolymer, control of the ethylene unit content can be achieved by adjusting the feed gas composition. Also, in the case of ethylene-propylene-polyene copolymer, the control of the polyene unit content can be made by adjusting the feed amount of the polyene compounds. The polymerization temperature is 20°–90° C., preferably 40°–50° C., the polymerization pressure is 5–70 kg/cm$^2$, preferably 10–40 kg/cm$^2$, and the polymerization time is from 5 minutes to 10 hours.

Ethylene-propylene block copolymers, ethylene-propylene-polyene ternary block copolymers, and the like can be manufactured by the above-mentioned gas phase multistage polymerization method.

In the above polymerization, each of the components constituting the catalyst system, i.e., components (A)–(D), is mixed at a specified ratio and the components are contacted with each other, following which olefin is introduced to commence the polymerization. Alternatively, the mixture may be aged for about 0.2–3 hours after the contact before the olefin is introduced. In addition, the catalyst components may be supplied by being suspended in an inert solvent, olefin, or the like.

In the present invention, the treatment after the polymerization can be performed according to conventional methods. That is, in the case of the gas phase polymerization, a nitrogen gas stream or the like may be passed through polymer powder taken out of the polymerization vessel after the polymerization in order to remove olefins and the like therefrom. If desired, the polymer may be pelletized by an extruder. In this instance, a small amount of water, alcohol, or the like may be added in order to completely inactivate the catalyst. In the case of bulk polymerization, the polymer can be made into pellets after completely removing monomers contained therein when it is removed from the polymerization vessel after the polymerization.

According to the present invention a process for the manufacture of olefin polymers is provided. The polymers exhibit a pulling strength sufficient for practical use even before vulcanization, possesses sufficient flexibility, low temperature characteristics, and minimal surface adhesiveness, and require only low production costs. Further, the polymer product exhibits excellent powder flowability.

The disclosures of Japanese priority applications having serial numbers 1-343340(PCT/JP90/01709, De. 26, 1990), 3-183632(PCT/JP92/00805, Jun. 24, 1992), 3-179052(PCT/JP92/00806, Jun. 24, 1992) and 3-171623 and 3-173024(PCT/JP92/00765 filed Dec. 28, 1989, Jun. 28, 1991, Jun. 25, 1991, Jun. 17, 1991 and Jun. 18, 1991 respectively are hereby incorporated by reference into the application.

Having generally described this invention, a further understanding can be obtained by reference to certain specific examples which are provided herein for purposes of illustration only and are not intended to be limiting unless otherwise specified.

In the following Examples and Comparative Examples, the following reagents were used.

Metallic Magnesium: Granular Form (350 micrometers in average particle size.)

Ethanol: Reagent First Grade (Made by Wako Junyaku Co.)

Iodine: Reagent First Grade (Made by Wako Junyaku Co.)

Magnesium Chloride: Reagent First Grade (Made by Wako Junyaku Co.)

Magnesium Iodide: Reagent First Grade (Made by Wako Junyaku Co.)

Measurements of X-ray diffraction were carried out in the following manner.

The magnesium compound was ground into powder having an average particle size of 10 µm, which was subsequently vacuum-dried at normal temperature. The dry powder was filled in a cell of Mylar film under an inert gas atmosphere. The Mylar film is 6 µm and the cell is 1 mm thick (including the thickness of the Mylar film and dry powder). The cell was attached to the powder X-ray diffraction apparatus (made by Rigaku Denki Kogyo Co.) for measurement of X-ray diffraction spectrum by the transmission method. X-rays having a wavelength ($\lambda k\alpha$) of 1.543 Å were generated by using a copper anticathode at a voltage of 50 kV and a current of 120 mA.

EXAMPLE 1

(1) Preparation of the solid product (a)

In a 6-liter glass reactor equipped with a stirrer, in which the air had been thoroughly replaced by nitrogen, were placed abut 2430 g of ethanol, 16 g of iodine, and 160 g of metallic magnesium. Reaction was carried out by heating with stirring under refluxing until no hydrogen was evolved any longer. The resulting solution was dried under reduced pressure. Thus, there was obtained the solid product (a).

The solid product (a) was analyzed by X-ray diffractometry with Cu κα line. Three diffraction peaks appeared within the range of $2\theta=5°\sim20°$. The ratio of the peak intensity b/c was 0.75, where peaks are designated as a, b, and c starting from the low scattering angle side.

(2) Preparation of the solid catalyst component (A).

In a 500 ml three-necked glas flask, in which the air had been thoroughly replaced by nitrogen, were placed 16 g of the above-mentioned solid product (a) (not ground), 80 ml of purified heptane, 2.4 ml of silicon tetrachloride, and 2.3 ml of diethyl phthalate. With the reaction system kept at 90° C., 77 ml of titanium tetrachloride was added with stirring. Reaction was carried out at 110° C. for 2 hours. The solid component was separated and then washed thoroughly with purified heptane. Thus, there was obtained the solid catalyst component (A), which had a specific surface area of 413 $m^2$/g and a pore volume of 0.56 cc/g.

(3) Polymerization

In a 1-liter stainless steel autoclave were placed 400 ml of purified heptane, 1 mmol of triethylaluminum, 0.25 mmol of diphenyldimethoxysilane, and 0.005 mmol of the solid catalyst component (A) in terms of titanium atom. The autoclave was charged with hydrogen until the pressure reached 0.5 kg/$cm^2$. Polymerization of propylene was carried out at 70° C. for 2 hours under a total pressure of 8 kg/$cm^2$. The results are shown in Table 1.

In Table 1, the term stereoregularity is defined by the amount of insoluble matter remaining after extraction with boiling heptane for 6 hours.

The sphericity (S) was measured in the following manner.

(1) Sphericity of the solid product (a)

A dry sample of the solid product (a) was photographed with a magnification of X150 using a scanning electron microscope (Model JSM-25S III, made by Nippon Denshi Co., Ltd.) at an accelerating voltage of 5 kV. The resulting negative underwent image processing by the transmission method using an image processing apparatus (made by Nexus Co., Ltd.). Particles smaller than 20 pixels (each pixel measuring 1.389 µm square) were disregarded, and the remaining particles (about 2000 pieces) were examined. The sphericity was calculated according to the formula (a) above from $E_1$ (the projected perimeter of a particle) and $E_2$ (the perimeter of the circle of equal projected area of a particle).

(2) Sphericity of the polyolefin powder

A sample of the polyolefin powder was photographed and the photograph underwent image processing by the direct reflectance method in the same manner as for the solid product (a), except that the size of one pixel was 0.0813 $mm^2$. The sphericity was calculated according to the formula (1) above.

The particle size distribution index (P) was calculated according to the formula (2) above. The 90% particle diameter ($D_{90}$) and 10% particle diameter ($D_{10}$) were obtained from the particle size distribution plotted on a logarithmic distribution paper.

These procedures were repeated in the following examples and comparative examples.

EXAMPLE 2

The procedure (1) in Example 1 was repeated to prepare the solid product (a) from about 2430 g of ethanol, 1.6 g of iodine, and 160 g of metallic magnesium. The procedures (2) and (3) in Example 1 were repeated to prepare the solid catalyst component (A) from the solid product (a) and to carry out polymerization. The results are shown in Table 1.

EXAMPLE 3

The procedure (1) in Example 1 was repeated to prepare the solid product (a) from about 2430 g of ethanol, 32 g of iodine, and 160 g of metallic magnesium. The procedures (2) and (3) in Example 1 were repeated to prepare the solid catalyst component (A) from the solid product (a) and to carry out polymerization. The results are shown in Table 1.

EXAMPLE 4

The procedure (1) in Example 1 was repeated to prepare the solid product (a). Then the procedure (2) in Example 1 was repeated to prepare the solid catalyst component (a) from the solid product (a), except that diethyl phthalate was replaced by dimethyl phthalate (1.9 ml). Polymerization was carried out in the same manner as the procedure (3) in Example 1. The results are shown in Table 1.

EXAMPLE 5

The procedures in Example 1 were repeated, except that triethylaluminum as the organometallic compound (B) was replaced by triisobutylaluminum (1 mmol). The results are shown in Table 1.

EXAMPLE 6

(1) Preparation of the solid product (a)

The same procedure as in Example 3 was repeated to prepare the solid product (a).

(2) Preparation of the solid catalyst component (A)

In a 500-ml three-necked glass flask, in which the air had been thoroughly replaced by nitrogen, were placed 16 g of the above-mentioned solid product (a) (not ground), 60 ml of purified heptane, 2.5 ml of silicon tetrachloride, and 2.4 ml of diethyl phthalate. With the reaction system kept at 90° C., 308 ml of titanium tetrachloride was added with stirring. Reaction was carried out at 110° C. for 2 hours. The solid component was separated and then washed thoroughly with purified heptane. Thus, there was obtained the solid catalyst component (a).

(3) Polymerization

The procedure (3) in Example 1 was repeated to carry out polymerization. The results are shown in Table 1.

EXAMPLE 7

(1) Preparation of the solid product (a)

In a 6-liter glass reactor equipped with a stirrer, in which the air had been thoroughly replaced by nitrogen, were placed abut 2430 g of ethanol, 16 g of iodine, and 160 g of metallic magnesium. Reaction was carried out by heating with stirring under refluxing until no hydrogen was evolved any longer. The solid reaction product was filtered off from the liquid, followed by washing five times with 500 ml of heptane. The thus obtained solid product (a) was made into a heptane slurry without drying.

(2) Preparation of the solid catalyst component (A)

The same procedure as in Example 1 was repeated.

(3) Polymerization

The same procedure as in Example 1 was repeated.

EXAMPLE 8

The procedure (1) in Example 7 was repeated to prepare the solid product (a) from about 2430 g of ethanol, 1.6 of iodine, and 160 g of metallic magnesium. The procedures (2) and (3) in Example 7 were repeated to prepare the solid catalyst component (A) from the solid product (a) and to carry out polymerization. The results are shown in Table 1.

EXAMPLE 9

The procedure (1) in Example 7 was repeated to prepare the solid product (a) from about 2430 g of ethanol, 32 g of iodine, and 160 g of metallic magnesium. The procedures (2) and (3) in Example 7 were repeated to prepare the solid catalyst component (A) from the solid product (a) and to carry out polymerization. The results are shown in Table 1.

EXAMPLE 10

(1) Preparation of the solid product (a)

In a 6-liter glass reactor equipped with a stirrer, in which the air had been thoroughly replaced by nitrogen, were placed about 2430 g of ethanol, 16 g of iodine, and 160 g of metallic magnesium. Reaction was carried out by heating with stirring under refluxing until no hydrogen was evolved any longer. Thus, there was obtained the solid product (a).

(2) Preparation of the solid catalyst component (A)

In a 500-ml three-necked glass flask were placed 15 g of the above-mentioned solid product (a), 200 ml of n-hexane, 3.7 ml of silicon tetrachloride, and 57 ml of isopropyl alcohol. After heating with stirring at 70° C. for 2 hours, 32 ml of titanium tetrachloride was added and the reactants were heated with stirring under refluxing for 6 hours. The resulting solid product was thoroughly washed with n-hexane at normal temperature. Thus, there was obtained the solid catalyst component (A).

(3) Polymerization

In a 1-liter stainless steel autoclave were placed 400 ml of purified n-hexane, 1.5 mmol of diethylaluminum chloride, and 0.01 mmol of the solid catalyst component (A) in terms of titanium atom. Polymerization of ethylene was carried out at 80° C. for 1 hour under a hydrogen pressure of 1.5 kg/cm$^2$ and an ethylene pressure of 1.5 kg/cm$^2$.

Table 3 shows the iodine content in the solid product (a), the amount of titanium supported in the solid catalyst component (A), the yield of polymer, the catalyst activity, the particle size distribution of polymer, the alcohol-to-magnesium molar ratio employed in the preparation of the solid product (a), and the iodine-to-magnesium mol %.

COMPARATIVE EXAMPLE 1

The procedure (1) in Example 1 was repeated except that iodine was not used. The resulting solid product was ground for 24 hours in a 1-liter stainless steel ball mill. The procedures (2) and (3) in Example 1 were repeated to prepare the solid catalyst component from the solid product and to carry out polymerization. The results are shown in Table 2.

COMPARATIVE EXAMPLE 2

The procedure (1) in Example 1 was repeated to prepare a solid product form about 2430 g of ethanol, 0.042 g of iodine, and 160 g of metallic magnesium. The procedures (2) and (3) in Example 1 were repeated to prepare the solid catalyst component from the solid product and to carry out polymerization. The results are shown in Table 2.

COMPARATIVE EXAMPLE 3

The same procedure as in Comparative Example 1 was repeated, except that the solid product was not ground but used as such to prepare the solid catalyst component. The results are shown in Table 2.

COMPARATIVE EXAMPLE 4

The procedure (1) in Example 10 was repeated except that iodine was not used. The procedures (2) and (3) in Example 10 were repeated to prepare the solid catalyst component and to carry out polymerization. The results are shown in Table 3.

COMPARATIVE EXAMPLE 5

The procedure (1) in Example 10 was repeated to prepare a solid product from about 2430 g of ethanol, 0.042 g of iodine, and 160 g of metallic magnesium. The procedures (2) and (3) in Example 10 were repeated to prepare the solid catalyst component from the solid product and to carry out polymerization. The results are shown in Table 3.

TABLE 3

| Example No. | 10 | (4) | (5) |
| --- | --- | --- | --- |
| Iodine/metallic Mg (g-atom/mol) | 0.019 | 0 | 0.00005 |
| Average particle diameter (μm) of solid product (a) | 62 | 560 | 62 |
| Sphericity of solid product (a) | 1.21 | 1.87 | 1.69 |
| Particle size distribution index of solid product (a) | 1.7 | 7.6 | 6.4 |
| Supported amount of Ti in solid catalyst component (A) (mg-Ti/g-catalyst) | 73.6 | 61.7 | 65.8 |
| Results of polymerization | | | |
| Yield of polymer (g) | 75.3 | 42.1 | 17.3 |

TABLE 1

| Example No. | 1 | 2 | 3 | 4 | 5 | 6 |
| --- | --- | --- | --- | --- | --- | --- |
| Iodine/metallic Mg (g-atom/mol) | 0.019 | 0.0019 | 0.038 | 0.019 | 0.019 | 0.038 |
| Average particle diameter (μm) of solid product (a) | 62 | 41 | 80 | 62 | 62 | 80 |
| Sphericity of solid product (a) | 1.21 | 1.32 | 1.19 | 1.21 | 1.21 | 1.19 |
| Particle size distribution index of solid product (a) | 1.7 | 2.8 | 2.0 | 1.7 | 1.7 | 2.0 |
| Supported amount of Ti in solid catalyst component (A) (mg-Ti/g-catalyst) | 27 | 25 | 32 | 29 | 27 | 41 |
| Results of polymerization | | | | | | |
| Yield of polymer (g) | 161.3 | 147.5 | 167.7 | 157.8 | 172.8 | 167.7 |
| Catalyst activity (kg-PP/g-Ti-2 hr) | 673.5 | 615.9 | 700.2 | 658.9 | 721.5 | 700.2 |
| Stereoregularity (1.1) (%) | 98.8 | 98.5 | 99.1 | 98.6 | 98.1 | 98.0 |
| Bulk density of powder (g/cc) | 0.45 | 0.42 | 0.43 | 0.40 | 0.46 | 0.42 |
| Properties of powder | | | | | | |
| Powder particles smaller than 250 μm (%) | 3.5 | 4.3 | 3.2 | 2.6 | 1.9 | 3.9 |
| Powder particles larger than 2830 μm (%) | 0.3 | 1.8 | 0.4 | 0.8 | 0.5 | 0.5 |
| Shape of powder particles | sphere | sphere | sphere | sphere | sphere | sphere |
| Sphericity of powder particles | 1.25 | 1.30 | 1.21 | 1.27 | 1.23 | 1.27 |
| Particle size distribution index of powder | 1.9 | 2.7 | 2.3 | 1.8 | 2.2 | 2.7 |

TABLE 2

| Example No. | 7 | 8 | 9 | (1) | (2) | (3) |
| --- | --- | --- | --- | --- | --- | --- |
| Iodine/metallic Mg (g-atom/mol) | 0.019 | 0.0019 | 0.038 | 0 | 0.00005 | 0 |
| Average particle diameter (μm) of solid product (a) | 59 | 41 | 84 | 560 | 62 | 560 |
| Sphericity of solid product (a) | 1.20 | 1.35 | 1.17 | 1.87 | 1.69 | 1.87 |
| Particle size distribution index of solid product (a) | 1.7 | 2.7 | 1.9 | 7.6 | 6.4 | 7.6 |
| Supported amount of Ti in solid catalyst component (A) (mg-Ti/g-catalyst) | 30 | 23 | 28 | 18 | 20 | 15 |
| Results of polymerization | | | | | | |
| Yield of polymer (g) | 170.4 | 154.2 | 158.0 | 132.4 | 96.7 | 35.9 |
| Catalyst activity (kg/PP/g-Ti-2 hr) | 711.5 | 643.8 | 659.7 | 552.8 | 403.7 | 149.9 |
| Stereoregularity (1.1) (%) | 98.6 | 98.1 | 98.8 | 97.2 | 97.2 | 94.7 |
| Bulk density of powder (g/cc) | 0.44 | 0.42 | 0.45 | 0.33 | 0.40 | 0.25 |
| Properties of powder | | | | | | |
| Powder particles smaller than 250 μm (%) | 3.2 | 4.1 | 3.0 | 11.6 | 10.3 | 7.8 |
| Powder particles larger than 2830 μm (%) | 0.5 | 1.9 | 0.4 | 2.2 | 3.5 | 15.8 |
| Shape of powder particles | sphere | sphere | sphere | irregular | irregular | irregular |
| Sphericity of powder particles | 1.28 | 1.33 | 1.25 | 1.76 | 1.75 | 1.84 |
| Particle size distribution index of powder | 2.1 | 2.6 | 2.1 | 6.7 | 6.9 | 14.1 |

Comparative Examples are indicated by parenthesized numbers.

TABLE 3-continued

| Example No. | 10 | (4) | (5) |
|---|---|---|---|
| Catalyst activity (kg-PE/g-Ti-hr-atm)) | 104.8 | 58.6 | 24.1 |
| Properties of powder | | | |
| Powder particles smaller than 250 μm (%) | 3.5 | 10.3 | 8.3 |
| Powder particles larger than 2830 μm (%) | 1.7 | 5.1 | 10.5 |
| Shape of powder particles | sphere | irregular | irregular |
| Sphericity of powder particles | 1.32 | 1.88 | 1.80 |
| Particle size distribution index of powder | 2.9 | 9.2 | 8.3 |

Comparative Examples are indicated by parenthesized numbers.

EXAMPLE 11

(1) Preparation of the solid catalyst component (A)

In a three-necked glass flask, in which the air had been thoroughly replaced by nitrogen, were placed 30 ml of purified heptane, 30 mmol of the solid product (a) obtained in Example 1, 1.65 mmol of titanium tetrachloride, and 3.0 mmol of phthalic acid chloride (phthaloyl dichloride). After reaction at 98° C. for 1 hour, additional 100 ml of titanium tetrachloride was added. Reaction was carried out with stirring at 110° C. for 2 hours. The resulting solids were washed twice with 100 ml of hot heptane. Additional 100 ml of titanium tetrachloride was added, and reaction was continued at 110° C. for 2 hours. The resulting solids were washed thoroughly with purified heptane. Thus there was obtained the desired solid catalyst component (A).

(2) Polymerization of propylene

In a 1-liter stainless steel autoclave were placed 400 ml of purified heptane, 2.0 mmol of $Al(C_2H_5)_3$, 0.25 mmol of norbornyltrimethoxysilane, and 0.005 mmol of the solid catalyst component (A) in terms of titanium atoms. The autoclave was charged with hydrogen until the absolute pressure reached 0.2 kg/cm$^2$ and then with propylene until the absolute pressure reached 8 kg/cm$^2$. Polymerization was carried out at 70° C. for 2 hours. The results are shown in Table 4.

EXAMPLES 12 AND 13

The same procedure as in Example 11 was repeated except that the polymerization time was changed as shown in Table 4. The results are shown in Table 4.

EXAMPLES 14 TO 17

The same procedure as in Example 11 was repeated except that the amount of phthalic acid chloride was changed as shown in Table 4. The results are shown in Table 4.

EXAMPLES 18 AND 19

The same procedure as in Example 11 was repeated except that the amount of the solid product (a) was changed as shown in Table 4. The results are shown in Table 4.

COMPARATIVE EXAMPLE 6

The same procedure as in Example 11 was repeated except that the phthalic acid chloride was not used. The results are shown in Table 4.

COMPARATIVE EXAMPLE 7

The same procedure as in Example 11 was repeated except that the solid product (a) was replaced by $MgCl_2$. The results are shown in Table 4.

TABLE 4

| Example No. | Solid product [component (a)] (mmol) | Acid halide [component (c)] (mmol) | (c)/(a) (mol ratio) | Titanium halide compound [component (b)] (mmol) | (b)/(a) (mol ratio) | Organo-aluminum/solid catalyst component (mol ratio) | Organo-silicon compound solid catalyst component (mol ratio) | Polymerization time (min) | Yield of polymer (kg/g-Ti) | 1.1. (%) | Powder sphericity (S) | Powder particle size distribution index (P) |
|---|---|---|---|---|---|---|---|---|---|---|---|---|
| 11 | 30 | 3.0 | 0.10 | 1.80 | 60.0 | 400 | 50 | 120 | 524 | 98 | 1.23 | 2.4 |
| 12 | 30 | 3.0 | 0.10 | 1.80 | 60.0 | 400 | 50 | 30 | 221 | 98 | 1.22 | 2.3 |
| 13 | 30 | 3.0 | 0.10 | 1.80 | 60.0 | 400 | 50 | 60 | 365 | 98 | 1.24 | 2.3 |
| 14 | 30 | 3.75 | 0.125 | 1.80 | 60.0 | 400 | 50 | 120 | 347 | 98 | 1.22 | 2.4 |
| 15 | 30 | 3.30 | 0.110 | 1.80 | 60.0 | 400 | 50 | 120 | 458 | 97 | 1.23 | 2.2 |
| 16 | 30 | 2.80 | 0.093 | 1.80 | 60.0 | 400 | 50 | 120 | 590 | 97 | 1.24 | 2.4 |
| 17 | 30 | 2.50 | 0.083 | 1.80 | 60.0 | 400 | 50 | 120 | 550 | 97 | 1.22 | 2.3 |
| 18 | 35 | 3.0 | 0.086 | 1.80 | 51.4 | 400 | 50 | 120 | 563 | 97 | 1.22 | 2.5 |
| 19 | 25 | 3.0 | 0.120 | 1.80 | 72.0 | 400 | 50 | 120 | 441 | 98 | 1.23 | 2.4 |
| (6) | 30 | — | — | 1.80 | 60.0 | 400 | 50 | 120 | 73 | 64 | — | — |
| (7) | 30 | 3.0 | 0.10 | 1.80 | 60.0 | 400 | 50 | 120 | 171 | 67 | — | — |

Comparative Examples are indicated by parenthesized numbers

EXAMPLE 20

(1) Preparation of the Solid Product (a)

The same procedure as in Example 1 was repeated.

(2) Preparation of the Solid Catalyst Component (A)

In a 500-ml three-necked glass flask, in which the air had been thoroughly replaced by nitrogen, were placed 16 g of the solid product (a) (not ground) obtained by procedure (1) above, 80 ml of purified heptane, 2.4 ml of silicon tetrachloride, and 2.5 ml of diethyl phthalate. With the reaction system kept at 90° C., 77 ml of titanium tetrachloride was added with stirring. After reaction at 110° C. for 2 hours, the resulting solids were separated and washed with purified heptane at 80° C. Additional 77 ml of titanium tetrachloride was added. Reaction was carried out at 110° C. for 2 hours. The resulting solids were washed thoroughly with purified heptane. Thus there was obtained the solid catalyst component (A).

(3) Polymerization of Propylene

In a 1-liter stainless steel autoclave were placed 400 ml of purified heptane, 2.0 mmol of triethylaluminum, 0.05 mmol of diphenyldimethoxysilane, 0.2 mmol of dicyclohexyl phthalate, and 0.005 mmol (in terms of titanium atom) of the solid catalyst component (A) obtained by the procedure (2) above. The autoclave was charged with hydrogen and propylene until the hydrogen pressure reached 1.5 kg/cm²G and the propylene pressure reached 0.2 kg/cm²G. Polymerization was carried out at 70° C. for 2 hours at a total pressure of 8 kg/cm². The results are shown in Table 4.

EXAMPLE 21

Example 20 was repeated except that the procedure (2) for the preparation of the solid catalyst component (A) was carried out using butyl benzoate (3.5 ml) in place of diethyl phthalate. The results are shown in Table 5.

EXAMPLE 22

Example 20 was repeated except that the procedure (2) for the preparation of the solid catalyst component (A) was carried out using di-n-butyl phthalate (2.5 ml) in place of diethyl phthalate. The results are shown in Table 5.

EXAMPLE 23

Example 20 was repeated except that the procedure (3) was carried out using di-n-butyl phthalate (0.2 mmol) in place of dicyclohexyl phthalate. The results are shown in Table 5.

EXAMPLE 24

Example 20 was repeated except that the procedure (3) was carried out using di-n-butyldimethoxysilane (0.05 mmol) in place of diphenyldimethoxysilane. The results are shown in Table 5.

EXAMPLE 25

Example 20 was repeated except that the procedure (1) for the preparation of the solid product (a) was carried out by adding additional 16 g of iodine. The results are shown in Table 5.

COMPARATIVE EXAMPLE 8

Example 20 was repeated except that the procedure (3) was carried out in the absence of dicyclohexyl phthalate, with the amount of diphenyldimethoxysilane changed to 0.25 mmol. The results are shown in Table 5.

COMPARATIVE EXAMPLE 9

Example 20 was repeated except that the procedure (3) was carried out in the absence of diphenylmethoxysilane, with the amount of dicyclohexyl phthalate changed to 0.25 mmol. The results are shown in Table 5.

TABLE 5

| Example No. | 20 | 21 | 22 | 23 | 24 | 25 | (8) | (9) |
|---|---|---|---|---|---|---|---|---|
| Supported amount of titanium (mg-Ti/g-catalyst) | 30 | 30 | 30 | 30 | 30 | 32 | 30 | 30 |
| Catalyst activity (kg-PP/g-Ti-2 hr) | 525 | 510 | 530 | 520 | 650 | 720 | 350 | 180 |
| Properties of polymer | | | | | | | | |
| mm fraction | 99.1 | 98.7 | 98.8 | 98.9 | 99.1 | 99.1 | 98.5 | 93.5 |
| Bulk density (g/cc) | 0.39 | 0.38 | 0.38 | 0.40 | 0.39 | 0.41 | 0.38 | 0.34 |
| Sphericity (S) | 1.31 | 1.30 | 1.23 | 1.32 | 1.25 | 1.22 | 1.32 | 1.32 |
| Particle size distribution index (P) | 2.2 | 2.1 | 2.1 | 1.9 | 2.3 | 2.1 | 2.0 | 2.2 |

Comparative Examples are indicated by parenthesized numbers.

POSSIBILITY OF EXPLOITATION IN INDUSTRY

The solid product (a) obtained from metallic magnesium, halogen, and alcohol can be incorporated into a catalyst without the need of grinding and other treatment for particle size adjustment. The resulting catalyst is highly active and gives rise to polyolefins having a high stereoregularity and good powder morphology.

The following Examples pertain to the second aspect of the invention.

EXAMPLE 26

(1) Preparation of Solid Product (a):

In a glass reactor (inner volume: 0.5 liter) equipped with a stirrer, in which the air had been thoroughly replaced by argon, were placed 200 g of ethanol and 0.45 g of (anhydrous) magnesium chloride. After the magnesium chloride was dissolved in ethanol, 12 g of metallic magnesium were introduced into the reaction mixture. The reaction was carried out by heating with stirring under refluxing until no hydrogen was evolved any longer to obtain a solid product. The reaction liquid containing the solid product was dried under reduced pressure to obtain a solid product (a).

It was confirmed by microscope observation that the obtained solid product was spherical. The solid product was analyzed by X-ray diffractometry with Cu-Kα line. As a result, three diffraction peaks appeared within the range of 2θ=5°–20°. The ratio of the peak intensity b/c was 0.69, where the peaks are designated as a, b, and c starting from the low scattering angle side.

(2) Preparation of Solid Catalyst Component (A)

In a three-necked glass flask (inner volume: 0.5 liter) sufficiently purged with argon gas, were placed 16 g of the above-mentioned solid product (a) (not ground) and 80 ml of dehydrated heptane. Then, 2.4 ml of silicon tetrachloride were added to the reaction mixture with agitation. Further, 2.5 ml of diethyl phthalate were added while the reaction system was kept at 60° C. After, 80 ml of titanium tetrachloride were added, the reaction mixture was kept at 110° C. for 2 hours, and then purified with heptane heated to 80° C. After 100 ml of titanium tetrachloride were further added, the reaction mixture was kept at 110° C. for 2 hours, and purified with heptane to obtain a solid catalyst component (A).

The solid catalyst component had a specific surface area of 382 m²/g and a pore volume of 0.61 cc/g.

(3) Polymerization

In an SUS-made autoclave (inner volume: about 1.0 liter) sufficiently purged with argon, were placed 400 ml of purified heptane, 1 mmol of triethylaluminum, 0.25 mmol of cyclohexylmethyldimethoxysilane and 0.005 mmol of the above-mentioned solid catalyst component (A) in terms of titanium atom. Hydrogen was introduced into the reaction system until the inner pressure reached 0.5 Kg/cm² and polymerization of propylene was carried out at 70° C. for 2 hours at a total pressure of 8 Kg/cm².

The results are as shown in Table 6.

In addition, "Stereo-regularity" used in the Table means an insoluble fraction extracted from boiling heptane for 6 hours.

The sphericity (S) and the particle size distribution index (P) were measured in the following manner.

(1) In the Case of Solid Product (a):

Sphericity (S): A sample of dried Solid Product (a) was photographed with a magnification of ×150 using a scanning electron microscope (Model JSM-25S III, made by Nippon Denshi Co.) at an accelerating voltage of 5 kV. The resulting negative underwent image processing by the transmission method using an image processing apparatus (made by Nexus Co.). Particles smaller than 20 pixels (each pixel measuring 1.389 micrometer square) were disregarded, and the remaining particles (about 2000 pieces) were examined. The sphericity was calculated according to Formula (1) above from $E_1$ (the projected perimeter of a particle) and $E_2$ (the perimeter of the circle of equal projected area of a particle).

Particle Size Distribution Index (P): Particle sizes of the solid product particles were measured by the light transmission method when they were suspended in liquid hydrocarbon. The 90% particle diameter ($D_{90}$) and 10% particle diameter ($D_{10}$) were obtained from the particle size distribution plotted on a logarithmic distribution paper. Then, the particle size distribution index (P) was calculated according to Formula (2) above.

(2) In the Case of Polyolefin Powders:

Sphericity (S): A sample of polyolefin powders was subjected to image processing by the direct reflection method. The sphericity was calculated according to Formula (1) above in the same manner as in Solid Product (a) except that each pixel measured 0.0813 micrometer square.

Particle Size Distribution Index (P): The particle size distribution was measured by sieving. The 90% particle diameter ($D_{90}$) and 10% particle diameter ($D_{10}$) were obtained from the particle size distribution plotted on a logarithmic distribution paper. Then, the particle size distribution index (P) was calculated according to Formula (2) above.

EXAMPLE 27

(1) Preparation of Solid Product (a):

The procedure of Example 26 (1) was repeated except that the amount of magnesium chloride added was changed to 0.3 g.

It was confirmed by microscope observation that the solid product obtained was spherical.

(2) Preparation of Solid Catalyst Component (A):

Solid Catalyst Component (A) was prepared using the obtained solid product in the same manner as in Example 26 (2).

(3) Polymerization:

The propylene polymerization was carried out using the obtained Solid Product (a) in the same manner as in Example 26 (3).

The results are as shown in Table 6.

EXAMPLE 28

(1) Preparation of Solid Product (a):

Solid Product (a) was prepared in the same manner as in Example 26 (1).

(2) Preparation of Solid Catalyst Component (A):

Fifty (50) ml of hexane containing Zr(O-n-Bu)₄ and Ti(O-n-Bu)₄ in an amount shown in Table 6 dissolved therein were added dropwise to 150 ml of hexane slurry containing 10 g of the obtained Solid Product (a) at 20° C. for 15 minutes with agitation. Then, 92 ml of a hexane diluted solution containing 50 weight percent of EtAlCl₂ were added dropwise to the reaction mixture at 35° C. for 120 minutes. The reaction was further carried out under refluxing conditions for 120 minutes. Thereafter, the reaction product was purified with dried hexane until chlorine could not be detected in the solution. Then, the total volume was adjusted by hexane to 500 ml.

(3) Polymerization:

A 1-liter autoclave equipped with a stirrer was charged with 400 ml of n-hexane and heated to 80° C. After the inner atmosphere was sufficiently replaced by hydrogen gas, hydrogen and ethylene were charged in this order to raise an ethylene pressure to 2.9 Kg/cm²G and an ethylene pressure to 5.4 Kg/cm²G. To this, the Solid Catalyst Component (A), obtained in the above Step (2), containing 0.010 mmol of Ti and 0.50 mmol of triisobutylaluminum were added. The ethylene polymerization was carried out for 1 hour while the total pressure was kept at 5.4 Kg/cm²G by supplying ethylene.

The results are as shown in Table 6.

EXAMPLE 29

(1) Preparation of Solid Product (a):

The procedure of Example 1 (1) was repeated except that 1.35 g of magnesium iodide were used instead of 0.45 g of magnesium chloride.

(2) Preparation of Solid Catalyst Component (A):

Solid Catalyst Component (A) was prepared using the obtained solid product in the same manner as in Example 26 (2).

(3) Polymerization:

The propylene polymerization was carried out using the obtained Solid Product (a) in the same manner as in Example 1 (3).

The results are shown in Table 6.

COMPARATIVE EXAMPLE 10

(1) Preparation of Solid Product (a):

The procedure of Example 26 (1) was repeated except that magnesium chloride was not used. The solid product obtained was ground with a 1-liter stainless steel ball mill for 24 hours.

(2) Preparation of Solid Catalyst Component (A):

Solid Catalyst Component (A) was prepared using the obtained solid product in the same manner as in Example 26 (2).

(3) Polymerization:

The propylene polymerization was carried out using the obtained Solid Product (a) in the same manner as in Example 26 (3).

The results are as shown in Table 6.

TABLE 6

|  | Example 26 | Example 27 | Example 28 | Example 29 | Comp. Ex. 10 |
|---|---|---|---|---|---|
| Iodine/Metallic Mg (g-atom/mole) | 0.019 | 0.013 | 0.019 | 0.020 | 0 |
| Average Particle Size of Solid Product (a) (μm) | 75 | 55 | 75 | 67 | 560 |
| Sphericity of Solid Product (a) | 1.20 | 1.19 | 1.20 | 1.19 | 1.87 |
| Particle Size Distribution Index of Solid Product (a) | 1.9 | 2.1 | 1.9 | 2.1 | 7.6 |
| Amount of Ti Contained in Solid Catalyst Component (A) (mgTi/g-catalyst) | 30 | 29 | 63*[1] | 32 | 18 |
| Results of Poylmerization |  |  |  |  |  |
| Yield of Polymer (g) | 170.4 | 156.8 | 155.0 | 162.3 | 132.4 |
| Catalytic Activity (kgPP/g · Ti · 2 hr) | 711.5 | 654.7 | 113.0*[2] | 677.7 | 552.8 |
| Stereo-regularity (1.1) (%) | 98.7 | 98.1 | — | 98.4 | 97.2 |
| Powder Bulk Density (g/cc) | 0.45 | 0.43 | 0.40 | 0.42 | 0.33 |
| Powder Particle Size 250 μm or less (%) | 3.3 | 4.2 | 4.0 | 4.0 | 11.6 |
| 2830 μm or more (%) | 0.5 | 0.8 | 1.8 | 1.2 | 2.2 |
| Shape of Powders | Spherical | Spherical | Spherical | Spherical | Amorphous |
| Sphericity of Powders | 1.26 | 1.24 | 1.33 | 1.24 | 1.76 |
| Particle Size Distribution Index of Powder | 2.4 | 2.2 | 2.9 | 2.1 | 6.7 |

*[1]: mg(Ti + Zr)/g-catalyst
*[2]: KgPE/g(Ti + Zr) · hr

EXAMPLE 30

An SUS-made reactor equipped with stirrer (vertical type with four baffles as shown in Tables 7 and 8 and with an inner volume of 80 liters), was sufficiently purged with nitrogen and charged with 2.2 Kg of metallic magnesium, 31 Kg of ethanol and 0.2 Kg of iodine. The reaction was carried out with agitation under refluxing conditions until no hydrogen was evolved any longer, to obtain a solid reaction product. In addition, the Max blend wing (Manufactured by Sumitomo Heavy Machinery) was used as a stirring wing, and the stirring rotation rate was set at 130 rpm.

The reaction solution containing the solid reaction product was dried under reduced pressure to obtain a magnesium compound.

EXAMPLE 31

The procedure of Example 30 was repeated except that the reaction wing was changed to a full-zone wing (Manufactured by Shinkon PanTec) and the stirring rotation rate was changed to 110 rpm.

COMPARATIVE EXAMPLE 11

The procedure of Example 30 was repeated except that the H/L was changed to 0.40.

COMPARATIVE EXAMPLE 12

Figure 4A:
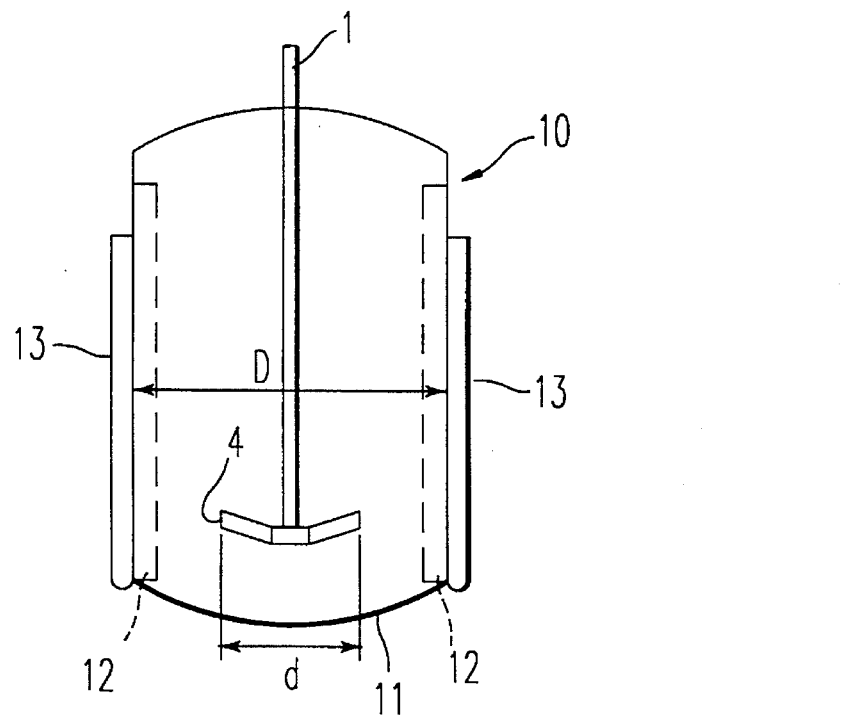
FIG. 4(a) is a schematic view showing a stirring vessel having a paddle wing.
Figure 4B:
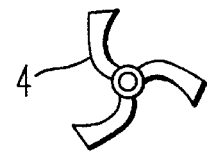
FIG. 4(b) is a plane view showing a paddle wing.

The procedure of Example 30 was repeated except that the stirring wing was changed to Paddle Wing 4 as shown in FIGS. 4 (a) and 4 (b) and the stirring rotation rate was changed to 40 rpm.

EXAMPLE 32

Figure 5:
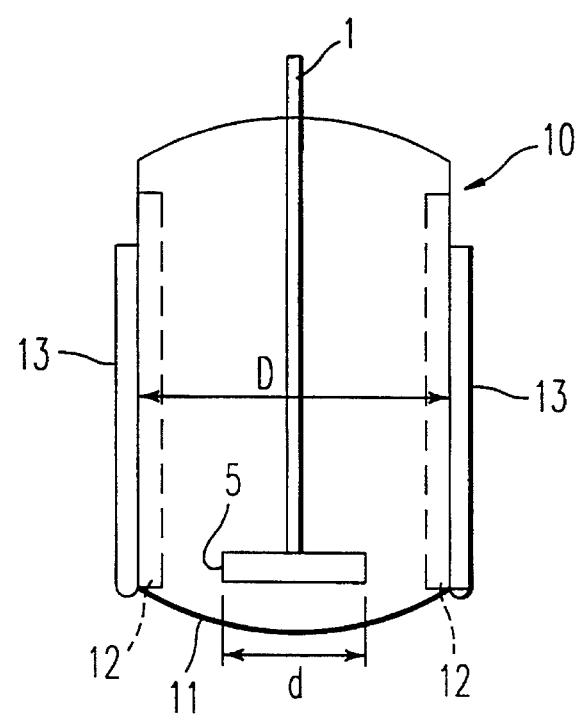
FIG. 5 is a schematic view showing a stirring vessel having a fuddler wing and explains the third to ninth embodiments of the third aspect of the invention.

The procedure of Example 30 was repeated except that the stirring wing was changed to Fuddler Wing 5 with a diameter of 0.2 m as shown in FIG. 5 and the stirring rotation rate was changed to 450 rpm.

EXAMPLE 33

The procedure of Example 32 was repeated except that the stirring rotation rate was changed to 50 rpm.

EXAMPLE 34

The procedure of Example 32 was repeated except that the stirring wing was changed to a paddle wing with a diameter of 0.2 m and the stirring rotation rate was changed to 200 rpm.

COMPARATIVE EXAMPLE 13

The procedure of Example 32 was repeated except that the stirring rotation rate was changed to 500 rpm.

COMPARATIVE EXAMPLE 14

The procedure of Example 34 was repeated except that the stirring rotation rate was changed to 40 rpm.

The stirring conditions and the results of Examples 30 to 34 and Comparative Examples 11 to 14 are as shown in Tables 7 and 8.

were added with stirring at 90° C., the reaction was carried out at 110° C. for 2 hours. Then, the solid component was separated and washed with purified heptane heated to 80° C. After 122 ml of titanium tetrachloride were further added, the reaction was carried out at 110° C. for 2 hours. The reaction product was washed with purified heptane to obtain a solid catalyst component (A). The solid catalyst compo-

TABLE 7

|  | Inner Volume of Reactor (l) | Shape of Wing | Wing Diameter d(m) | Vessel Diameter D(m) | Rotation Rate n(rpm) | H/L | Average Particle Size of (a) (μm) | S of (a) | P of (a) | Shape of (a) |
|---|---|---|---|---|---|---|---|---|---|---|
| Example 30 | 80 | Max Blend Wing | 0.2 | 0.4 | 130 | 0.85 | 58 | 1.19 | 1.6 | Spherical |
| Example 31 | 80 | Full-zone Wing | 0.2 | 0.4 | 110 | 0.85 | 65 | 1.21 | 1.8 | Spherical |
| Comp. Ex. 11 | 80 | Max Blend Wing | 0.2 | 0.4 | 130 | 0.40 | 75 | 1.20 | 4.5 | Spherical |
| Comp. Ex. 12 | 80 | Paddle Wing | 0.2 | 0.4 | 40 | 0.21 | 412 | 3.35 | 12.5 | Amorphous |

(a): Magnesium Compound

TABLE 8

|  | Inner Volume of Reactor (l) | Shape of Wing | Wing Diameter d(m) | Vessel Diameter D(m) | Rotation Rate n(rpm) | $n^3d^2$ | Average Particle Size of (a) (μm) | S of (a) | P of (a) | Shape of (a) |
|---|---|---|---|---|---|---|---|---|---|---|
| Example 32 | 80 | Fuddler Wing | 0.2 | 0.4 | 450 | $3.6 \times 10^6$ | 31 | 1.20 | 3.6 | Spherical |
| Example 33 | 80 | Fuddler Wing | 0.2 | 0.4 | 50 | $5.0 \times 10^3$ | 96 | 1.19 | 4.3 | Spherical |
| Example 34 | 80 | Paddle Wing | 0.2 | 0.4 | 200 | $3.2 \times 10^5$ | 58 | 1.19 | 4.6 | Spherical |
| Comp. Ex. 13 | 80 | Fuddler Wing | 0.2 | 0.4 | 500 | $5.0 \times 10^6$ | 28 | 1.69 | 9.8 | Amorphous |
| Comp. Ex. 14 | 80 | Paddle Wing | 0.2 | 0.4 | 40 | $2.6 \times 10^3$ | 412 | 3.35 | 12.5 | Amorphous |

(a): Magnesium Compound

Industrial Applicability

As mentioned above, the present invention can be effectively used as catalyst components for olefin polymerization and also useful for production of polyolefins.

EXAMPLE 35

(1) Preparation of Solid Product (a):

A glass reactor (inner volume: 6 liters) equipped with a stirrer, was sufficiently purged with nitrogen, and charged with about 2430 g of ethanol, 16 g of iodine and 160 g of metallic magnesium. The reaction was carried out with stirring under heat-refluxing conditions until no hydrogen was evolved any longer to obtain a solid reaction product. The reaction liquid containing the solid product was dried under reduced pressure to obtain a solid product (a). The solid product obtained had a sphericity (S) of 1.20 and a particle size distribution index (P) of 1.8.

The solid product was analyzed by X-ray diffractometry with Cu-Kα line. As a result, three diffraction peaks appeared within the range of 2θ=5°–20°. The ratio of the peak intensity b/c was 0.75, where the peaks are designated as a, b, and c starting from the low scattering angle side.

(2) Preparation of Solid Catalyst Component (A)

In a three-necked glass flask (inner volume: 500 ml) sufficiently purged with nitrogen gas, were placed 16 g of the above-mentioned solid product (a) (not ground), 80 ml of purified heptane, 2.4 ml of silicon tetrachloride and 2.3 ml of diethyl phthalate. After 77 ml of titanium tetrachloride nent had a specific surface area of 413 m²/g and a pore volume of 0.56 cc/g.

(3) Ethylene Homopolymerization

A stainless steel autoclave (inner volume: 4.5 liters) equipped with a stirrer (anchor type wing), was charged with 30 g of polyethylene powders, and subjected to vacuum-heat dry treatment at 80° C. The temperature was descreased to 70° C. and the pressure was restored to atmospheric pressure with nitrogen. Then, 5 Kg/cm² of hydrogen and 15 Kg/cm² of ethylene were introduced to raise the total pressure to 20 Kg/cm². Immediately after 1.5 mmol of triethylaluminum and 0.01 mmol of the solid catalyst component obtained in Step (2) were added to 30 ml of dried heptane, these were supplied to the reactor to initiate the reaction. While the reaction temperature and pressure were kept at the same level, ethylene was continuously supplied. After the reaction was carried out for 2 hours, the reactor was depressurized and a sample was obtained.

The results are as shown in Table 9.

EXAMPLE 36

The procedure of Example 35 (1) was repeated except that a solid product (a) was prepared from about 2430 g of ethanol, 1.6 g of iodine and 160 g of metallic magnesium. Using this solid product (a), a solid catalyst component (A) was prepared, and further the polymerization was carried out in the same manner as described in Example 35 (2) and (3).

The results are as shown in Table 9.

EXAMPLE 37

A solid product (a) was prepared in the same manner as in Example 35 (1). Subsequently, the procedure of Example 35 (2) was repeated except that 1.9 ml of dimethyl phthalate were used instead of diethyl phthalate, to obtain a solid catalyst component (A). Using this solid product (A), the polymerization was carried out in the same manner as in Example 35 (3).

The results are as shown in Table 9.

EXAMPLE 38

The procedure of Example 35 (1) to (3) was repeated except that in Example 35 (3), the hydrogen partial pressure, the ethylene partial pressure and the polymerization temperature were changed as shown in Table 9.

The results are as shown in Table 9.

EXAMPLE 39

The procedure of Example 35 (1) to (3) was repeated except that in Example 35 (3), triisobutylaluminum was used instead of triethylaluminum.

The results are as shown in Table 9.

EXAMPLE 40

(1) Preparation of Solid Product (a):

The procedure of Example 35 (1) was repeated to prepare a solid product (a).

(2) Preparation of Solid Catalyst Component (A):

In a three-necked glass flask (inner volume: 500 ml) sufficiently purged with nitrogen gas, were placed 16 g of the above-mentioned solid product (a) (not ground), 60 ml of purified heptane, 2.5 ml of silicon tetrachloride and 2.4 ml of diethyl phthalate. After 308 ml of titanium tetrachloride were added with stirring at 90° C., the reaction was carried out at 110° C. for 2 hours. Then, the solid component was separated and washed with purified heptane, to obtain a solid catalyst component (A).

(3) Ethylene Homopolymerization:

The polymerization was carried out using the solid catalyst component (A) obtained in the same manner as in Example 35 (3).

The results are as shown in Table 9.

EXAMPLE 41

(1) Preparation of Solid Product (a):

The procedure of Example 35 (1) was repeated to prepare a solid product (a).

(2) Preparation of Solid Catalyst Component (A):

Using the solid product (a) obtained, a solid catalyst component (A) was prepared in the same manner as in Example 35 (2).

(3) Ethylene-Butene Copolymerization:

A stainless steel autoclave (inner volume: 4.5 liters) equipped with a stirrer (anchor type wing), was charged with 30 g of polyethylene powder, and subjected to vacuum-heat dry treatment at 80° C. The temperature was decreased to 70° C. and the pressure was restored to atmospheric pressure with nitrogen. Then, 5 Kg/cm$^2$ of hydrogen, 1.7 Kg/cm$^2$ of 1-butene and 15 Kg/cm$^2$ of ethylene were introduced to raise the total pressure to 21.7 Kg/cm$^2$. Immediately after 1.5 mmol of triethylaluminum and 0.01 mmol of the solid catalyst component (A) obtained in Step (2) were added to 30 ml of dried heptane, these were supplied to the reactor to initiate the reaction. While the reaction temperature and pressure were kept at the same level, ethylene was continuously supplied. After the reaction was carried out for 2 hours, the reactor was depressurized and a sample was obtained.

The results are as shown in Table 9.

EXAMPLE 42

The procedure of Example 41 (1) to (3) was repeated except that in Example 41 (3), the gas formulation was changed as shown in Table 9.

The results are as shown in Table 9.

EXAMPLE 43

(1) Preparation of Solid Product (a):

A glass reactor (inner volume: 6 liters) equipped with a stirrer, was sufficiently purged with nitrogen, and charged with about 2430 g ethanol, 6 g of anhydrous magnesium chloride and 160 g of metallic magnesium. The reaction was carried out with stirring under heat-refluxing conditions until no hydrogen was evolved any longer to obtain a solid reaction product. The reaction liquid containing the solid product was dried under reduced pressure to obtain a solid product (a).

The solid product (a) was analyzed by X-ray diffractometry with Cu-K$\alpha$ line. As a result, three diffraction peaks appeared within the range of 2=5°–20°. The ratio of the peak intensity b/c was 0.70, where the peaks are designated as a, b, and c starting from the low scattering angle side.

(2) Preparation of Solid Catalyst Component (A)

In a three-necked glass flask (inner volume: 500 ml) sufficiently purged with nitrogen gas, were placed 16 g of the above-mentioned solid product (a) (not ground), 80 ml of purified heptane, 2.4 ml of silicon tetrachloride and 2.3 ml of diethyl phthalate. After 77 ml of titanium tetrachloride were added with stirring at 90° C. the reaction was carried out at 110° C. for 2 hours. After 122 ml of titanium tetrachloride were further added, the reaction was carried out at 110° C. for 2 hours. The reaction product was washed with purified heptane to obtain a solid catalyst component (A). The solid catalyst component had a specific surface area of 429 m$^2$/g and a pore volume of 0.57 cc/g.

(3) Ethylene Homopolymerization

Using the solid catalyst component (A) obtained, the polymerization was carried out in the same manner as in Example 35 (3).

The results are as shown in Table 9.

EXAMPLE 44

(1) Preparation of Solid Product (a):

The procedure of Example 35 (1) was repeated to prepare a solid product (a).

(2) Preparation of Solid Catalyst Component (A):

The procedure of Example 35 (2) was repeated to prepare a solid catalyst component (A).

(3) Pre-Polymerization, Contact with Carbon Dioxide:

In a glass flask (inner volume: 1 liter) equipped with a stirrer, were placed 20 g of the above-mentioned solid product (a) and 0.25 mol of triethylaluminum. While ethylene was supplied to keep an ethylene partial pressure of 0.5 Kg/cm$_2$·G at 20° C. for 60 minutes, 2 g per 1 g of the solid catalyst component (A), were polymerized.

After the completion of the reaction, the liquid phase portion was degassed and washed with 500 ml of n-heptane three times. Then, carbon dioxide gas was supplied by pressure until its partial pressure became 2.0 Kg/cm$^2$·G and contacted for 24 hours, to obtain a solid catalyst component (A).

In addition, a part of this solid catalyst component (A) was withdrawn and left in liquid propylene for 24 hours. However, a polymer was not formed.

(4) Ethylene Homopolymerization:

Using the solid catalyst component (A), the polymerization was carried out in the same manner as in Example 35 (3).

The results are as shown in Table 9.

EXAMPLE 45

A solid product (a) and a solid catalyst component (A) were prepared in the same manner as in Example 43 (1) and (2). Using this solid catalyst component (A), the procedure of Examples 44 (3) to (4) was repeated.

The results are as shown in Table 9.

EXAMPLE 46

The procedure of Example 44 (1) to (4) was repeated except that in Example 44 (3), propylene was used as an olefin used for pre-polymerization.

The results are as shown in Table 9.

EXAMPLE 47

The procedure of Example 46 was repeated except that in the Example the amount of propylene used for pre-polymerization was changed to 0.8 g per 1 g of the solid catalyst component.

The results are as shown in Table 9.

EXAMPLE 48

The procedure of Example 44 (1) to (4) was repeated except that in Example 44 (3), 0.01 mol of triethylaluminum were used; the reaction temperature was changed to 40° C.; and 140 g of butene were used as an olefin used for pre-polymerization.

The results are as shown in Table 9.

EXAMPLE 49

The procedure of Example 44 (1) to (4) was repeated except that in Example 44 (3), 4-methyl-pentene-1 was used as the olefin for pre-polymerization.

The results are as shown in Table 9.

EXAMPLE 50

(1) Preparation of Solid Product (a):
The procedure of Example 35 (1) was repeated to prepare a solid product (a).

(2) Preparation of Solid Catalyst Component (A):
The procedure of Example 35 (2) was repeated to prepare a solid catalyst component (A).

(3) Two-Stage Polymerization:
A stainless steel autoclave (inner volume: 4.5 liters) equipped with a stirrer (anchor type wing), was charged with 30 g of polyethylene powders (average particle size: 1000 micrometers, [η]=3.0 dl/g), and subjected to vacuum-heat dry treatment at 80° C. The temperature was elevated to 90° C. and the pressure was restored to atmospheric pressure with nitrogen. Then, 10 Kg/cm$^2$ of hydrogen and 5 Kg/cm$^2$ of ethylene were introduced. Immediately after 1.0 mmol of triisobutylaluminum and 0.02 mmol-Ti of the above solid catalyst component (A) were added to 30 ml of dried heptane, these were supplied to the reactor to initiate the reaction. While the reaction temperature and pressure were kept at the same level, ethylene was continuously supplied. After the reaction was carried out for 105 minutes, the reactor was degassed and the pressure was restored to atmospheric pressure with nitrogen. Then, the reaction temperature was raised to 80° C., 0.06 Kg/cm$^2$ of hydrogen, 1.3 Kg/cm$^2$ of 1-butene and 10 Kg/cm$^2$ of ethylene were introduced. While the reaction temperature and pressure were kept at the same level, ethylene was continuously supplied. After the reaction was carried out for 55 minutes, the reactor was depressurized and a sample was obtained.

The results are as shown in Table 10.

EXAMPLE 51

(1) Preparation of Solid Product (a):
The procedure of Example 35 (1) was repeated to prepare a solid product (a).

(2) Preparation of Solid Catalyst Component (A):
The procedure of Example 35 (2) was repeated to prepare a solid catalyst component (A).

(3) Two-Stage Polymerization:
A stainless steel autclave (inner volume: 4.5 liters) equipped with a stirrer (anchor type wing), was charged with 30 g of polyethylene powder (average particle size: 1000 micrometers, [η]=3.0 dl/g), and subjected to vacuum-heat dry treatment at 80° C. While the temperature was kept at 80° C., the pressure was restored to atmospheric pressure with nitrogen. Then, 0.04 Kg/cm$^2$ of hydrogen, 1.3 Kg/cm$^2$ of 1-butene and 7.5 Kg/cm$^2$ of ethylene were introduced. Immediately after 1.0 mmol of triisobutylaluminum and 0.02 mmol-Ti of the above solid catalyst component (A) were added to 30 ml of dried heptane, these were supplied to the reactor to initiate the reaction. While the reaction temperature and pressure were kept at the same level, ethylene was continuously supplied. After the reaction was carried out for 60 minutes, the reactor was degassed and the pressure was restored to atmospheric pressure with nitrogen. Then, 15 Kg/cm$^2$ of hydrogen and 7.5 Kg/cm$^2$ of ethylene were further introduced at 90° C. While the reaction temperature and pressure were kept at the same level, ethylene was continuously supplied. After the reaction was carried out for 120 minutes, the reactor was depressurized and a sample was obtained.

The results are as shown in Table 10.

EXAMPLE 52

(1) Preparation of Solid Product (a):
The procedure of Example 43 (1) was repeated to prepare a solid product (a).

(2) Preparation of Solid Catalyst Component (A):
The procedure of Example 43 (2) was repeated to prepare a solid catalyst component (A).

(3) Two-Stage Polymerization:
The procedure of Example 50 (3) was repeated except that the reaction time was changed as shown in Table 10.

The results are as shown in Table 10.

EXAMPLE 53

(1) Preparation of Solid Product (a):
The procedure of Example 43 (1) was repeated to prepare a solid product (a).

(2) Preparation of Solid Catalyst Component (A):
The procedure of Example 43 (2) was repeated to prepare a solid catalyst component (A).
(3) Two-Stage Polymerization:
The procedure of Example 51 (3) was repeated except that the reaction time was changed as shown in Table 10.
The results are as shown in Table 10.

EXAMPLE 54

(1) Preparation of Solid Product (a):
The procedure of Example 35 (1) was repeated to prepare a solid product (a).
(2) Preparation of Solid Catalyst Component (A):
The procedure of Example 35 (2) was repeated to prepare a solid catalyst component (A).
(3) Pre-Polymerization, Contact with Carbon Dioxide:
In a glass reactor (inner volume: 1 liter) equipped with a stirrer, were placed 500 ml of n-heptane, 20 g of the above-mentioned solid product (a) and 0.025 mol of triethylaluminum. While propylene was supplied to keep a propylene partial pressure of 0.2 $Kg/cm^2 \cdot G$ at 20° C. for 25 minutes, 2 g per 1 g of the solid catalyst component (A), were polymerized.
After the completion of the reaction, the liquid phase portion was degassed and washed with 500 ml of n-heptane three times. Then, carbon dioxide gas was supplied by pressure until its partial pressure became 2.0 $Kg/cm^2 \cdot G$, and contacted for 24 hours, to obtain a solid catalyst component (A).
In addition, a part of this solid catalyst component (A) was withdrawn and left in liquid propylene for 24 hours. However, a polymer was not formed.
(4) Two-Stage Polymerization:
Using the solid catalyst component (A), the polymerization was carried out in the same manner as in Example 35 (3).
The results are as shown in Table 10.

COMPARATIVE EXAMPLE 15

The procedure of Example 35 (1) was repeated except that iodine was not used, to prepare a solid product. The solid product obtained was ground with a 1-liter stainless steel ball mill for 24 hours.

A solid catalyst component (A) was prepared using the obtained solid product and then the polymerization was carried out in the same manner as in Example 35 (2) and (3).
The results are as shown in Table 11.

COMPARATIVE EXAMPLE 16

The procedure of Example 35 (1) was repeated except that a solid product (a) was prepared from about 2430 g of ethanol, 0.042 g of iodine and 160 g of metallic magnesium. Using this solid product (a), a solid catalyst component (A) was prepared, and further the polymerization was carried out in the same manner as in Example 35 (2) and (3).
The results are as shown in Table 11.

COMPARATIVE EXAMPLE 17

The procedure of Comparative Example 15 was repeated except that a solid product was used as such without being ground and then the polymerization was carried out.
The results are as shown in Table 11.

COMPARATIVE EXAMPLE 18

(1) Preparation of Solid Product (a):
The procedure of Comparative Example 15 was repeated to prepare a solid product (a).
(2) Preparation of Solid Catalyst Component (A):
The procedure of Comparative Example 15 was repeated to prepare a solid catalyst component (A).
(3) Two-Stage Polymerization:
The procedure of Example 50 was repeated except that the reaction time was changed as shown in Table 10.
The results are as shown in Table 10.

COMPARATIVE EXAMPLE 19

(1) Preparation of Solid Product (a):
The procedure of Comparative Example 15 was repeated to prepare a solid product (a).
(2) Preparation of Solid Catalyst Component (A):
The procedure of Comparative Example 15 was repeated to prepare a solid catalyst component (A).
(3) Two-Stage Polymerization:
The procedure of Example 51 was repeated except that the reaction time was changed as shown in Table 10.
The results are as shown in Table 10.

TABLE 9

| Example | 35 | 36 | 37 | 38 | 39 | 40 | 41 | 42 | 43 | 44 | 45 | 46 | 47 | 48 | 49 |
|---|---|---|---|---|---|---|---|---|---|---|---|---|---|---|---|
| Polymerization Temperature (°C.) | 70 | 70 | 70 | 70 | 90 | 70 | 70 | 70 | 70 | 70 | 70 | 70 | 70 | 70 | 70 |
| Ethylene Partial Pressure ($Kg/cm^2$) | 15 | 15 | 15 | 15 | 10 | 15 | 15 | 15 | 15 | 15 | 15 | 15 | 15 | 15 | 15 |
| 1-Butene Partial Pressure ($Kg/cm^2$) | 0 | 0 | 0 | 0 | 0 | 0 | 0.7 | 2.7 | 0 | 0 | 0 | 0 | 0 | 0 | 0 |
| Hydrogen Partial Pressure ($Kg/cm^2$) | 5.0 | 5.0 | 5.0 | 5.0 | 10.0 | 5.0 | 5.0 | 5.0 | 5.0 | 5.0 | 5.0 | 5.0 | 5.0 | 5.0 | 5.0 |
| Catalytic Activity (Kg/g-Ti) | 620 | 662 | 585 | 654 | 369 | 632 | 550 | 582 | 607 | 611 | 705 | 651 | 745 | 622 | 617 |
| Weight Average Particle Size (μm) | 1100 | 1200 | 1100 | 1100 | 600 | 1100 | 750 | 700 | 1100 | 1000 | 1200 | 1000 | 1200 | 1100 | 1000 |
| Micro-Powder Ratio (105 μm > wt %) | 0.4 | 0.2 | 0.3 | 0.3 | 1.2 | 0.2 | 0.8 | 0.9 | 0.3 | 0.1 | 0.0 | 0.1 | 0.1 | 0.1 | 0.1 |
| [η] (dl/g) | 3.1 | 3.1 | 3.1 | 3.2 | 1.1 | 3.2 | 3.0 | 3.0 | 3.1 | 3.1 | 3.1 | 3.1 | 3.2 | 3.0 | 3.0 |
| Density ($g/cm^2$) | 0.955 | 0.955 | 0.954 | 0.955 | 0.957 | 0.954 | 0.938 | 0.932 | 0.955 | 0.955 | 0.955 | 0.955 | 0.954 | 0.954 | 0.954 |

[η]: Measured at 135° C. in decalin.
Weight Average Particle Size, Micro-Powder Ratio: Measured by a sieve.

TABLE 10

| Example | Example 50 | | Example 51 | | Example 52 | | Example 53 | | Comp. Ex. 18 | | Comp. Ex. 19 | | Example 54 | |
|---|---|---|---|---|---|---|---|---|---|---|---|---|---|---|
| Polymerization Temperature (°C.) | 90 | 80 | 80 | 90 | 90 | 80 | 80 | 90 | 90 | 80 | 80 | 90 | 80 | 90 |
| Ethylene Partial Pressure (Kg/cm²) | 5.0 | 10 | 7.5 | 7.5 | 5.0 | 10 | 7.5 | 7.5 | 5.0 | 10 | 7.5 | 7.5 | 7.5 | 7.5 |
| 1-Butene Partial Pressure (Kg/cm²) | 0 | 1.3 | 1.3 | 0 | 0 | 1.3 | 1.3 | 0 | 0 | 1.3 | 1.3 | 0 | 1.3 | 0 |
| Hydrogen Partial Pressure (Kg/cm²) | 10 | 0.06 | 0.04 | 15 | 10 | 0.06 | 0.04 | 15 | 10 | 0.06 | 0.04 | 15 | 0.04 | 15 |
| Amount of Ethylene Consumption (Nl) | 250 | 225 | 225 | 250 | 250 | 225 | 225 | 250 | 250 | 225 | 225 | 250 | 225 | 250 |
| Polymerization Time (min) | 105 | 55 | 60 | 120 | 114 | 60 | 66 | 133 | 105 | 75 | 65 | 175 | 5 | 116 |
| [η] (dl/g) | 0.6 | 3.4 | 6.5 | 3.5 | 0.5 | 3.5 | 6.3 | 3.4 | 0.6 | 3.4 | 6.3 | 3.5 | 6.5 | 3.5 |
| Mw/Mn | — | 40 | — | 35 | — | 43 | — | 34 | — | 39 | — | 33 | — | 41 |
| Density (g/cm²) | — | 0.955 | — | 0.957 | — | 0.956 | — | 0.957 | — | 0.955 | — | 0.956 | — | 0.955 |
| Weight Average Particle Size (μm) | — | 570 | — | 840 | — | 620 | — | 890 | — | 220 | — | 240 | — | 900 |
| Micro-Powder Ratio (105 μm > wt %) | — | 3.0 | — | 1.1 | — | 2.7 | — | 0.8 | — | 27 | — | 25 | — | 0.3 |

[η]: Measured at 135° C. in decalin.
Weight Average Particle Size, Micro-Powder Ratio: Measured by a sieve.
Mw/Mn: Measured by GPC

TABLE 11

| Comparative Example | 15 | 16 | 17 |
|---|---|---|---|
| Polymerization Temperature (°C.) | 70 | 70 | 70 |
| Ethylene Partial Pressure (Kg/cm²) | 15 | 15 | 15 |
| 1-Butene Partial Pressure (Kg/cm²) | 0 | 0 | 0 |
| Hydrogen Partial Pressure (Kg/cm²) | 5.0 | 5.0 | 5.0 |
| Catalytic Activity (Kg/g-Ti) | 501 | 410 | 122 |
| Weight Average Particle Size (μm) | 330 | 450 | 250 |
| Micro-Powder Ratio (105 μm > wt %) | 15 | 13 | 23 |
| [η] (dl/g) | 3.1 | 3.1 | 3.1 |
| Density (g/cm²) | 0.955 | 0.955 | 0.954 |

[η]: Measured at 135° C. in decalin.
Weight Average Particle Size, Micro-Powder Ratio: Measured by a sieve.

EXAMPLE 55

(1) Preparation of Solid Product (a):

A SUS-made reactor equipped with a stirrer (vertical type with four baffles as shown in Table 12), was sufficiently purged with nitrogen and charged with 31 Kg of ethanol, 0.2 Kg of iodine and 2.2 Kg of metallic magnesium. The reaction was carried out with agitation under refluxing conditions until no hydrogen was evolved any longer, to obtain a solid reaction product.

The Max blend wing as shown in FIG. 3 (as indicated in Table 12; Manufactured by Sumitomo Heavy Machinery) was used as a stirring wing, and the stirring rotation rate was set at 130 rpm.

The reaction solution containing the solid reaction product was dried under reduced pressure to obtain a solid product.

The solid product was analyzed by X-ray diffractometry with Cu-Kα line. As a result, three diffraction peaks appeared within the range of 2θ=5°–20°. The ratio of the peak intensity b/c was 0.75, where the peaks are designated as a, b, and c starting from the low scattering angle side.

(2) Preparation of Solid Catalyst Component (A)

A SUS-made reactor equipped with a stirrer similar to that used in Step (1) was sufficiently purged with nitrogen gas, and charged with 4 Kg of the above-mentioned solid product (a) (not ground) and 20 liters of dehydrated heptane. Under stirring conditions, 0.6 liters of silicon tetrachloride were added. Further, 0.63 liters of diethyl phthalate were added and the temperature was kept at 60° C. After 20 liters of titanium tetrachloride were added, the reaction was carried out at 110° C. for 2 hours. The reaction mixture was washed with heptane heated to 80° C. After 24 liters of titanium tetrachloride were further added, the reaction was carried out at 110° C. for 2 hours. The reaction product was washed with heptane to obtain a solid catalyst component (A).

The Max blend wing as shown in FIG. 3 (as indicated in Table 12; Manufactured by Sumitomo Heavy Machinery) was used as a stirring wing, and the stirring rotation rate was set at 130 rpm.

(3) Polymerization

A SUS-maid autoclave (inner volume: 1.0 liter) sufficiently purged with argon gas, was charged with 400 ml of purified heptane, 1 mmol of triethylaluminum, 0.25 mmol of cyclohexylmethyldimethoxysilane and 0.005 mmol, in terms of Ti atom, of the above solid catalyst component (A). Then, hydrogen was added to raise its partial pressure to 0.5 Kg/cm² and the propylene polymerization was carried out under a total pressure of 8 Kg/cm² at 70° C. for 2 hours.

The results are as shown in Tables 12 and 14.

In addition, "Stereo-regularity" used in the Table means an insoluble fraction extracted from boiling heptane for 6 hours.

The sphericity (S) and the particle size index (P) were measured in the following manner.

(1) In the Case of Solid-Product (a):

Sphericity (S): A sample of dried Solid Product (a) was photographed with a magnification of ×150 using a scanning electron microscope (Model JSM-25S III, made by Nippon Denshi Co.) at an accelerating voltage of 5 kV. The resulting negative underwent image processing by the transmission method using an image processing apparatus (made by Nexus Co.). Particles smaller than 20 pixels (each pixel measuring 1.389 μm² were disregarded, and the remaining particles (about 2000 pieces) were examined. The sphericity was calculated according to Formula (1) above from $E_1$ (the projected perimeter of a particle) and $E_2$ (the perimeter of the circle of equal projected area of a particle).

Particle Size Distribution Index (P): Particle sizes of the solid product particles were measured by the light transmission method when they were suspended in liquid hydrocarbon. The 90% particle diameter ($D_{90}$) and 10% particle diameter ($D_{10}$) were obtained from the particle size distribution plotted on a logarithmic distribution paper. Then, the particle size distribution index (P) was calculated according to Formula (2) above.

(2) In the Case of Polyolefin Powders:

Sphericity (S): A sample of polyolefin powder was subjected to image processing by the direct reflection method. The sphericity was calculated according to Formula (1) above in the same manner as in Solid Product (a) except that each pixel measured 0.0813 μm².

Particle Size Distribution Index (P): The particle size distribution was measured by sieving. The 90% particle diameter ($D_{90}$) and 10% particle diameter ($D_{10}$) were obtained from the particle size distribution plotted on a logarithmic distribution paper. Then, the particle size distribution index (P) was calculated according to Formula (2) above.

The above procedure was followed in the following Examples and Comparative Examples.

EXAMPLE 56

(1) Preparation of Solid Product (a):

The procedure of Example 55 was repeated except that the reaction wing was changed to a full-zone wing as shown in FIG. 4 (Manufactured by Shinkoh PanTec) and the stirring rotation rate was changed to 110 rpm.

(2) Preparation of Catalyst Component (A):

The procedure of Example 55 was repeated using the solid product (a) obtained.

(3) Polymerization:

The procedure of Example 55 was repeated using the solid catalyst composition (A).

The results are as shown in Tables 12 and 14.

EXAMPLE 57

(1) Preparation of Solid Product (a):

A glass reactor equipped with a stirrer (vertical type with four baffles as shown in Table 12), was sufficiently purged with argon, and charged with 200 g of ethanol, 1.3 g of iodine and 14 g of metallic magnesium. The reaction was carried out with stirring under refluxing conditions until no hydrogen was evolved any longer to obtain a solid reaction product.

The stirring conditions are as shown in Table 12.

The reaction liquid containing the solid product was dried under reduced pressure to obtain a solid product.

(2) Preparation of Solid Catalyst Composition (A):

A three-necked flask (vertical type with four baffles; vessel diameter: 0.08 m; inner volume: 0.5 liters) sufficiently purged with argon gas, was charged with 16 g of the above-mentioned solid product (a) (not ground) and 80 ml of dehydrated heptane. Under stirring conditions, 2.4 ml of silicon tetrachloride were added. Further, 2.5 ml of diethyl phthalate were added and the temperature was kept at 60° C. After 80 ml of titanium tetrachloride were added, the reaction was carried out at 110° C. for 2 hours. The reaction mixture was washed with heptane heated to 80° C. After 80 ml of titanium tetrachloride were further added, the reaction was carried out at 110° C. for 2 hours. The reaction product was washed with heptane to obtain a solid catalyst composition (A).

The stirring conditions are as shown in Table 12.

(3) Polymerization:

The procedure of Example 55 was repeated using the solid product composition (A).

The results are as shown in Tables 12 and 14.

EXAMPLE 58

(1) Preparation of Solid Product (a):

The procedure of Example 55 was repeated except that 0.082 Kg of magnesium chloride were used instead of 0.2 Kg of iodine.

(2) Preparation of Solid Catalyst Composition (A):

The procedure of Example 55 was repeated using the solid product (a) obtained.

(3) Polymerization:

The procedure of Example 55 was repeated using the solid product composition (A) obtained.

The results are as shown in Tables 12 and 14.

EXAMPLE 59

(1) Preparation of Solid Product (a):

The procedure of Example 55 was repeated except that the rotation rate of the stirring wing was changed to 30 rpm.

(2) Preparation of Solid Catalyst Composition (A):

The procedure of Example 55 was repeated using the solid product (a) obtained.

(3) Polymerization:

The procedure of Example 35 was repeated using the solid product composition (A) obtained.

The results are as shown in Tables 12 and 14.

EXAMPLE 60

(1) Preparation of Solid Product (a):

The procedure of Example 55 was repeated.

(2) Preparation of Solid Catalyst Composition (A):

Eight (8) liters of hexane containing Zr(O-n-Bu)$_4$ and Ti(O-n-Bu)$_4$ dissolved in such amount to provide 63 mg (Ti+Zr)/g-catalyst, were added dropwise to 24 liters of hexane slurry containing 1600 g of the solid product (a) obtained with stirring at 20° C. over a period of 15 minutes. To this, 14.72 liters of 50 wt. % hexane diluted solution of EtAlCl$_2$ were added dropwise with stirring at 35° C. over a period of 120 minutes. Further, the reaction was carried out under refluxing conditions for 120 minutes. After the reaction product was washed with dried hexane until chlorine was not detected in the liquid, the total volume was adjusted to 80 liters by adding hexane.

(3) Polymerization:

A 1-liter autoclave equipped with a stirrer was charged with 400 ml of n-hexane and the temperature was elevated to 80° C. After the inner atmosphere was sufficiently replaced by hydrogen gas, hydrogen was introduced to raise its partial pressure to 2.9 Kg/cm²·G and further ethylene was introduced to raise its partial pressure to 5.4 Kg/cm²·G. To this, the solid catalyst composition (A) comprising 0.010 mmol of Ti obtained in the above Step (2) and 0.50 mmol of triisobutylaluminum were added. While ethylene was supplied to keep a total pressure of 5.4 Kg/cm²·G, the ethylene polymerization was carried out for one hour.

The results are as shown in Tables 12 and 14.

EXAMPLE 61

(1) Preparation of Solid Product (a):

A SUS-made reactor equipped with a stirrer (vertical type with four baffles as shown in Table 12), was sufficiently purged with nitrogen, and charged with 31 Kg of ethanol, 0.2 Kg of iodine and 2.2 Kg of metallic magnesium. The reaction was carried out with stirring under refluxing conditions until no hydrogen was evolved any longer to obtain a solid reaction product.

The Fuddler Wing as shown in FIG. 6 (wing diameter: 0.2 m) was used as a stirring wing, and the stirring rotation rate was set at 450 rpm.

The reaction liquid containing the solid product was dried under reduced pressure to obtain a solid product.

(2) Preparation of Solid Catalyst Component (A):

A SUS-made reactor equipped with a stirrer similar to that used in Step (1) was sufficiently purged with nitrogen gas, and charged with 4 Kg of the above-mentioned solid product (a) (not ground) and 20 liters of dehydrated heptane. Under stirring conditions, 0.6 liters of silicon tetrachloride were added. Further, 0.63 liters of diethyl phthalate were added and the temperature was kept at 60° C. After 20 liters of titanium tetrachloride were added, the reaction was carried out at 110° C. for 2 hours. The reaction mixture was washed with heptane heated to 80° C. After 24 liters of titanium tetrachloride were further added, the reaction was carried out at 110° C. for 2 hours. The reaction product was washed with heptane to obtain a solid catalyst composition (A).

The Max blend wing as shown in FIG. 3 (wing diameter: 0.2 m; H/L=0.85; Manufactured by Sumitomo Heavy Machinery) was used as a stirring wing, and the stirring rotation rate was set at 130 rpm.

(3) Polymerization

A SUS-maid autoclave (inner volume: 1.0 liter) sufficiently purged with argon gas, was charged with 400 ml of purified heptane, 1 mmol of triethylaluminum, 0.25 mmol of cyclohexylmethyldimethoxysilane and 0.005 mmol, in terms of Ti atom, of the above solid catalyst component (A). Then, hydrogen was added to raise its partial pressure to 0.5 Kg/cm$^2$ and the propylene polymerization was carried out under a total pressure of 8 Kg/cm$^2$ at 70° C. for 2 hours.

The results are as shown in Tables 12 and 14.

EXAMPLE 62

(1) Preparation of Solid Product (a):

The procedure of Example 61 was repeated except that the rotation rate of the stirring wing was changed to 50 rpm.

(2) Preparation of Solid Catalyst Composition (A):

The procedure of Example 61 was repeated using the solid product (a) obtained.

(3) Polymerization:

The procedure of Example 61 was repeated using the solid product composition (A) obtained.

The results are as shown in Tables 12 and 14.

EXAMPLE 63

(1) Preparation of Solid Product (a):

The procedure of Example 61 was repeated except that the stirring wing was changed to the Paddle Wing 5 as shown in FIG. 5, and the rotation rate of the stirring wing was changed to 200 rpm.

(2) Preparation of Solid Catalyst Composition (A):

The procedure of Example 61 was repeated using the solid product (a) obtained.

(3) Polymerization:

The procedure of Example 61 was repeated using the solid product composition (A) obtained.

The results are as shown in Tables 12 and 14.

EXAMPLE 64

(1) Preparation of Solid Product (a):

A glass reactor equipped with a stirrer (vertical type with four baffles as shown in Table 12), was sufficiently purged with argon, and charged with 200 g of ethanol, 1.3 g of iodine and 14 g of metallic magnesium. The reaction was carried out with stirring under refluxing conditions until no hydrogen was evolved any longer to obtain a solid reaction product.

The stirring conditions are as shown in Table 12.

The reaction liquid containing the solid product was dried under reduced pressure to obtain a solid product.

(2) Preparation of Solid Catalyst Composition (A):

The procedure of Example 57 was repeated using the solid product (a) obtained.

(3) Polymerization:

The procedure of Example 57 was repeated using the solid product composition (A).

The results are as shown in Tables 12 and 14.

EXAMPLE 65

(1) Preparation of Solid Product (a):

The procedure of Example 61 was repeated except that 0.082 Kg of magnesium chloride were used instead of 0.2 Kg of iodine.

(2) Preparation of Solid Catalyst Composition (A):

The procedure of Example 61 was repeated using the solid product (a) obtained.

(3) Polymerization:

The procedure of Example 61 was repeated using the solid product composition (A) obtained.

The results are as shown in Tables 12 and 14.

EXAMPLE 66

(1) Preparation of Solid Product (a):

The procedure of Example 61 was repeated.

(2) Preparation of Solid Catalyst Composition (A):

Eight (8) liters of hexane containing Zr(O-n-Bu)$_4$ and Ti(O-n-Bu)$_4$ dissolved in such amount to provide 63 mg (Ti+Zr)/g-catalyst, were added dropwise to 24 liters of hexane slurry containing 1600 g of the solid product (a) obtained with stirring at 20° C. over a period of 15 minutes. To this, 14.72 liters of 50 wt. % hexane diluted solution of EtAlCl$_2$ were added dropwise with stirring at 35° C. over a period of 120 minutes. Further, the reaction was carried out under refluxing conditions for 120 minutes. After the reaction product was washed with dried hexane until chlorine was not detected in the liquid, the total volume was adjusted to 80 liters by adding hexane.

(3) Polymerization:

A 1-liter autoclave equipped with a stirrer was charged with 400 ml of n-hexane and the temperature was elevated to 80° C. After the inner atmosphere was sufficiently replaced by hydrogen gas, hydrogen was introduced to raise its partial pressure to 2.9 Kg/cm$^2$·G and further ethylene was introduced to raise its partial pressure to 5.4 Kg/cm$^2$·G. To this, the solid catalyst composition (A) comprising 0.010 mmol of Ti obtained in the above Step (2) and 0.50 mmol of triisobutylaluminum were added. Then, while ethylene was supplied to keep a total pressure to 5.4 Kg/cm$^2$·G, the ethylene polymerization was carried out for one hour.
The results are as shown in Tables 12 and 14.

COMPARATIVE EXAMPLE 20

(1) Preparation of Solid Product (a):
The procedure of Example 55 was repeated except that the stirring conditions were changed as shown in Table 12.
(2) Preparation of Solid Catalyst Composition (A):
The procedure of Example 55 was repeated except that the stirring conditions were changed as shown in Table 13.
(3) Polymerization:
The procedure of Example 55 was repeated.

The results are as shown in Tables 12 and 14.

COMPARATIVE EXAMPLES 21 TO 23

(1) Preparation of Solid Product (a):
The procedure of Example 55 was repeated.
(2) Preparation of Solid Catalyst Composition (A):
The procedure of Example 55 was repeated except that the stirring conditions were changed as shown in Table 13.
(3) Polymerization:
The procedure of Example 15 repeated.
The results are as shown in Tables 12 and 14.

TABLE 12

| | Reactor Volume (l) | Shape of Wing | Wing Diameter d | Vessel Diameter D | Rotation Rate (rpm) | H/L | $n^3d^2$ | Average Particle Size of (a) (μm) | S of (a) | P of (a) | Shape of (a) |
|---|---|---|---|---|---|---|---|---|---|---|---|
| Example 55 | 80 | Max Blend Wing | 0.2 | 0.4 | 130 | 0.85 | $8.8 \times 10^4$ | 58 | 1.19 | 1.6 | Spherical |
| Example 56 | 80 | Full Zone Wing | 0.2 | 0.4 | 110 | 0.85 | $5.3 \times 10^4$ | 65 | 1.21 | 1.8 | Spherical |
| Example 57 | 0.5 | Max Blend Wing | 0.04 | 0.08 | 350 | 0.91 | $6.9 \times 10^4$ | 55 | 1.21 | 1.6 | Spherical |
| Example 58 | 80 | Max Blend Wing | 0.2 | 0.4 | 130 | 0.85 | $8.8 \times 10^4$ | 56 | 1.21 | 1.8 | Spherical |
| Example 59 | 80 | Max Blend Wing | 0.2 | 0.4 | 30 | 0.85 | $1.1 \times 10^3$ | 99 | 1.19 | 1.9 | Spherical |
| Example 60 | 80 | Max Blend Wing | 0.2 | 0.4 | 130 | 0.85 | $8.8 \times 10^4$ | 48 | 1.19 | 1.7 | Spherical |
| Example 61 | 80 | Fuddler Wing | 0.2 | 0.4 | 450 | 0.25 | $3.6 \times 10^6$ | 31 | 1.20 | 3.6 | Spherical |
| Example 62 | 80 | Fuddler Wing | 0.2 | 0.4 | 50 | 0.25 | $5.0 \times 10^3$ | 96 | 1.19 | 4.3 | Spherical |
| Example 63 | 80 | Paddle Wing | 0.2 | 0.4 | 200 | 0.21 | $3.2 \times 10^5$ | 58 | 1.19 | 4.6 | Spherical |
| Example 64 | 0.5 | Fuddler Wing | 0.04 | 0.08 | 600 | 0.25 | $3.5 \times 10^5$ | 55 | 1.21 | 3.5 | Spherical |
| Example 65 | 80 | Fuddler Wing | 0.2 | 0.4 | 450 | 0.25 | $3.6 \times 10^6$ | 42 | 1.22 | 3.4 | Spherical |
| Example 66 | 80 | Fuddler Wing | 0.2 | 0.4 | 450 | 0.25 | $3.6 \times 10^6$ | 29 | 1.21 | 3.3 | Spherical |
| Comp. Ex. 20 | 80 | Fuddler Wing | 0.2 | 0.4 | 40 | 0.25 | $2.6 \times 10^3$ | 360 | 2.20 | 9.2 | Amorphons |
| Comp. Ex. 21 | 80 | Max Blend Wing | 0.2 | 0.4 | 130 | 0.85 | $8.8 \times 10^4$ | 58 | 1.19 | 1.6 | Spherical |
| Comp. Ex. 22 | 80 | Max Blend Wing | 0.2 | 0.4 | 130 | 0.85 | $8.8 \times 10^4$ | 58 | 1.19 | 1.6 | Spherical |
| Comp. Ex. 23 | 80 | Max Blend Wing | 0.2 | 0.4 | 130 | 0.85 | $8.8 \times 10^4$ | 58 | 1.19 | 1.6 | Spherical |

TABLE 13

| | Reactor Volume (l) | Shape of Wing | Wing Diameter d (m) | Vessel Diameter d (m) | Rotation Rate (rpm) | $n^3d^2$ | H/L |
|---|---|---|---|---|---|---|---|
| Comp. Ex. 20 | 80 | Fuddler Wing | 0.2 | 0.4 | 40 | $2.6 \times 10^6$ | 0.25 |
| Comp. Ex. 21 | 80 | Fuddler Wing | 0.2 | 0.4 | 40 | $2.6 \times 10^6$ | 0.25 |
| Comp. Ex. 22 | 80 | Fuddler Wing | 0.2 | 0.4 | 130 | $8.8 \times 10^4$ | 0.25 |
| Comp. Ex. 23 | 80 | Fuddler Wing | 0.2 | 0.4 | 500 | $2.6 \times 10^6$ | 0.25 |

TABLE 14

| | Amount of Ti carried in (a) (ngTi/g-cat) | Catalytic activity (Kg/gTi-2 hr) | Stereo-regularity (1.1) (wt %) | Powder Bulk Density (g/cc) | Amount of routh/micro-powders less than 250 μm | Amount of routh/micro-powders more than 2830 μm | Shape of Powders | S of Powders | P of Powders |
|---|---|---|---|---|---|---|---|---|---|
| Example 55 | 31 | 613 | 98.1 | 0.44 | 0.01 | 0 | Spherical | 1.21 | 1.6 |
| Example 56 | 30 | 584 | 98.5 | 0.45 | 0.01 | 0 | Spherical | 1.22 | 1.7 |
| Example 57 | 33 | 545 | 98.6 | 0.45 | 0.01 | 0 | Spherical | 1.17 | 1.6 |
| Example 58 | 32 | 532 | 98.5 | 0.44 | 0.01 | 0 | Spherical | 1.17 | 1.7 |
| Example 59 | 31 | 590 | 98.6 | 0.44 | 0 | 0.01 | Spherical | 1.20 | 1.8 |
| Example 60 | 30 | 512 | 98.5 | 0.45 | 0.01 | 0 | Spherical | 1.19 | 1.6 |
| Example 61 | 32 | 638 | 98.1 | 0.44 | 13.5 | 0 | Spherical | 1.24 | 3.7 |
| Example 62 | 31 | 532 | 98.4 | 0.43 | 0.2 | 4.4 | Spherical | 1.17 | 3.5 |
| Example 63 | 31 | 592 | 98.8 | 0.45 | 3.5 | 0.3 | Spherical | 1.21 | 3.6 |
| Example 64 | 33 | 515 | 98.7 | 0.45 | 2.2 | 0.2 | Spherical | 1.27 | 3.2 |
| Example 65 | 32 | 621 | 98.3 | 0.45 | 15.3 | 0 | Spherical | 1.22 | 3.7 |
| Example 66 | 32 | 629 | 98.2 | 0.42 | 16.7 | 0 | Spherical | 1.23 | 3.1 |
| Comp. Ex. 20 | Uncontrollable Reaction took place due to poor mixing caused by formation of agglomerates. | | | | | | | | |
| Comp. Ex. 21 | Uncontrollable Reaction took place due to poor mixing caused by formation of agglomerates. | | | | | | | | |

TABLE 14-continued

| | Amount of Ti carried in (a) (ngTi/g-cat) | Catalytic activity (Kg/gTi·2 hr) | Stereo-regularity (1.1) (wt %) | Powder Bulk Density (g/cc) | Amount of routh/micro-powders | | Shape of Powders | S of Powders | P of Powders |
|---|---|---|---|---|---|---|---|---|---|
| | | | | | less than 250 μm | more than 2830 μm | | | |
| Comp. Ex. 22 | 32 | 527 | 98.6 | 0.42 | 3.6 | 1.3 | Spherical | 1.28 | 6.1 |
| Comp. Ex. 23 | 31 | 530 | 98.5 | 0.41 | 45.2 | 0.1 | Amorphons | 1.35 | 15.2 |

EXAMPLE 67

(1) Preparation of Solid Product (a):

A SUS-made reactor (inner volume: 80 liters) equipped with a stirrer, was sufficiently purged with nitrogen, and charged with 31 Kg of ethanol, 0.2 Kg of iodine and 2.2 Kg of metallic magnesium. The reaction was carried out with stirring under refluxing conditions until no hydrogen was evolved any longer to obtain a solid reaction product.

The reaction liquid containing the solid product was dried under reduced pressure to obtain a solid product.

(2) Preparation of Solid Catalyst Component (A)

A SUS-made reactor equipped with a stirrer similar to that used in Step (1) was sufficiently purged with nitrogen gas, and charged with 4 Kg of the above-mentioned solid product (a) (not ground) and 20 liters of dehydrated heptane. Under stirring conditions, 0.6 liters of silicon tetrachloride were added. Further, 0.63 liters of diethyl phthalate were added and the temperature was kept at 60° C. After 20 liters of titanium tetrachloride were added, the reaction was carried out at 110° C. for 2 hours. The reaction mixture was washed with heptane heated to 80° C. After 24 liters of titanium tetrachloride were further added, the reaction was carried out at 110° C. for 2 hours. The reaction product was washed with heptane to obtain a solid catalyst composition (A).

(3) PrePolymerization

A SUS-made reactor (vertical type with four baffles as shown in Table 15) equipped with a stirrer, was sufficiently purged with nitrogen gas, and charged with 40 liters of purified heptane, 2.6 ml of triethylaluminum and 2.7 mol, in terms of Ti atom, of the above solid catalyst component (A). After the reaction mixture was kept at 110° C. for 2 hours, the obtained product was washed with heptane to obtain a solid catalyst component (A). In this case, propylene was continuously supplied to keep a total pressure of 0.8 Kg/cm²·G.

The Max blend wing as shown in FIG. 3 (as shown in Table 15; Manufactured by Sumitomo Heavy Machinery) was used as a stirring wing, and the stirring rotation rate was set at 130 rpm.

(4) Polymerization

A SUS-made autoclave (inner volume: 1.0 liter) sufficiently purged with argon gas, was charged with 400 ml of purified heptane, 1 mmol of triethylaluminum, 0.25 mmol of cyclohexylmethyldimethoxysilane and 0.005 mmol, in terms of Ti atom, of the above solid catalyst component (A). Then, hydrogen was added to raise its partial pressure to 0.5 Kg/cm² and the propylene polymerization was carried out under a total pressure of 8 Kg/cm² at 70° C. for 2 hours.

The results are as shown in Tables 15 and 16.

In addition, "Stereo-regularity" used in the Table means an insoluble fraction extracted from boiling heptane for 6 hours.

EXAMPLE 68

(1) Preparation of Solid Product (a):
The procedure of Example 67 was repeated.
(2) Preparation of Solid Catalyst Component (A):
The procedure of Example 67 (2) was repeated.
(3) Pre-Polymerization:
The procedure of Example 67 (3) was repeated except that the stirring wing was changed to the Full-Zone Wing as shown in FIG. 4 (Manufactured by Shinko PanTec), and the rotation rate of the stirring wing was changed to 300 rpm.
(4) Polymerization:
The procedure of Example 67 (4) was repeated.
The results are as shown in Tables 15 and 16.

EXAMPLE 69

(1) Preparation of Solid Product (a):
The procedure of Example 67 (1) was repeated.
(2) Preparation of Solid Catalyst Component (A):
The procedure of Example 67 (2) was repeated.
(3) PrePolymerization:
The procedure of Example 67 (3) was repeated except that the slurry concentration was changed to 450 g/l, and the propylene partial pressure was changed to 3.8 Kg/cm²·G.
(4) Polymerization:
The procedure of Example 67 (4) was repeated.
The results are as shown in Tables 15 and 16.

EXAMPLE 70

(1) Preparation of Solid Product (a):
The procedure of Example 67 (1) was repeated.
(2) Preparation of Solid Catalyst Component (A):
The procedure of Example 67 (2) was repeated.
(3) Pre-Polymerization:
The procedure of Example 67 (3) was repeated except that the slurry concentration was changed to 300 g/l, the propylene partial pressure was changed to 3.8 Kg/cm²·G, the rotation rate of the stirring wing was changed to 40 rpm, and the temperature was changed to 20° C.
(4) Polymerization:
The procedure of Example 67 (4) was reseated.
The results are as shown in Tables 15 and 16.

COMPARATIVE EXAMPLE 24

(1) Preparation of Solid Product (a):
The procedure of Example 67 (1) was repeated.
(2) Preparation of Solid Catalyst Component (A):
The procedure of Example 67 (2) was repeated.
(3) Pre-Polymerization:
The procedure of Example 67 (3) was repeated except that the stirring wing was changed to the Paddle Wing 5.

(4) Polymerization:
The procedure of Example 67 (4) was repeated.
The results are as shown in Tables 15 and 16.

COMPARATIVE EXAMPLE 25

(1) Preparation of Solid Product (a):
The procedure of Example 67 (1) was repeated.
(2) Preparation of Solid Catalyst Component (A):
The procedure of Example 67 (2) was repeated.
(3) Pre-Polymerization:
The procedure of Comparative Example 24 (3) was repeated except that the slurry concentration was increased to 300 g/l in the prepolymerization. As a result, uncontrollable reaction took place and the temperature increased without control, to give agglomerates. 0.5 hour later, the temperature was decreased to 110° C. and the pre-polymerization treatment was terminated.
(4) Polymerization:
The procedure of Example 67 (4) was repeated.
The results are as shown in Tables 15 and 16. In this Example, as a result of polymerization, the catalyst activities and the stereo-regularity was substantially reduced. The bulk density also drastically decreased.

COMPARATIVE EXAMPLE 26

(1) Preparation of Solid Product (a):
The procedure of Example 67 (1) was repeated.
(2) Preparation of Solid Catalyst Component (A):
The procedure of Example 67 (2) was repeated.
(3) Pre-Polymerization:
The procedure of Example 67 (3) was repeated except that the stirring wing was changed to the Fuddler Wing 4, and the polymerization time was extended to 25 hours.
(4) Polymerization:
The procedure of Example 67 (4) was repeated.
The results are as shown in Tables 15 and 16. In this Example, as a result of polymerization, catalyst activities were reduced extensively although the amount of the pre-polymerization was about the same as that obtained in Example 35 (3).

Industrial Applicability

As mentioned above, the present invention is useful in the production of polyolefins, particularly ethylene polymers.

TABLE 16

| | Amount of Pre-Polymerization (g/g-cat) | Catalytic Activity (Kg/gTi-2 hr) | Stero-regularity (1.1) (wt %) | Powder Bulk Density (g/cc) |
|---|---|---|---|---|
| Example 67 | 2.09 | 609 | 98.6 | 0.43 |
| Example 68 | 2.24 | 593 | 98.5 | 0.45 |
| Example 69 | 2.21 | 554 | 98.6 | 0.44 |
| Example 70 | 2.00 | 599 | 98.5 | 0.44 |
| Comp. Example 21 | 0.41 | 543 | 98.7 | 0.42 |
| Comp. Example 22 | 1.25 | 139 | 90.6 | 0.23 |
| Comp. Example 23 | 2.01 | 216 | 98.5 | 0.43 |

Examples of the fourth aspect of the invention.

EXAMPLE 71

(1) Preparation of Solid Catalyst Component (A)

A reaction vessel (internal volume: about 6 l) made of glass equipped with a stirrer was sufficiently replaced with nitrogen gas. To the vessel were charged about 2,430 g of ethanol, 16 g of iodine, and 160 g of metallic magnesium, and the mixture was reacted with heating under refluxing conditions while stirring until hydrogen gas generation from the system terminated, thus obtaining a solid reaction product. The reaction liquid containing this solid reaction product was dried under reduced pressure to obtain solid catalyst component (a).

To a three-necked flask (internal volume: about 500 ml) made of glass and sufficiently replaced with nitrogen gas were charged 16 g of said solid catalyst component (a) (without being pulverized), 80 ml of purified heptane, 2.4 ml of silicon tetrachloride, and 2.3 ml of diethyl phthalate. 77 ml of titanium tetrachloride was charged to the flask while maintaining the internal temperature at 90° C. and stirring the mixture, following which the mixture was reacted for 2 hours at 110° C. The solid component was separated and washed with purified heptane at 80° C. 122 ml of titanium tetrachloride was further added, followed by the reaction for 2 hours at 110° C. The solid material was thoroughly washed with purified heptane to obtain solid catalyst component (A).

(2) Gas Phase One-step Reaction

To a 5 l pressure-resistant stainless autoclave was charged 20 ml of a heptane solution containing 3 mmol of AlEt$_3$, 0.15

TABLE 15

| | Reactor Volume (l) | Shape of Wing | Wing Diameter d (m) | Vessel Diameter d (m) | Rotation Rate (rpm) | H/L | Slurry Concentration (g/l) | Temp. (°C.) | Pressure (Kg/cm$^2$G) | Time (hr) |
|---|---|---|---|---|---|---|---|---|---|---|
| Example 67 | 80 | Max Blend Wing | 0.2 | 0.4 | 130 | 0.85 | 100 | 30 | 0.8 | 5.0 |
| Example 68 | 80 | Full Zone Wing | 0.2 | 0.4 | 300 | 0.85 | 100 | 60 | 0.8 | 5.0 |
| Example 69 | 80 | Max Blend Wing | 0.2 | 0.4 | 130 | 0.85 | 450 | 30 | 3.8 | 5.0 |
| Example 70 | 80 | Max Blend Wing | 0.2 | 0.4 | 40 | 0.85 | 300 | 20 | 2.3 | 5.0 |
| Comp. Ex. 24 | 80 | Paddle Wing | 0.2 | 0.4 | 130 | 0.21 | 100 | 30 | 0.8 | 5.0 |
| Comp. Ex. 25 | 80 | Paddle Wing | 0.2 | 0.4 | 130 | 0.21 | 300 | 30–100 | 0.8 | 0.5 |
| Comp. Ex. 26 | 80 | Fuddler Wing | 0.2 | 0.4 | 130 | 0.25 | 100 | 30 | 0.8 | 25.0 | mmol of 1-allyl-3,4-dimethoxybenzene (ADMB), 0.23 mmol of diphenyldimethoxysilane (DPDMS), and 100 mg (0.06 mmol as titanium atom) of said solid catalyst component (A) prepared in (1) above. The reaction system was degassed for 5 minutes, followed by a gas phase reaction at 70° C. for 1.7 hours while supplying propylene gas until the total pressure reached 29 Kg/cm$^2$.

EXAMPLES 72–73

The reactions were carried out in the same manner as in Example 71, except that the amounts of diphenyldimethoxysilane (DPDMS), which is the component (D), were changed as shown in Table 17.

EXAMPLE 74

The reaction was carried out in the same manner as in Example 71, except that triethyl aluminum (TEA), which is the component (B), was replaced by triisobutyl aluminum (TiBA).

EXAMPLE 75

The reaction was carried out in the same manner as in Example 74, except that hydrogen in the amount shown in Table 17 was added during the polymerization.

EXAMPLES 76–77

The reactions were carried out in the same manner as in Example 71, except that hydrogen in the amounts shown in Table 17 were added during the polymerization.

EXAMPLE 78

(1) Preparation of Solid Catalyst Component (A)

Solid catalyst component (A) was obtained in the same manner as in Example 71 (1).

(2) Preparation of solid component (E)

To a three-necked pressure-resistant flask with an internal volume of about 2.5 l made of glass and sufficiently replaced with nitrogen gas were charged 1.7 l of purified heptane, 0.07 mol of AlEt$_3$, 0.05 mmol of diphenyldimethoxysilane (DPDMS), and 120 g of said solid catalyst component (A) prepared in (1) above. The reaction system was maintained at 30° C. and propylene was continuously supplied while maintaining the pressure at 0.5 Kg/cm$^2$. The reaction was continued for 1 hour and the product was washed 5 times with 1 l of purified heptane to obtain solid component (E).

(3) Gas Phase One-step Reaction

A gas phase reaction was carried out in the same manner as in Example 71 (1) by using the solid component (E).

COMPARATIVE EXAMPLE 27

(1) Preparation of Solid Catalyst Component (X)

To a three-necked pressure-resistant flask with an internal volume of 0.5 l made of glass and sufficiently replaced with nitrogen gas were charged 20 ml of purified heptane, 4 g of Mg(OEt)$_2$, 1.2 g of di-n-butyl phthalate. While maintaining the system at 90° C., 4 ml of TiCl$_4$ was added dropwise with stirring, following which 111 ml of TiCl$_4$ was additionally charged and the temperature of the system was raised to 110° C. After the reaction for 2 hours at 110° C., the resulting product was washed with purified heptane at 80° C. 115 ml of TiCl$_4$ was added to the solid portion thus obtained, followed by a further reaction for 2 hours at 110° C. After the reaction, the product was washed several times with 100 ml of purified heptane to obtain solid catalyst component (X).

(2) Preparation of Solid Catalyst Component (Y)

To a three-necked pressure-resistant flask with an internal volume of 2.5 l made of glass and sufficiently replaced with nitrogen gas were charged 1.7 l of purified heptane, 0.07 mol of AlEt$_3$, 0.05 mmol of diphenyldimethoxysilane (DPDMS), and 120 g of said solid catalyst component (X) prepared in (1) above. The reaction system was maintained at 30° C. and propylene was continuously supplied with stirring and while maintaining the internal pressure at 0.5 Kg/cm$^2$. The reaction was continued for 1 hour and the product was washed 5 times with 1 l of purified heptane to obtain solid component (Y).

(3) Gas Phase One-step Reaction

To a 5 l pressure-resistant stainless steel autoclave containing 20 g of polypropylene powder was charged 20 ml of a heptane solution containing 3 mmol of AlEt$_3$, 0.15 mmol of 1-allyl-3,4-dimethoxybenzene (ADMB), 0.23 mmol of diphenyldimethoxysilane (DPDMS), and 100 mg (0.06 mmol as titanium atom) of said solid component (Y) prepared in (2) above. The reaction system was degassed for 5 minutes, followed by a gas phase reaction at 70° C. for 1.7 hours while supplying propylene gas until the total pressure reached 29 Kg/cm$^2$.

COMPARATIVE EXAMPLES 28–29

The reactions were carried out in the same manner as in comparative Example 27, except that the amounts of diphenyldimethoxysilane (DPDMS), which is the component (D), were changed as shown in Table 17.

COMPARATIVE EXAMPLES 30–31

The reactions were carried out in the same manner as in Comparative Example 27, except that hydrogen in the amount shown in Table 17 was added during the polymerization.

Catalyst compositions, polymerization conditions, the results of polymerization in the above Examples and Comparative Examples are shown in Table 17.

Figure 8:
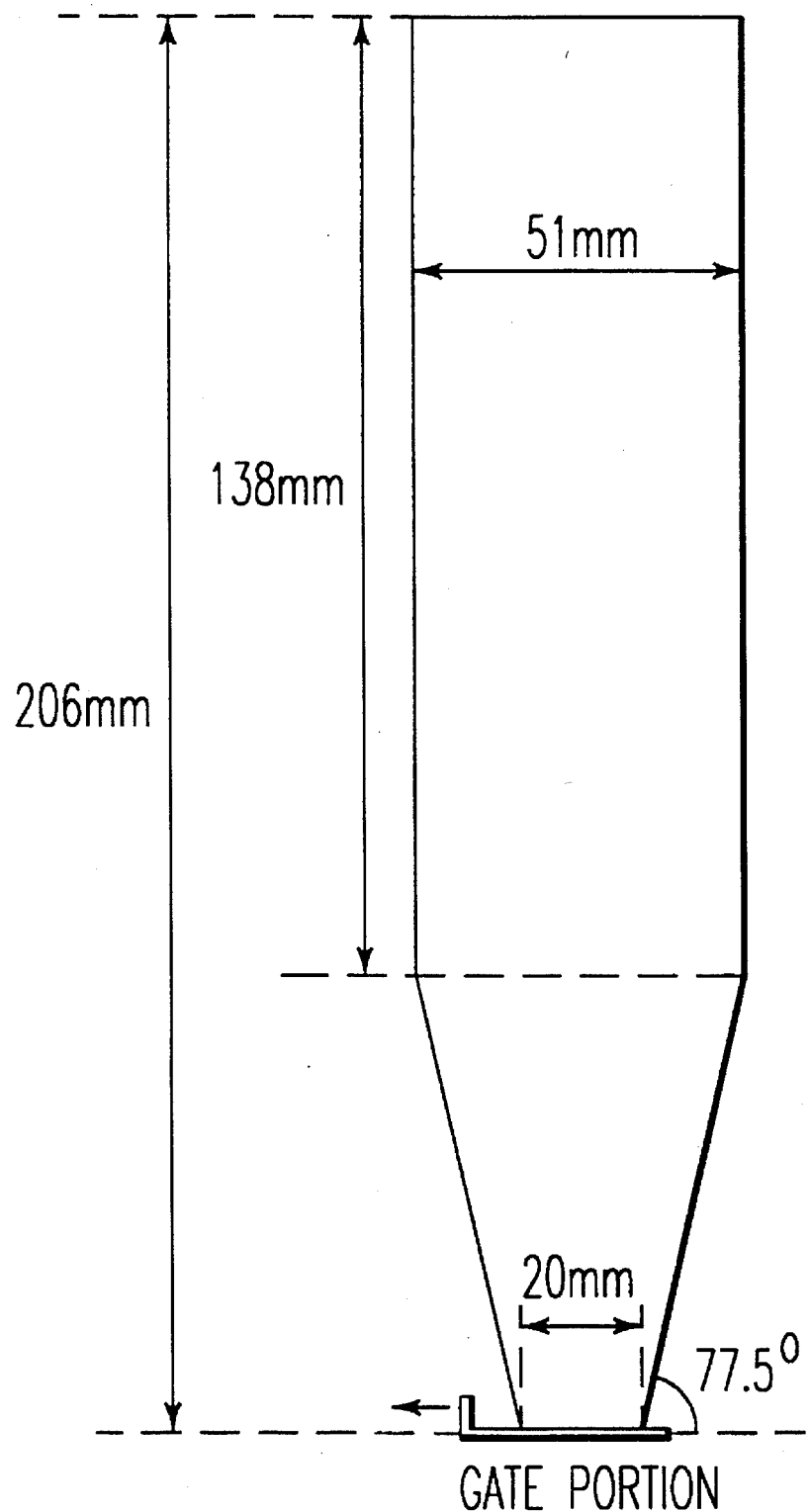
FIG. 8 is a diagram showing a powder flowability test machine.

Powder flowability was measured according to the following procedure 1–3 by using the powder flowability test machine made of SUS shown in FIG. 8.

1. The powder flowability test machine was horizontally fixed. A powder sample (at room temperature) to be measured was filled in the test machine so as not to provide vibration.
2. When the powder was filled up by using a leveling rod, the bottom gate was opened to measure the time (T) required for all amount of the powder to be discharged from the powder flowability test machine.
3. The discharged powder was accurately weighed (weight: W) to determine the powder flowability (F) by the following equation.

$$\text{Powder Flowability } (F) = \frac{\text{PowderWeight}(W)}{\text{Time}(T)} \text{ (g/sec)}$$

In addition, melt index (MI), the amount and intrinsic viscosity [η] of the HSP portion were measured according to the following methods.

MI: JIS-K7210 were followed, using measurement conditions of a test temperature of 230° C. and a test load of 2.16 Kgf.

HSP portion: The amount soluble in boiling heptane.

Intrinsic viscosity (η) of the HSP portion: measured in decaline at 135° C.

Industrial Applicability

The vulcanized rubber-like olefin polymer manufactured as illustrated above can be suitably used in the manufacture of automobile parts, industrial machine parts, electronic or electric parts, building materials and the like.

TABLE 17

| | Catalyst Composition | | | | | | Polymerization | | | | | |
|---|---|---|---|---|---|---|---|---|---|---|---|---|
| | Alkyl Aluminum | | Alkoxy-containing compound | | Electron donating compound | | Conditions | | | Results of Polymerization | | |
| | | | | | | | Temperature (°C.) | Amount of Hydrogen (Kg/cm$^2$) | MI (g/10 min) | HSP Portion | | Powder Flowability (g/sac) |
| | Kind | Amount (mmol) | Kind | Amount (mmol) | Kind | Amount (mmol) | | | | Ratio (wt %) | [η] (dl/g) | |
| Example 71 | TEA | 3.0 | ADMB | 0.15 | DPDMS | 0.23 | 70 | — | 0.25 | 39.1 | 1.95 | 10.2 |
| Example 72 | TEA | 3.0 | ADMB | 0.15 | DPDMS | 0.12 | 70 | — | 0.36 | 47.3 | 2.16 | 7.5 |
| Example 73 | TEA | 3.0 | ADMB | 0.15 | DPDMS | 0.30 | 70 | — | 0.20 | 35.1 | 1.95 | 12.1 |
| Example 74 | TEA | 3.0 | ADMB | 0.15 | DPDMS | 0.23 | 70 | — | 0.11 | 37.8 | 2.58 | 12.5 |
| Example 75 | TEA | 3.0 | ADMB | 0.15 | DPDMS | 0.23 | 70 | 0.2 | 0.50 | 39.9 | 2.15 | 9.0 |
| Example 76 | TEA | 3.0 | ADMB | 0.15 | DPDMS | 0.23 | 70 | 0.2 | 0.61 | 43.3 | 2.02 | 7.2 |
| Example 77 | TEA | 3.0 | ADMB | 0.15 | DPDMS | 0.23 | 70 | 0.4 | 1.10 | 40.1 | 1.81 | 6.5 |
| Example 78 | TEA | 3.0 | ADMB | 0.15 | DPDMS | 0.23 | 70 | — | 0.27 | 37.9 | 2.01 | 14.2 |
| Comparative Example 27 | TEA | 3.0 | ADMB | 0.15 | DPDMS | 0.23 | 70 | — | 0.07 | 35.1 | 1.95 | 7.0 |
| Comparative Example 28 | TEA | 3.0 | ADMB | 0.15 | DPDMS | 0.12 | 70 | — | 0.07 | 39.1 | 1.95 | 5.0 |
| Comparative Example 29 | TEA | 3.0 | ADMB | 0.15 | DPDMS | 0.30 | 70 | — | 0.07 | 25.0 | 1.77 | 8.1 |
| Comparative Example 30 | TEA | 3.0 | ADMB | 0.15 | DPDMS | 0.23 | 70 | 0.2 | 0.61 | 38.7 | 1.90 | 5.1 |
| Comparative Example 31 | TEA | 3.0 | ADMB | 0.15 | DPDMS | 0.23 | 70 | 0.4 | 1.10 | 40.4 | 1.81 | 3.9 |

What is claimed as new and desired to be secured by Letters Patent of the United States is:

1. A solid product useful for the preparation of a solid catalyst component for olefin polymerization, which is obtained by the reaction of metallic magnesium, an alcohol, and a halogen in an amount ranging from 0.019 to 0.06 gram-atom for 1 mol of the metallic magnesium.

2. A solid product as claimed in claim 1, wherein the halogen is iodine.

3. A solid product as claimed in claim 1, which has a sphericity (S) smaller than 1.60 as defined by formula (1) below and a particle size distribution index (P) smaller than 5.0 as defined by formula (2) below:

$$S=(E_1/E_2)^2 \tag{1}$$

wherein $E_1$ denotes the measured perimeter of the projected image of a particle, taken with a scanning electron microscope at ×150 magnification, and $E_2$ denotes the perimeter of a circle determined from measurement of the area of the projected image of said particle;

$$P=D_{90}/D_{10} \tag{2}$$

wherein, having determined the particle size distribution of 90 wt. % of the particles of a given mass of particles and the particle size distribution of the remaining 10 wt. % of particles, $D_{90}$ is the average particle diameter of said 90 wt. % of particles, and $D_{10}$ is the average particle diameter of said 10 wt. % of particles.

4. A solid catalyst composition obtained from the solid product (a) defined in any one of claims 1 to 3 and a titanium compound (b).

5. A solid catalyst composition obtained from the solid product (a) defined in any one of claims 1 to 3, a titanium compound (b), and an electron donor compound (c).

6. A solid catalyst composition as claimed in claim 4, which has a pore volume greater than 0.4 cc/g and a specific surface area greater than 300 m$^2$/g.

7. A solid catalyst composition as claimed in claim 5, which has a pore volume greater than 0.4 cc/g and a specific surface area greater than 300 m$^2$/g.

8. A solid product useful in preparation of a solid catalyst component for olefin polymerization, obtained by the reaction of metallic magnesium, alcohol and a halogen-containing compound containing from 0.019 to 0.06 gram-atom of a halogen atom, per 1 gram-atom of the metallic magnesium.

9. A solid product according to claim 8, wherein the halogen-containing compound is a halogen-containing metal compound.

10. A solid product according to claim 8 or 9, which has a sphericity (S) of less than 1.60 as defined by the following Formula (1):

$$S=(E_1/E_2)^2 \tag{1}$$

wherein $E_1$ denotes the measured perimeter of the projected image of a particle, taken with a scanning electron microscope at ×150 magnification, and $E_2$ denotes the perimeter of a circle determined from measurements of the area of the projected image of a particle, and a particle size distribution index (P) of less than 5.0 as defined by the following Formula (2):

$$P=D_{90}/D_{10} \tag{2}$$

wherein, having determined the particle size distribution of 90 wt. % of the particles of a given mass of particles and the particle size distribution of the remaining 10 wt. % of the particles, $D_{90}$ is the particle diameter of said 90 wt. % of particles, and $D_{10}$ is the particle diameter of said 10 wt. % particles.

11. A solid catalyst composition prepared from (a) a solid product set forth in claim 8 or 9 and (b) a titanium compound.

12. A solid catalyst composition prepared from (a) a solid product set forth in claim 8 or 9; (b) a titanium compound; and (c) an electron donor compound.

13. A solid catalyst composition prepared by reacting at least:
   (a) a solid product obtained by the reaction of metallic magnesium, alcohol and from 0.019 to 0.06 gram-atom, per 1 gram-atom of the metallic magnesium, of halogen or a halogen-containing compound containing from 0.019 to 0.06 gram-atom, per 1 gram-atom of the metallic magnesium, of a halogen atom, and
   (b) a titanium compound,
said reaction being carried out in a vessel having a stirring wing fixed to a stirring axle placed in the center of the vessel, the stirring wing comprising a bottom paddle wing located close to the bottom of the vessel and an upper wing located higher than the bottom paddle wing, and during the reaction, the stirring wing satisfying the following equation:

$$H/L > 0.5$$

wherein H is height between the bottom of the vessel and the most upper portion of the upper wing; and L is the liquid level during a reaction, and the most upper portion of the bottom paddle wing being located lower than the liquid level.

14. A solid catalyst composition prepared by reacting at least:
   (a) a solid product obtained by the reaction of metallic magnesium, alcohol and from 0.019 to 0.06 gram-atom, per 1 gram-atom of the metallic magnesium, of halogen or a halogen-containing compound containing from 0.019 to 0.06 gram-atom, per 1 gram-atom of the metallic magnesium, of a halogen atom, and
   (b) a titanium compound,
said reaction being carried out in a vessel having a stirring wing fixed to a stirring axle placed in the center of a stirring vessel, said stirring being conducted under stirring conditions which satisfy the following equation:

$$4.3 \times 10^3 < n^3 d^2 < 4.0 \times 10^6$$

wherein d (m) is the diameter of the stirring wing; and n (rpm) is the rotation rate.

15. The solid catalyst composition according to claim 13, wherein the components of solid product (a) are reacted under the stated stirring conditions in a vessel having a stirring wing fixed to a stirring axle placed in the center of the stirring vessel, the stirring wing comprising a bottom paddle wing located close to the bottom of the vessel and an upper wing located higher than the bottom paddle wing, and during a reaction the stirring wing satisfying the following equation:

$$H/L > 0.5$$

wherein H is the height between the bottom of the vessel and the most upper portion of the upper wing; and L is the liquid level during a reaction, and the most upper portion of the bottom paddle wing being located lower than the liquid level.

16. The solid catalyst composition according to claim 13, wherein the components of solid product (a) are reacted in the vessel configured as described under the stated conditions.

17. The solid catalyst composition according to claim 13, wherein the components of solid product (a) are reacted in the vessel configured as described under stirring conditions which satisfy the following equation:

$$4.3 \times 10^3 < n^3 d^2 < 4.0 \times 10^6$$

wherein d (m) is a diameter of the stirring wing; and n (rpm) is the rotation rate.

18. The solid catalyst composition according to claim 14, wherein the components of solid product (a) are reacted in the vessel configured as described under the stirring conditions as stated.

* * * * *